(12) United States Patent
Heilman et al.

(10) Patent No.: US 11,107,362 B2
(45) Date of Patent: Aug. 31, 2021

(54) SYSTEM AND METHOD FOR COLLABORATIVE INSTRUCTION

(71) Applicant: Exploros, Inc., Wayland, MA (US)

(72) Inventors: Bradley Heilman, Wayland, MA (US); Tomer Doron, San Francisco, CA (US); Nir Melamoud, West Newton, MA (US); Yoel Givol, Wayland, MA (US); Itai Benari, Tel Aviv (IL)

(73) Assignee: Exploros, Inc., Wayland, MA (US)

( * ) Notice: Subject to any disclaimer, the term of this patent is extended or adjusted under 35 U.S.C. 154(b) by 790 days.

(21) Appl. No.: 15/030,946

(22) PCT Filed: Oct. 22, 2014

(86) PCT No.: PCT/US2014/061722
§ 371 (c)(1),
(2) Date: Apr. 21, 2016

(87) PCT Pub. No.: WO2015/061415
PCT Pub. Date: Apr. 30, 2015

(65) Prior Publication Data
US 2016/0253912 A1 Sep. 1, 2016

Related U.S. Application Data

(60) Provisional application No. 61/894,202, filed on Oct. 22, 2013.

(51) Int. Cl.
| | | |
|---|---|---|
| *G09B 5/08* | (2006.01) | |
| *G09B 7/06* | (2006.01) | |
| *G09B 7/02* | (2006.01) | |
| *G06Q 50/20* | (2012.01) | |
| *G06Q 10/10* | (2012.01) | |
| *G06F 3/0482* | (2013.01) | |
| *G06F 3/0484* | (2013.01) | |
| *G06F 3/14* | (2006.01) | |
| *G09B 5/06* | (2006.01) | |

(52) U.S. Cl.
CPC ............. *G09B 5/08* (2013.01); *G06F 3/0482* (2013.01); *G06F 3/04842* (2013.01); *G06F 3/1454* (2013.01); *G06Q 10/101* (2013.01); *G06Q 50/20* (2013.01); *G09B 5/065* (2013.01); *G09B 7/02* (2013.01); *G09B 7/06* (2013.01)

(58) Field of Classification Search
None
See application file for complete search history.

(56) References Cited

U.S. PATENT DOCUMENTS

| | | | | |
|---|---|---|---|---|
| 8,092,227 B2* | 1/2012 | Roschelle | ............... | G09B 7/00 434/322 |
| 9,691,292 B1* | 6/2017 | Acosta | ..................... | G09B 5/00 |
| 10,029,178 B1* | 7/2018 | Dunn | .................... | A63F 13/335 |

(Continued)

*Primary Examiner* — William D Ermlick
(74) *Attorney, Agent, or Firm* — The Webb Law Firm

(57) ABSTRACT

A system and method for providing collaborative, digital learning experiences provides a learning experience to a plurality of users on a plurality of user devices. The learning experience may be divided into multiple scenes. Each scene may include one or more elements. Each element in the learning experience provides at least one item of media content to a user. Data associated with the user accessing an element in the learning experience may be received or recorded by the element.

36 Claims, 49 Drawing Sheets

(56) References Cited

U.S. PATENT DOCUMENTS

| | | | |
|---|---|---|---|
| 2002/0182571 A1* | 12/2002 | McCormick | G09B 7/02 434/157 |
| 2003/0052456 A1* | 3/2003 | Lasko | G07F 17/32 273/430 |
| 2003/0175676 A1* | 9/2003 | Theilmann | G09B 7/00 434/350 |
| 2003/0194690 A1* | 10/2003 | Wessner | G09B 7/00 434/350 |
| 2004/0072136 A1* | 4/2004 | Roschelle | G09B 7/00 434/350 |
| 2005/0014118 A1* | 1/2005 | von Ahn Arellano | G06F 16/583 434/322 |
| 2006/0160055 A1* | 7/2006 | Osoegawa | G09B 7/02 434/350 |
| 2006/0183100 A1* | 8/2006 | Voehl | G09B 7/07 434/350 |
| 2007/0031806 A1 | 2/2007 | Lam et al. | |
| 2007/0092859 A1* | 4/2007 | Watts | G09B 5/00 434/322 |
| 2007/0191102 A1* | 8/2007 | Coliz | A63F 13/795 463/42 |
| 2008/0286739 A1* | 11/2008 | Umrigar | G09B 7/02 434/323 |
| 2008/0318200 A1* | 12/2008 | Hau | G09B 5/06 434/362 |
| 2009/0104591 A1* | 4/2009 | Panetta | G09B 7/02 434/350 |
| 2010/0151431 A1* | 6/2010 | Miller | G09B 5/00 434/350 |
| 2010/0235854 A1* | 9/2010 | Badgett | G09B 7/00 725/24 |
| 2011/0039249 A1* | 2/2011 | Packard | G09B 5/00 434/362 |
| 2011/0065082 A1 | 3/2011 | Gal et al. | |
| 2011/0087480 A1* | 4/2011 | Neeley | G06F 40/40 704/3 |
| 2011/0167103 A1* | 7/2011 | Acosta | G09B 5/00 709/203 |
| 2011/0177480 A1 | 7/2011 | Menon et al. | |
| 2011/0212430 A1* | 9/2011 | Smithmier | G09B 5/06 434/322 |
| 2011/0299428 A1* | 12/2011 | Cacioppo | G09B 7/06 370/259 |
| 2011/0306027 A1 | 12/2011 | Bridges et al. | |
| 2011/0318723 A1* | 12/2011 | Jeong | G09B 7/08 434/350 |
| 2012/0052474 A1* | 3/2012 | Voehl | G09B 7/07 434/350 |
| 2012/0244505 A1* | 9/2012 | Lang | G09B 5/06 434/322 |
| 2012/0256822 A1* | 10/2012 | Coda | G06Q 10/101 345/156 |
| 2012/0315616 A1* | 12/2012 | Fourman | G09B 7/02 434/350 |
| 2012/0329027 A1* | 12/2012 | Lewolt | G06Q 10/101 434/322 |
| 2013/0004930 A1* | 1/2013 | Sorenson | G09B 7/02 434/350 |
| 2013/0095464 A1 | 4/2013 | Ediger et al. | |
| 2013/0137522 A1* | 5/2013 | Kusano | A63F 13/335 463/42 |
| 2013/0171594 A1* | 7/2013 | Gorman | G09B 5/00 434/219 |
| 2013/0204942 A1* | 8/2013 | Agarwal | H04L 65/403 709/204 |
| 2013/0266921 A1* | 10/2013 | Jenks | G09B 5/10 434/350 |
| 2013/0302776 A1* | 11/2013 | King | G09B 7/02 434/362 |
| 2013/0309647 A1* | 11/2013 | Ford | G09B 7/02 434/350 |
| 2013/0309648 A1* | 11/2013 | Park | G09B 5/00 434/350 |
| 2013/0316322 A1* | 11/2013 | Roschelle | G09B 7/00 434/350 |
| 2014/0038162 A1* | 2/2014 | Karpoff | G09B 5/00 434/362 |
| 2014/0057240 A1* | 2/2014 | Colby | G09B 7/02 434/350 |
| 2014/0220536 A1* | 8/2014 | Dow | G09B 7/00 434/350 |
| 2014/0227668 A1* | 8/2014 | Khalsa | G09B 7/08 434/188 |
| 2014/0272862 A1* | 9/2014 | Hussam | G09B 23/28 434/262 |
| 2014/0272895 A1* | 9/2014 | Feistritzer | G09B 5/08 434/350 |
| 2014/0272900 A1* | 9/2014 | Mellett | G09B 7/06 434/353 |
| 2014/0274386 A1* | 9/2014 | Ault | G09B 5/08 463/31 |
| 2015/0283455 A1* | 10/2015 | Nova | A63F 9/183 463/9 |
| 2015/0310757 A1* | 10/2015 | Moon | G09B 5/065 434/350 |
| 2015/0331553 A1* | 11/2015 | Shaffer | G06F 3/013 715/765 |
| 2016/0117953 A1* | 4/2016 | Lluch | G09B 5/02 434/188 |
| 2016/0335905 A1* | 11/2016 | Barber | G09B 7/00 |
| 2016/0364115 A1* | 12/2016 | Joung | G06F 3/04817 |
| 2018/0211491 A1* | 7/2018 | Burnside | G07F 17/3276 |
| 2018/0286266 A1* | 10/2018 | Britto Mattos Lima | G09B 7/07 |
| 2019/0130777 A1* | 5/2019 | Dey | G09B 7/02 |
| 2020/0302817 A1* | 9/2020 | Williams | G09B 5/10 |

\* cited by examiner

Fig. 5

Observe birds in the school yard and record in the table below.
Bird Observations
| Bird | Wing Color | Breast Color |
|---|---|---|
| Robin | Brown | Orange |
| Goldfinch | Yellow | Yellow |
| Crow | Black | Black |
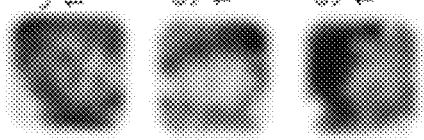
Jay A 10:02 AM    Sarah B 10:06 AM    Sven E 10:07 AM
Fig. 8

Record your results below.

Cart and Track Measurements

| Length(cm) | Time(s) | Velocity(cm/s) |
|---|---|---|
| 25 | 0.85 | 29.3 |
| 25 | 0.82 | 30.1 |
| 25 | 0.86 | 29.1 |

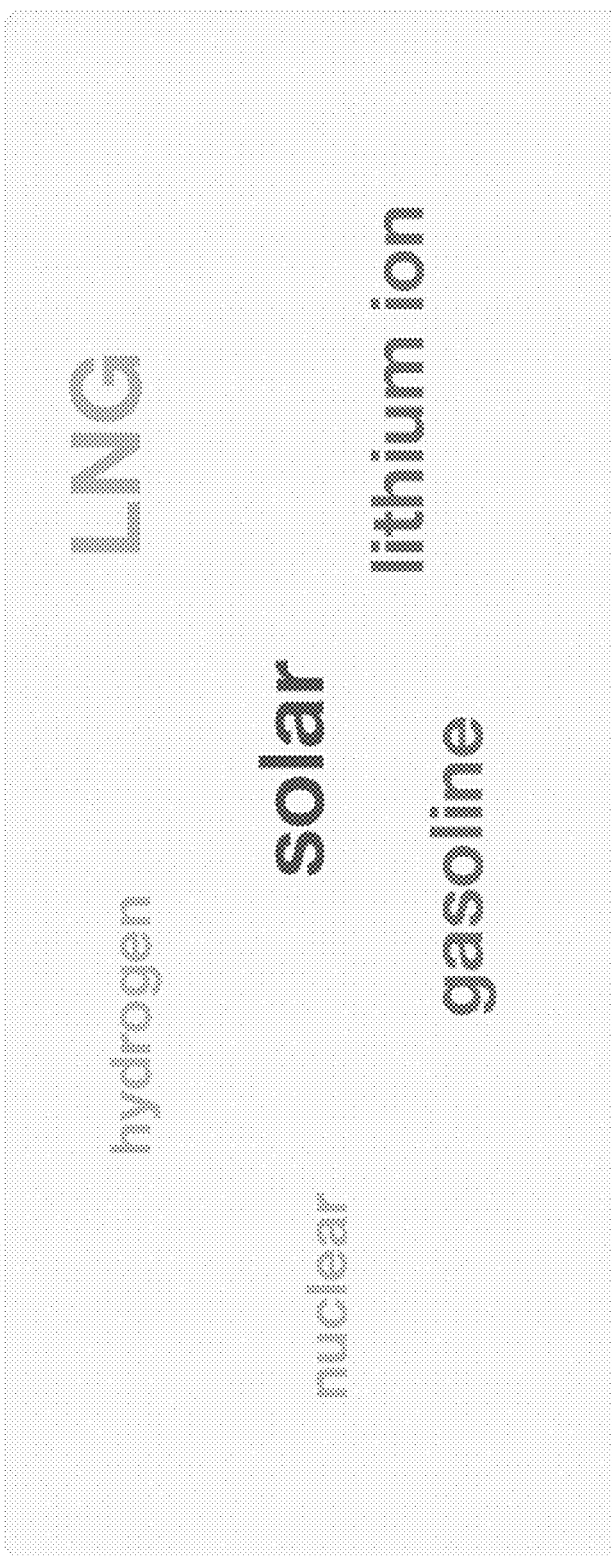
Fig. 18A

People of all ages, from all parts of the world, write and talk about their thoughts and experiences each day in journals, diaries, or blogs. Anne Frank, a young girl who lived in a time of war, was one of them. What kinds of things might she have written in her diary?

Who Was Anne Frank?

SYSTEM AND METHOD FOR COLLABORATIVE INSTRUCTION

CROSS REFERENCE TO RELATED APPLICATIONS

This application claims the benefit of priority to U.S. Provisional Application No. 61/894,202, filed on Oct. 22, 2013, the contents of which are hereby incorporated in their entirety by reference.

BACKGROUND

1. Field of the Invention

Preferred and non-limiting embodiments are related to a system and method for collaborative instruction, and for example, to a system and method for authoring, marketing, delivery, and curation of collaborative, digital educational learning experiences.

2. Description of Related Art

Traditional classrooms work because they are social environments run by an experienced teacher. With the advent of laptop computers and tablets, software based Learning Management Systems (LMSs) have been introduced. LMSs provide for the administration, documentation, tracking, reporting, and delivery of e-learning education courses or training programs. LMSs range from systems for managing training and educational records to software for distributing online or blended/hybrid college courses over the Internet with features for online collaboration. Colleges and universities use LMSs to deliver online courses and augment on-campus courses. Corporate training departments use LMSs to deliver online training, as well as to automate record-keeping and employee registration. K12 institutions also use LMSs for course management, assignment management, discussions, and grading.

LMSs and other conventional virtual classrooms fail to provide the essential elements of traditional classrooms in a 1:1 environment. They do not provide the "what to teach and how to teach" of existing lesson plans, nor do they provide a teacher-student relationship with dynamic student collaboration and input. Conventional virtual classrooms require teachers to integrate numerous complex features, often requiring multiple interfaces and the need for constant training on different technology solutions, adding time requirements and costs. Moreover, they fail to provide the analytics needed to successfully determine the effectiveness of a learning experience.

Technology is often used as a tool in classrooms. Students use word processors, video editors, blogs, web sites, etc. These technologies may collect information on student usage, but because the technologies themselves do not know what learning objectives the students are trying to achieve, the data cannot be easily contextualized and it is difficult or impossible to use the data to understand student performance. Furthermore, the data is scattered across different systems or applications.

Technology may be used for quizzes, where student's answers may be auto-graded or teacher-graded, which may shed some light on student performance, but quizzes make up only a small fraction of what happens in schools and in education. Lesson plans play a much more significant role in student learning, and a lesson plan has known learning goals mapped to educational standards. If one could see how each student is doing against the backdrop of each lesson plan, one would have a much clearer understanding of each student's academic performance.

Many conventional eLearning solutions deliver quizzes and map results against content maps. Such approaches are limited in providing insights into student learning and performance for two reasons. First, quizzes and tests are typically infrequent, and because of this provide only an occasional glimpse at student performance. It is often too late for a teacher to make adjustments for any given student, once the data is in. Second, because most quizzes are by default "single-user", a quiz alone is not a good way to measure skills such as teamwork, collaborative problem solving, and other $21^{st}$ century skills that are desirable for students of all ages to develop.

As stated, data is most present in the case of testing and quizzes. In less frequent cases, a technology may be employed to allow students to do certain homework assignments. While this is occasionally done, it is typically not the same software as the testing software. A challenging use case for technology is to be present at the point of learning, in the collaborative classroom or when students are working on projects.

Curriculum developers develop the materials and instructional flow for courses, end to end: lesson plans, projects, homework, and quizzes. Each of these learning experiences plays a critical role in achieving the effect of the course. However, since conventional technology is unable to effectively deliver collaborative lesson plans and projects, most curriculum developers publish their methods in books with some publishers adding supplemental technology pieces.

SUMMARY

Generally, provided is a system and method for collaborative instruction that addresses or overcomes some or all of the deficiencies and drawbacks associated with existing Learning Management Systems (LMSs) and virtual classrooms.

According to a preferred and non-limiting embodiment, a method for providing collaborative, digital learning experiences, may include storing, by one or more processors, data for at least one learning experience. The at least one learning experience may be divided into a plurality of scenes including a plurality of elements to be provided in a predefined flow. Each element of the plurality of elements includes at least one item of media content. The one or more processors provide the at least one learning experience to a plurality of users on a plurality of user devices and receive data associated with at least one user of the plurality of users accessing at least one element in the at least one learning experience.

According to another preferred and non-limiting embodiment, a system for providing collaborative, digital learning experiences may include at least one non-transitory computer-readable storage medium in communication with at least one processor and having instructions stored thereon which, when executed by the at least one processor, cause the at least one processor to perform operations including storing data for at least one learning experience. The at least one learning experience may be divided into a plurality of scenes including a plurality of elements to be provided in a predefined flow. Each element of the plurality of elements includes at least one item of media content. The at least one learning experience is provided to a plurality of users on a plurality of user devices, and the one or more processors receive data associated with at least one user of the plurality of users accessing at least one element in the at least one learning experience.

According to a preferred and non-limiting embodiment, the at least one element may be provided to two or more of the plurality of users at the same time.

According to a preferred and non-limiting embodiment, an expected user input associated with the at least one element may be received from the two or more users.

According to a preferred and non-limiting embodiment, the providing the at least one learning experience includes providing the at least one element with the expected user input from the two or more users.

According to a preferred and non-limiting embodiment, the providing the at least one learning experience includes withholding providing an update to media content in a current element, a next element, or an update to media content in a previous element in the at least one learning experience to the at least one user until an expected user input associated with the current element is received from the at least one user.

According to a preferred and non-limiting embodiment, the one or more processors may determine that the expected user input is a valid user input and provide the update to the media content in the current element, the next element, or the update to the media content in the previous element in the at least one learning experience to the at least one user.

According to a preferred and non-limiting embodiment, the one or more processors may determine that the expected user input is an invalid user input and provide additional information associated with the current element or at least one alternative element to the at least one user.

According to a preferred and non-limiting embodiment, the update to the media content in the current element, the next element, or the update to the media content in the previous element in the learning experience includes expected user input from at least one other user of the plurality of users.

According to a preferred and non-limiting embodiment, the providing the at least one learning experience includes withholding providing an update to media content in a current element, a next element, or an update to media content in a previous element in the at least one learning experience to two or more users until an expected user input associated with the current element is received from at least one of the two or more users, and wherein the two or more users are associated with each other by the at least one element.

According to a preferred and non-limiting embodiment, the providing the at least one learning experience includes withholding providing an update to media content in a current element, a next element, or an update to media content in a previous element in the learning experience to the at least one user until an expected user input associated with the current element is received from at least one other user of the plurality of users.

According to a preferred and non-limiting embodiment, the providing the at least one learning experience includes withholding providing an update to media content in two or more current elements, a next element, or an update to media content in a previous element in the at least one learning experience to the at least one user until an expected user input associated with each of the two or more current elements is received from the at least one user.

According to a preferred and non-limiting embodiment, the one or more processors may associate the at least one user with a first user or group of users for one or more first elements of the plurality of elements and associate the at least one user with a second user or group of users for one or more second elements of the plurality of elements.

According to a preferred and non-limiting embodiment, the one or more processors may receive unexpected user input from the at least one user of the plurality of users and associate the unexpected user input with a particular element of the plurality of elements.

According to a preferred and non-limiting embodiment, the one or more processors may receive at least one additional element from the at least one user and modify at least one scene of the plurality of scenes to include the at least one additional element.

According to a preferred and non-limiting embodiment, the one or more processors may notify at least one other user of the plurality of users substantially in real-time of the unexpected user input and the particular element associated with the unexpected user input.

According to a preferred and non-limiting embodiment, the one or more processors may associate two or more users of the plurality of users with each other for the at least one element such that the two or more users can interact with each other through the at least one element.

According to a preferred and non-limiting embodiment, for the at least one element, the remainder of the plurality of users cannot interact with the two or more users through the at least one element.

According to a preferred and non-limiting embodiment, for the at least one element, the two or more users are associated with a plurality of teams or groups such that only users of the two or more users that are associated with a same team or group can interact with each other through the at least one element.

According to a preferred and non-limiting embodiment, the one or more processors may associate the plurality of users with a plurality of roles, and the providing the at least one learning experience includes providing a first item of media content for the at least one element to one or more users associated with a first role of the plurality of roles and providing a second item of media content for the at least one element to one or more users associated with a second role of the plurality of roles.

According to a preferred and non-limiting embodiment, the one or more processors may receive data associated with at least one interaction between two or more of the plurality of users through the at least one element.

According to a preferred and non-limiting embodiment, the data associated with the at least one interaction includes at least one of an indication of one or more users of the plurality of users that interact through the at least one element, one or more users of the plurality of users that initiate the at least one interaction through the at least one element, one or more users of the plurality of users reply to the initiated interaction through the at least one element, and an amount of time each of the one or more users interact through the at least one element.

According to a preferred and non-limiting embodiment, the one or more processors may map the data associated with the at least one user of the plurality of users accessing at least one element in the at least one learning experience to at least one learning standard.

According to a preferred and non-limiting embodiment, the one or more processors may receive data including at least one of an indication of whether the at least one user is currently accessing the at least one element and an amount of time that the at least one user has spent accessing the at least one element.

According to a preferred and non-limiting embodiment, the one or more processors may receive data associated with the at least one user of the plurality of users accessing a plurality of different learning experiences.

According to a preferred and non-limiting embodiment, the at least one item of media content includes at least one of text, audio, an image, and a video.

According to a preferred and non-limiting embodiment, the one or more processors may receive at least one review of the at least one learning experience from the at least one user and provide the at least one review of the learning experience and the data associated with the at least one user of the plurality of users accessing the at least one element in the at least one learning experience to a creator of the at least one learning experience.

According to a preferred and non-limiting embodiment, the one or more processors may receive user input and create a learning experience master including the data for the at least one learning experience based at least partly on the user input.

According to a preferred and non-limiting embodiment, the one or more processors may provide a digital marketplace including data for a plurality of learning experiences accessible over a network by the plurality of user devices.

According to a preferred and non-limiting embodiment, the one or more processors may receive a user input associated to the at least one element, wherein the providing the at least one learning experience includes providing the at least one element with the user input associated with the at least one element. The one or more processors may receive a selection by the at least one user of the user input in the at least one element and provide information on one or more users that input the user input to the at least one user.

According to a preferred and non-limiting embodiment, the one or more processors may automatically push a plurality of learning experience masters including data for a plurality of learning experiences to a portion of the plurality of users.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Further features and other objects and advantages will become apparent from the following detailed description made with reference to the drawings in which:

FIG. 5 is an example of a GUI for an activity in a learning experience according to a preferred and non-limiting embodiment;

FIG. 8 is an example of a GUI for an individual user sharing to a teacher, class, or group in a learning experience according to a preferred and non-limiting embodiment;

FIG. 18A is an example GUI of a gated word cloud element according to a preferred and non-limiting embodiment;

FIG. 41 is an example of a GUI showing a rubric style grading system according to a preferred and non-limiting embodiment;

FIG. 42 is an example of a GUI showing a skills tracker according to a preferred and non-limiting embodiment;

FIG. 47 is an example of a GUI for a wall element according to a preferred and non-limiting embodiment.

DETAILED DESCRIPTION OF PREFERRED EMBODIMENTS

While a particular embodiment is disclosed herein, it is to be understood that the invention may assume various alternative variations and step sequences, except where expressly specified to the contrary. It is also to be understood that the specific devices and processes illustrated and described in the following specification, are simply exemplary embodiments of the invention. Hence, specific dimensions and other physical characteristics related to the embodiments disclosed herein are not to be considered as limiting.

A system and method according to preferred and non-limiting embodiments provides 1:1 device enabled learning. The system and method described herein provide authoring, delivery through marketplace(s), usage, data and analytics, and curation of collaborative, digital educational learning experiences designed for the 1:1 device world. For example, the system and method described herein provide collaboration that is outlined and described in classroom lesson plans, but brings these lessons plans to life as student-facing, teacher-guided learning experiences delivered through 1:1 devices. Furthermore, the system and method described herein provide mechanisms that enable student learning to be mapped against learning standards, as a real-time and longitudinal window into student achievement of both content and social and cognitive skills, e.g., teamwork, problem solving, etc.

The system and method described herein deliver learning experiences for lesson plans and project work. The system and method described herein enable technology to be at the point of learning in any given piece of a typical course, and over time be present in more and more pieces so that individual and class-level student learning and progress may be more carefully followed, and teachers and students may benefit from proven instructional methods.

The system and method described herein enable a complete transformation of materials into an end-to-end eLearning solution made for 1:1 device classrooms. Curriculum developers may deliver the actual learning experiences described in their lesson plans, instead of just the directions. Teachers are provided an end-to-end solution mapped against learning goals, and may follow and adjust to student progress. Students benefit from peer interaction and review, and the engagement of working with one another to solve problems and undergo learning processes necessary to develop $21^{st}$ century skills. The system and method described herein are suitable for all forms of educational use, whether K-12, higher education, trade or professional.

Figure 1A:
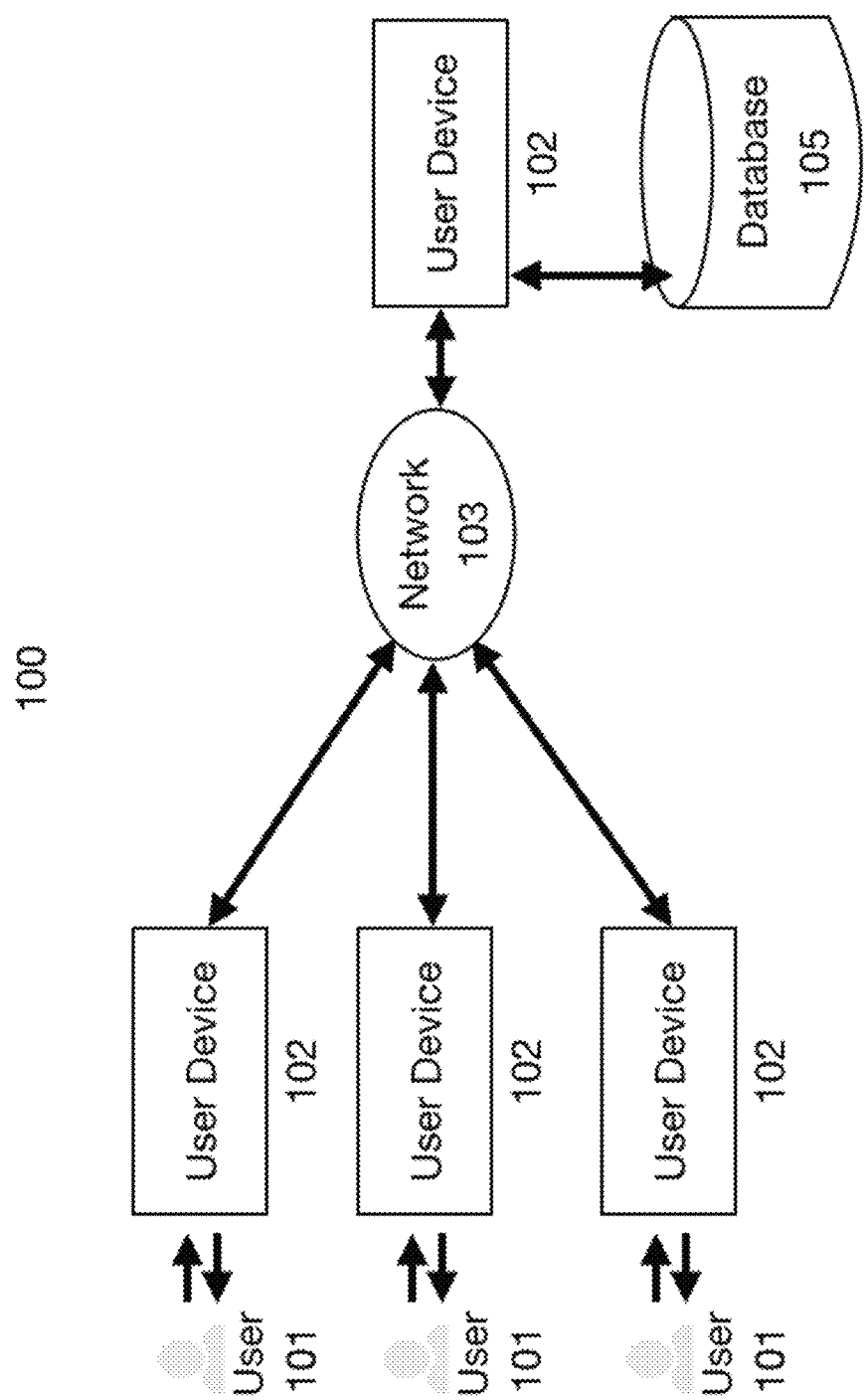
FIG. 1A is a block diagram of a system for providing collaborative, digital learning experiences according to a preferred and non-limiting embodiment.

Referring to FIG. 1A, a system 100 for providing collaborative, digital learning experiences may comprise a plurality of users 101. Each user 101 is associated with at least one user computing device 102, e.g., a tablet computer, a laptop computer, a desktop computer, a smart phone, etc., and uses their respective user computing device 102 to receive content of a learning experience and input thoughts and/or other user input to the learning experience, e.g., text, images, videos, sounds, etc., and to collaborate with other users 101 in the learning experience. The user computing device 102 may comprise one or more processors, a memory, and a wired or wireless communications interface for communicating via communications network 103 with a central computing device 104 and/or the other user computing devices 102. The user computing device 102 may comprise a display for displaying a graphical user interface (GUI) comprising the learning experience to the user 101. The user computing device 102 may comprise an audio output device, e.g., a speaker, for providing audio content in the learning experience to the user 101. The user computing device 102 may comprise one or more user input devices, e.g., a touch screen display, a keyboard, a mouse, a microphone, a camera, etc., for receiving user input from the user 101 and inputting the user input to the learning experience, e.g., by transmitting the user input to the central computing device 104 for updating the learning experience.

The communications network 103 may comprise any wired and/or wireless communications network e.g., the Internet and/or a local intranet, and may be accessed by the user computing devices 102 and the central computing device 104 via any wired or wireless communications interface, e.g., cellular communications, WiFi, etc.

The central computing device 104 may comprise a variety of computing devices and systems including one or more processors, a memory, and a wired or wireless communications interface, wherein these computing devices include the appropriate processing mechanisms and computer-readable media for storing and executing computer-readable instructions, such as programming instructions, code, and the like. For example, the central computing device may comprise a tablet computer, a laptop computer, a desktop computer, a smart phone, a server computer, etc. The central computing device 104 stores data for the learning experiences and provides the data for the learning experiences to the users 101 on the respective user computing devices 102 via communications network 103. For example, the central computing device 104 controls presentation of the GUI comprising the learning experience on the user computing devices 102 to individual users 101 in the learning experience. The central computing unit 104 may be connected to one or more databases 105. The one or more databases 105 may store the data for the one or more learning experiences, information on the plurality of users 101, such as a unique user ID, user demographic data, such as age, grade, sex, etc., and/or historical data associated with presentation of the plurality of learning experiences to the plurality of users 101. In some embodiments, one or more of the user computing devices 102 may comprise the central computing device 104. The data for the learning experiences may be stored in one or more cloud based devices to enable scaling of the learning experience, and the cloud based devices may provide the data for the learning experiences to the users 101 on the respective user computing devices 102 via communications network 103.

Learning Experience and Learning Experience Usage

Figure 1B:
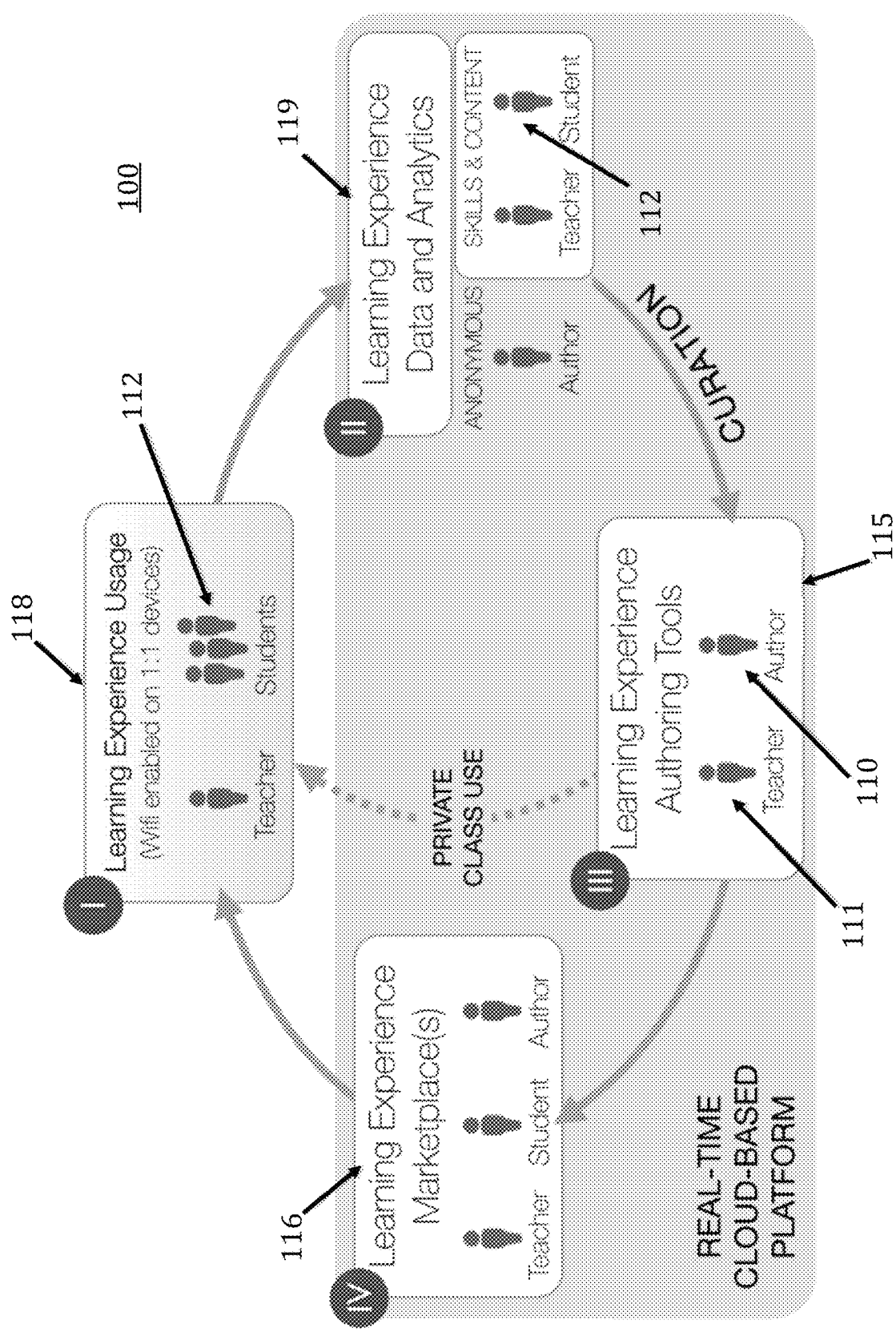
FIG. 1B is a block diagram of system modules according to a preferred and non-limiting embodiment.
Figure 1C:
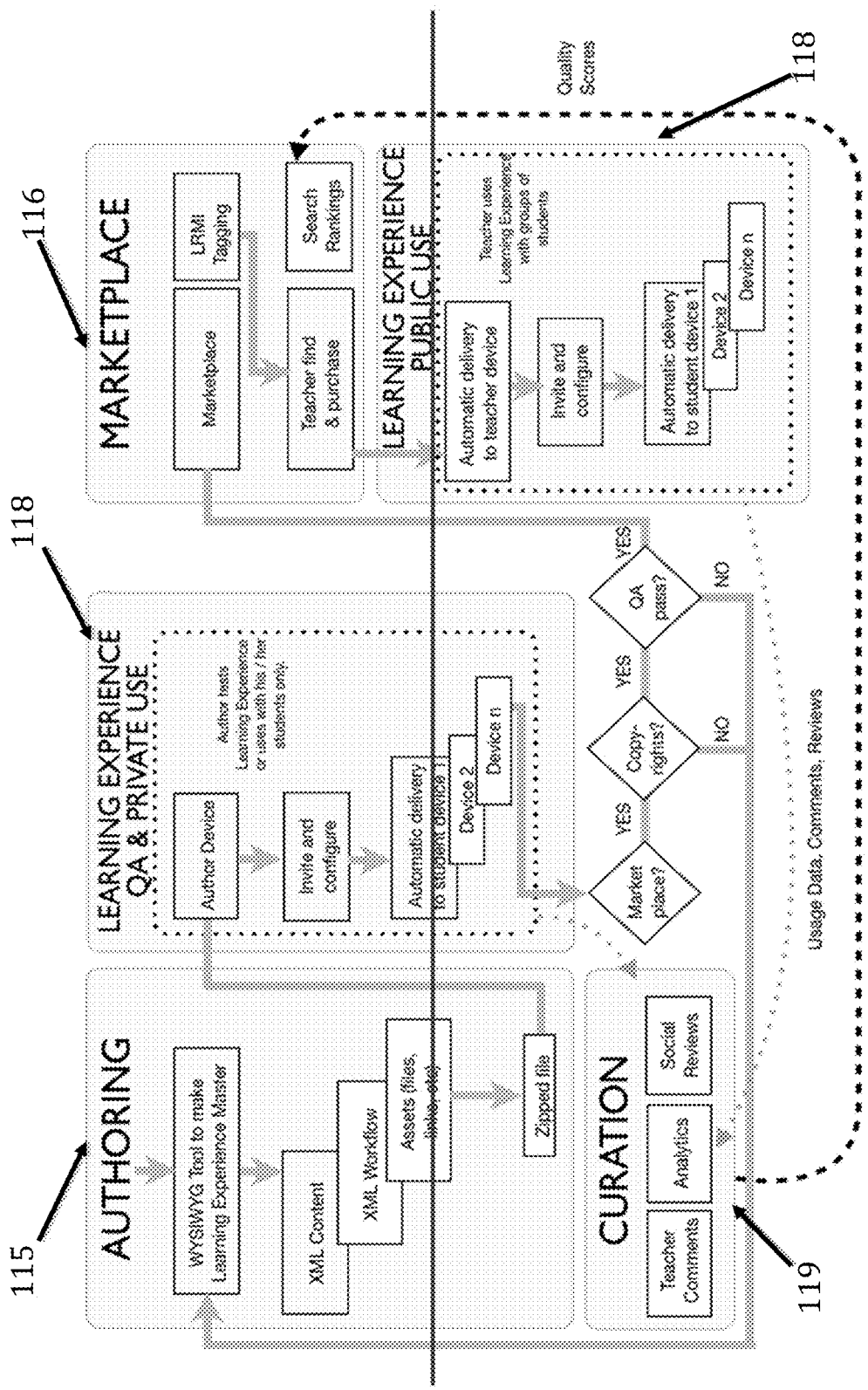
FIG. 1C is a flow chart of a method for providing collaborative, digital learning experiences according to a preferred and non-limiting embodiment.

Referring to FIGS. 1B and 1C, the plurality of users 101 may comprise one or more authors 110, one or more teachers 111, and/or one or more students 112. A system and method according to preferred and non-limiting embodiments may comprise one or more authoring tool modules or processes 115, one or more marketplace modules or processes 116, one or more learning experience usage modules or processes 118, and/or one or more data and analytics modules or processes 119. For example, the central computing device 104 may comprise the appropriate processing mechanisms and computer-readable media for storing and executing computer-readable instructions for implementing the one or more authoring tool modules 115, the one or more marketplace modules 116, the one or more learning experience usage modules 118, and/or the one or more data and analytics modules 119.

The learning experience authoring tool modules or processes 115 may be provided to and/or accessed by curriculum developers, teachers 111 and publishers via the user computing devices 102 to create learning experiences. The learning experience marketplace modules or processes 116 may enable teachers 111 to purchase or gain access to learning experience masters via the user computing devices 102, and students 112 to purchase seats to virtual courses, i.e., learning experiences, via the user computing devices 102, and/or students 112 may be invited to a learning experience by a teacher 111. The learning experiences usage modules or processes 118 may enable student-facing, teacher-guided collaborative learning experiences by providing data and control for a GUI presenting the learning experience on the user computing devices 102. The learning experience data and analytics modules 119 may track usage of the learning experience by the users 101 and provide skills, practices and content-based data for teachers 111 and students 112, and anonymous "big data" for learning experience authors 110 and publishers that promote curation over time.

A system and method according to preferred and non-limiting embodiments is described herein from a perspective of three stakeholders in the system: the authors 110, the teachers 111, and the students 112. The authors 110 may be curriculum publishers, but any creator of a learning experience may be referred to as an author 110. Because the system and method described herein provide collaborative learning, examples are described first with respect to the learning experience usage modules and processes 118. The system and method is further described by moving around the cycle as shown in FIG. 1B or following the process flow as shown in FIG. 1C to the learning experience data and analytics modules or processes 119, the authoring tools modules or processes 115, and the marketplace modules or processes 116.

Learning experiences comprise a blend of media content and social instructional flow delivered to 1:1 devices for use by a teacher 111 and students 112 in a face-to-face or virtual classroom. Unlike conventional eLearning approaches, the system and method described herein enable the authoring and delivery of deeply collaborative learning experiences. The term "learning experience" is used because the approach is fundamentally different from many eLearning Methods. Instead of simply delivering a flow of content to a single user 101, the flow and content delivered to users by a learning experience is based at least partly on real-time, dynamic input of what a class or a group of users provide, in the form of responses, discussion, posted images, data tables, drawings, brainstorms, and other socially shared or generated work.

Learning experiences may be based on classroom lesson plans. Classroom lesson plans describe an instructional flow that may be followed to teach a class. The system and method described herein may convert lesson plans to learning experience masters that comprise computer-readable instructions, such as programming instructions, code, and the like that determine and provide the media content and the flow of presentation of the media content to the plurality of users 101 on the plurality of user computing devices 102. An instance of a learning experience master may be launched by the central computing device 104 and/or the user computing devices 102 as a learning experience, with a teacher 111 and a specific class of students 112, and the class of students 112 may be configured into groups.

A learning experience master may be a digital conversion of a lesson plan and comprise data including media content and an instructional flow defining the presentation of the media content and a plan for collaboration between the users 101. Learning experience masters may comprise data for shorter learning experiences, e.g., a 15 to 20 minute exercise, or longer learning experiences, e.g., a week long project.

A learning experience comprises an instance of a learning experience master, for example, as launched by a teacher 111 on a user device 102 or the central computing device 104. For example, a user device 102 or the central computing device 104 launching or executing the learning experience may provide the learning experience to the other user computing devices 102 via the network 103. For example, a user device 102 or the central computing device 104 may at least partly control a GUI presenting the media content and providing the instructional flow on the individual user computing devices 102 via the network 103 and receive user input from the users 101. The other user computing devices 102 may logon or connect to the user device 102 or the central computing device 104 launching or executing the learning experience to receive and/or access the learning experience. For example, the central computing device 104 may share the learning experience with the users 101 via the user computing devices 102 and ensure that all information and data for the learning experience is synchronized among the user computing devices 102.

A learning experience has a start time and an end time, and students 112 may be invited to join the learning experience by automatically transmitting an invite from the device launching or executing the learning experience to the user computing devices 102 associated with users 101 that have registered for the learning experience. For example, the learning experience master may be stored by a user device 102 or the central computing device 104 in association with a class list including each of the users 101 that have registered for the learning experience. If the learning experience master is stored by the central computing device 104, a teacher 111 may launch the learning experience through a user device 102 such that the user device 102 of the teacher 111 invites the students 112 to join the learning experience and the central computing device 104 executes the learning experience and provides the learning experience to the user computing devices 102 of the students 112.

Figure 3:
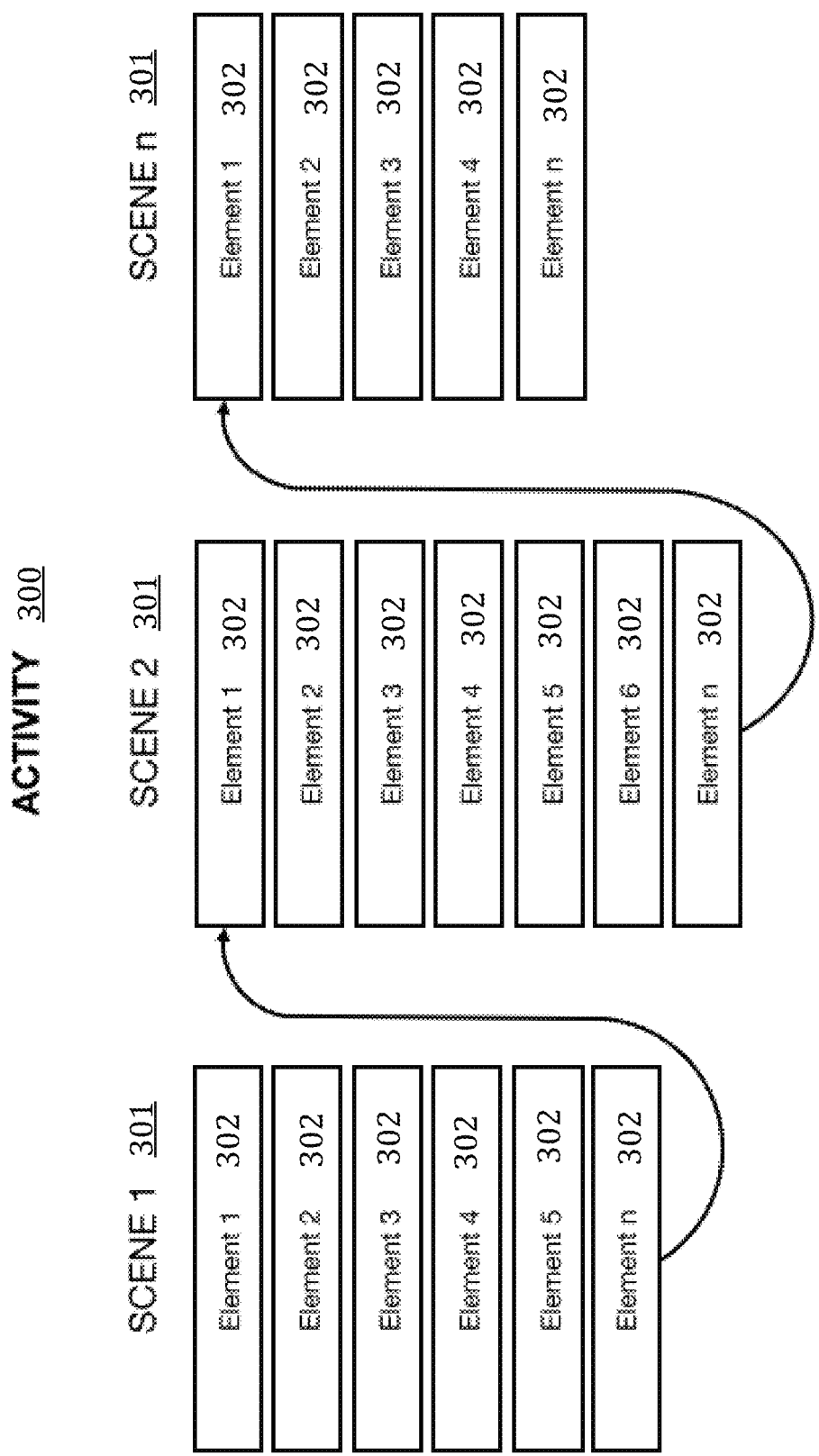
FIG. 3 is a flow chart showing an example activity in a learning experience according to a preferred and non-limiting embodiment.

The students 112 may be configured to work together as a class, in groups, or individually in a learning experience. Referring to FIG. 3, an activity 300 comprises an instructional flow, e.g., an order and/or manner of presenting or providing the activity, within a learning experience, and scenes 301 may comprise screens or pages of an activity. For example, similar to chapters in a book, scenes 301 may comprise sections of an activity that are broken up by instructional purpose, time duration, user grouping, media content, etc. Elements 302 may comprise basic building blocks of scenes 301. Elements 302 display or provide items of media content, e.g., videos, audio, text, etc., and enable student input therethrough, e.g., drawing tools, writing tools, speaking tools, etc., and allow for collaboration amongst students. For example, a user 101 accessing an element 302 via user device 102 may input text, audio, and/or video to the element 302 and the text, audio, and/or video is transmitted from the user device 102 to the user device 102 or central computing device 104 launching or executing the learning experience. The user device 102 or central computing device 104 launching or executing the learning experience may update or modify the element 302 in the learning experience so that other users 101 receive or may access the input text, audio, and/or video.

A cluster comprises a group of a plurality of elements 302. Each cluster of elements 302 may comprise a number of required elements that a student 112, a group or a class is required to respond to in order to advance from the element or from scene-to-scene.

A requirement comprises an element 302 that requires a student response. For example, a requirement may require a student 112 to enter a response to the element 302 in the learning experience before the student 112 is provided with or allowed to access a next element 302 in the learning experience. A cluster within a scene may have a required number of elements 302 that must be responded to, and without a response to each of the required elements, a student 112, a group or a class may not be provided with or allowed to access a next element or scene in the learning experience.

A class may comprise each of the students 112 invited to and/or associated with a particular learning experience. A group may comprise subsets of students 112 in a class. For example, a class of twenty students may be divided into five groups of four students each. The students 112 may work together as a class, work together within their respective group, or may work individually, as well as work within other further forms of collaboration as described herein. These various forms of students 112 working together or working individually may occur within a single learning experience, where a given user transitions between class work, group work, and/or individual work according to the flow of the authored learning experience master.

An individual may comprise a single-user mode within a learning experience. Examples of individuals include a student 112 working on his or her own to complete a piece of a learning experience, e.g., taking a quiz, reading a document, etc.

A role defines features and content that the users 101 are provided in the learning experience. For example, a teacher role in the learning experience for the teacher 111 defines the features and content that the teacher 111 receives and/or is allowed to access in the learning experience. The teacher role may provide content including in-context help on how to instruct students 112 within the learning experience. A student role in the learning experience for the students 112 defines the features and content that the students 112 receive and/or are allowed to access in the learning experience. Various other roles may be assigned to users in addition to, or in alternative to, the teacher role and the student role. For example, in a role play scenario, students 112 assigned to the student role may be assigned to an additional role such that the students 112 may be provided or allowed access to custom information based on the additional role.

Launching a Learning Experience from a Learning Experience Master

Figure 2:
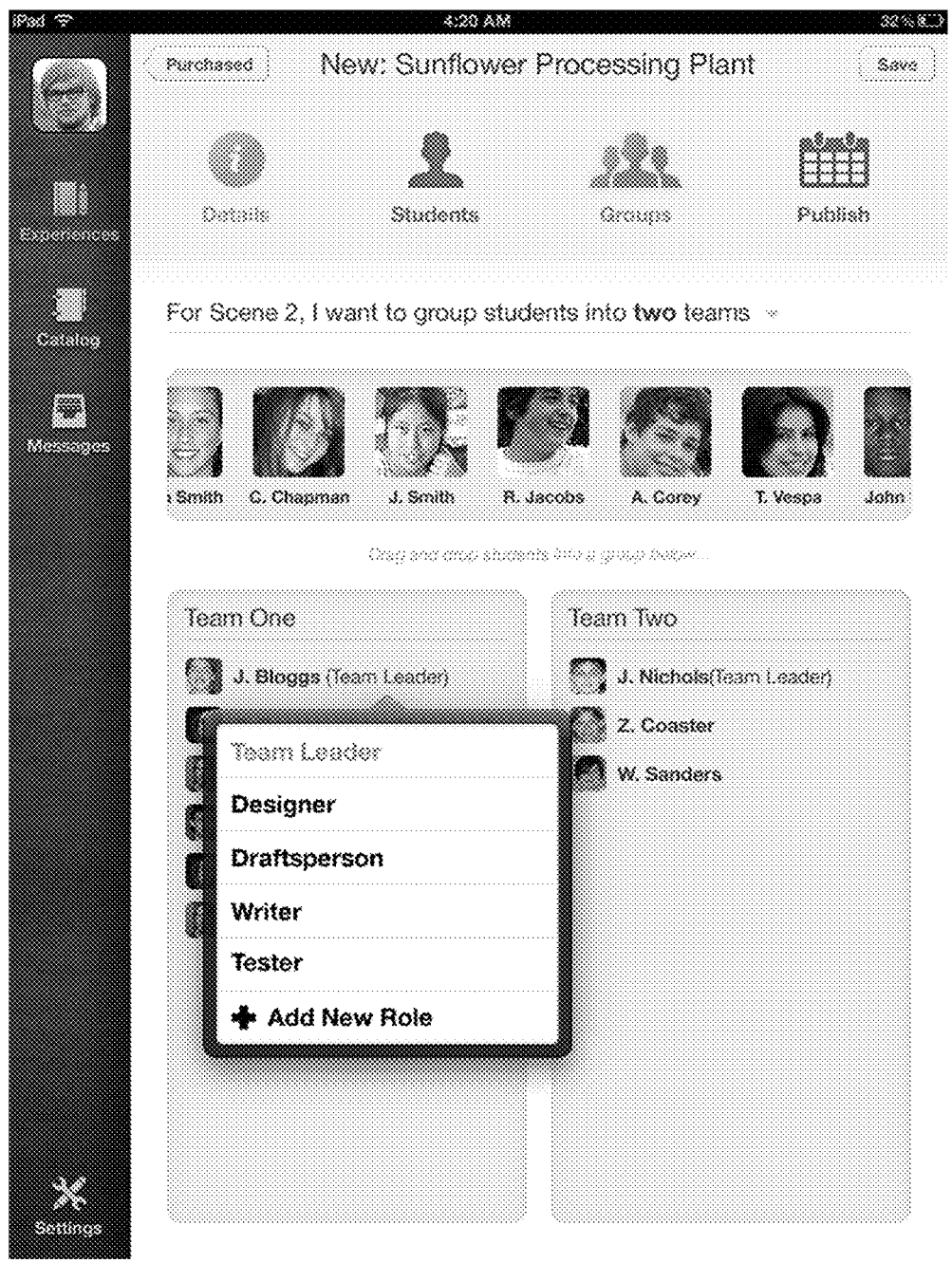
FIG. 2 is an example of a graphical user interface (GUI) for configuring a learning experience according to a preferred and non-limiting embodiment.

FIG. 2 is an example of a GUI for configuring a learning experience according to a preferred and non-limiting embodiment. Referring to FIG. 2 and FIGS. 1A-C, a teacher 111 may launch or execute a learning experience from a learning experience master. The teacher 111 may configure the learning experience before, during, or after launching or executing the learning experience. The learning experience is given a start and end time based on predefined data in the learning experience master and/or input from the teacher 111 and/or another user 101 to configure the start and end time of the learning experience.

As shown in FIG. 2, students 112 may be invited to participate in the learning experience, for example, as described above automatic invitations may be sent to user computing devices 102 associated with students 112 registered for the learning experience. Furthermore, depending on an instructional flow of the learning experience, the class of students 112 may be divided into smaller groups, or assigned roles. In some aspects, the students 112 may be automatically assigned a student role. After being configured by the teacher 111, the learning experience is provided or made available to the user computing devices 102 associated with the students 112. For example, the students 112 may access the learning experience via the user computing devices 102 after the learning is made available by the teacher 111.

Learning Experience Views

When a user 101, e.g., a teacher 111 or a student 112, opens or accesses a learning experience, the user 101 may be provided with at least three areas in a GUI. An activity area provides an instructional flow of the learning experience including the scenes and elements presented according to the instructional flow. A pack area provides resources that may be accessed by the teacher 111 or the student 112, for example, to help the teacher 111 or student 112 in a given learning experience. The resources may comprise videos, PDFs, images, text, audio files, etc. A dashboard area may show real-time information, such as progress in the learning experience, new posts, etc. However, a learning experience may be presented in the GUI in any number of manners which provide media content according to an instructional flow to the user 101.

Learning Experience: Activities, Scenes, and Elements

FIG. 3 is a flow chart showing an example activity in a learning experience according to a preferred and non-limiting embodiment. Referring to FIG. 3 and FIGS. 1A-C, an activity 300 may comprise one or more scenes 301, which may be similar to sections or chapters of the learning experience. Each scene 301 may comprise a single screen. The length of a scene 301 may be dynamic, because users 101 may add input to elements 302 of the scene as part of the learning experience. A scene 301 may comprise one or more elements 302, which may be educational/technical building blocks. For example, an element 302 may comprise one or more items of media content, e.g., text, audio, and/or video. An element may be for input, e.g. student created slide-shows, collaborative tables, discussion walls, etc.

Elements 302 display media content in the learning experience when provided to or accessed by a user 101, e.g., a text element, an image element, a video element, etc. Elements 302 may engage students in discussion and brainstorming, such as a word cloud element, a wall or discussion-board element, a drawing tool element, etc. Elements 302 may enable single user or group work, such as a collaborative document element, a collaborative drawing element, collaborative data table element, etc. Each element 302 may be configured to be real-time collaborative, but in certain cases this functionality may not be used, e.g. media display elements, such as a text element, may display media, but may not be collaborative elements.

Figure 4:
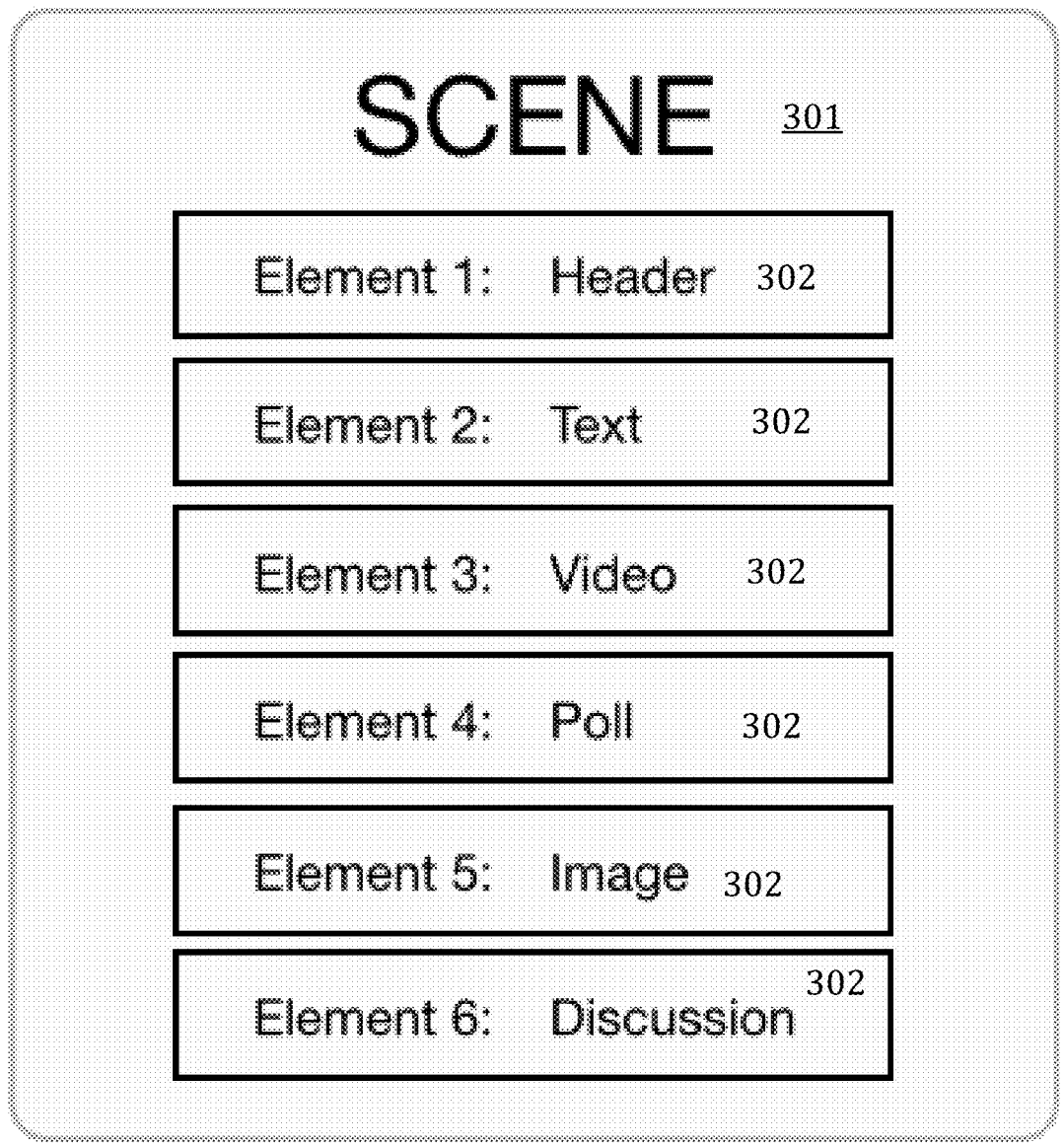
FIG. 4 is a block diagram of an example scene comprising elements according to a preferred and non-limiting embodiment.

FIG. 4 is a block diagram of an example scene comprising example elements according to a preferred and non-limiting embodiment. Referring to FIG. 4 and FIGS. 1A-C, the scene 301 comprises a header element 302a, a text element 302b, a video element 302c, a poll element 302d, an image element 302e, and a discussion element 302f. The header element 302a may provide text, audio, and/or video introducing a scene to a user 101 in the GUI. The text element 302b may provide text to the user 101 in the GUI. The video element 302c may provide a video to the user 101 in the GUI. For example, the user 101 may provide user input to the video element 302c, e.g., by way of selecting the video element 302c in the GUI, to play the video in the GUI. The poll element 302d may provide a poll requesting user input from the user 101, for example, with respect to a multiple choice question. The user 101 may provide the user input via the GUI on the user device 102 and the poll element 302d may be updated to show the results of the poll (including other user input) to the user 101 in the GUI. The image element 302e may provide an image to the user 101 in the GUI. The discussion element 302f may provide a discussion board to the user in the GUI. Discussion elements and wall elements are described in more detail below.

An element 302 may comprise a form and function layer, a collaboration layer, and a data layer. The form and function layer of an element comprises the media content that is presented to the user via the GUI on the user computing devices 102. If an element is a video element, it plays video. If it is a text element, it displays text. If it is a collaborative document, it enables collaborative writing for multiple user. The form and function layer presents the user interface and user experience. The user interface provided by the form and function layer may depend upon who is receiving or accessing the element 302, e.g., a teacher or a student, and/or upon a state or configuration of the element 302. For example, the media content that is presented to a teacher 111 for the element 302 may be different, e.g. comprise added instructional information, than the media content presented to the students 112 for the same element 302.

The collaboration layer of an element enables the users 101 to interact with each other through the element 302. Any element may be real-time collaborative; however, not all elements need be real-time collaborative. A real-time collaborative element updates itself in real-time such that changes to the element made by a user are presented or made available to the other users substantially in real-time as the changes occur within to the element 302. For example, a user 101 may input text to a real-time collaborative writing element, and the input text may be presented in real-time via the element 302 in the GUI of the other users 101. Any element may be built on a real-time collaborative framework. The real-time collaborative framework enables elements to be collaborative between a student and a teacher, between students in a group (with a teacher), and between students in a class (with a teacher.) Collaboration among users is discussed in more detail below.

The data layer of an element enables an element to receive, track, and/or collect data relating to the use of the element 302. A user device 102 or the central computing device 104 launching or executing the learning experience may receive or track via the element 302 data relating a user 101 receiving, accessing, or using the element 302. For example, an element 302 may track a time that a user 101 receives, accesses or uses the element 302, a duration that the user 101 receives, accesses or uses the element 302, a number of times that the user 101 receives, accesses or uses the element 302, a list of individual users 101 that receive, access or use the element 302, a user 101 that interacts with another user through the element 302, and/or any combination thereof. Additionally, the element captures the data the user enters, whether the data is text, numbers, click choices, photos, drawings, videos, sounds, etc.

An activity 300 may thus comprise one or more collaborative, data-collecting elements 302, each with a particular educational function, a particular presentation of media content based on roles, e.g., teacher, student, a particular collaboration or social setting, and/or data collecting functionality. A social setting may define which users 101 are associated with other users in the learning experience, for example, which users 101 may share input to other users and which users 101 may receive input from other users.

Sharing Configurations

Figure 5:
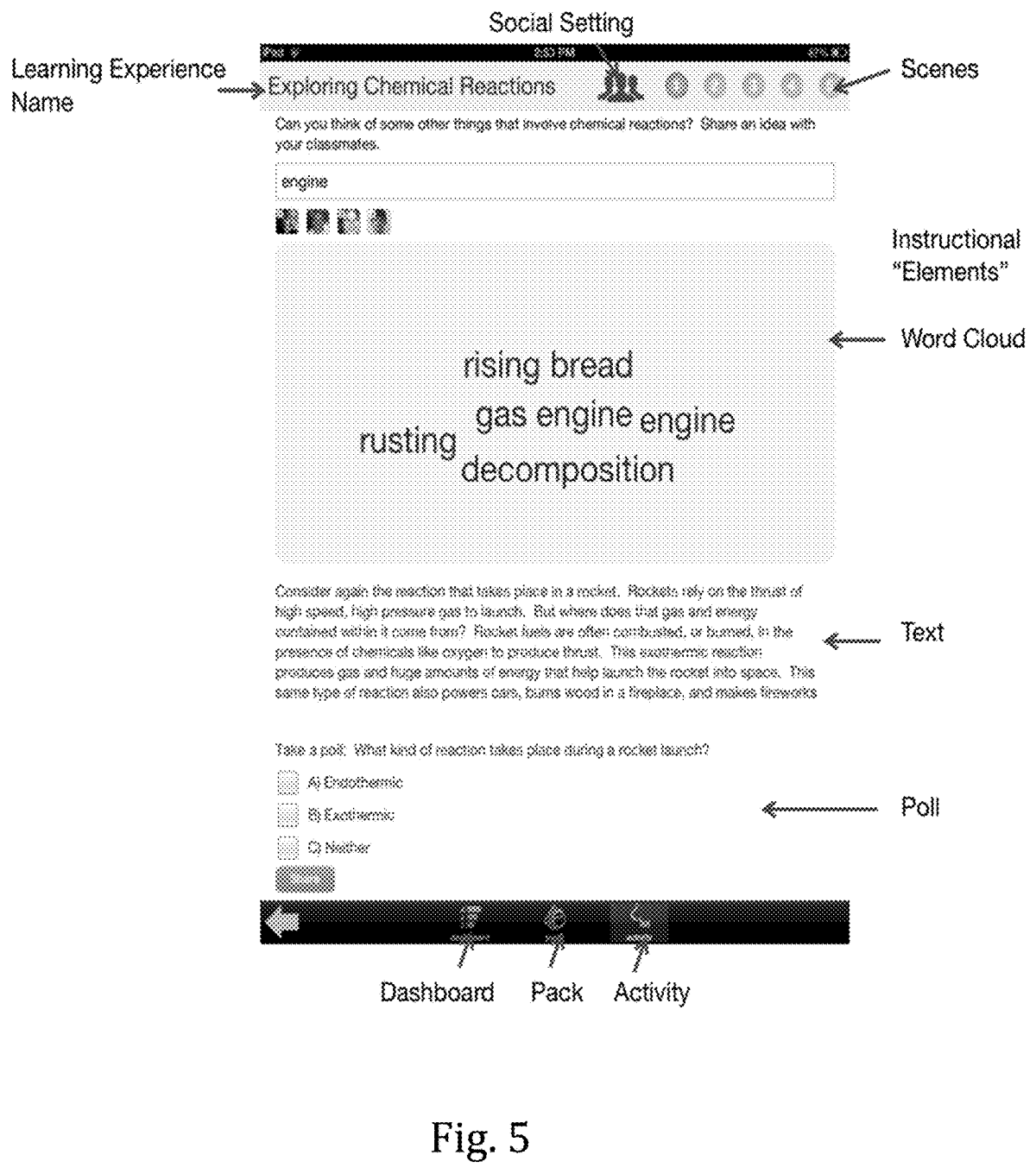

FIG. 5 is an example GUI for an example activity in a learning experience according to a preferred and non-limiting embodiment. Referring to FIG. 5 and FIGS. 1A-C, 3, and 4, an activity 300 may comprise scripting sharing configurations that enable scripting of aspects of an instructional flow. The scripting sharing configurations determine who a student 112 may share information with for an element 302, e.g. a teacher 111 or a class, and who a student 112 may share information as for the element 302, e.g. an individual answer, or on behalf of a group that the student is working in, etc.

An activity 300 may comprise one or more gated elements. "Gating" refers to holding back information until a task or event has been completed. The completion of an event may include, for example, a single student answering a question element, a group of students completing a collaborative element, or a teacher unlocking a next element in the learning experience.

An activity 300 may provide a post notification to a user 101 that indicates that another user 101 has input data to an element 302 in the learning experience when the user is not actively viewing the element. In a dynamic, social atmosphere, users 101 may want to see when other users have posted new things, e.g., text, images, videos, etc. The post notification framework of the activity notifies users 101 of other user's posts and a location of the post in the learning experience, e.g., an element 302 that the post is associated with in the learning experience. The activity 300 may further provide a commenting framework that sits "on top" of the learning experience activity, and that enables students 112 to write notes to themselves, ask questions of the teacher 111, regardless of media type: text, image, video, and variations.

Before describing in more detail scripting of share configurations, fundamentals of lesson plans and instructional flow are discussed. Lesson plans are a blend of content and instructional flow. Lesson plans are generally teacher-facing documents, (e.g., recipes for delivering a lesson), because lesson plans describe an instructional flow that has varying social settings, e.g., transitioning from group work to individual work to class work. Scripting these social transitions has conventionally been complicated using conventional technology.

Figure 6:
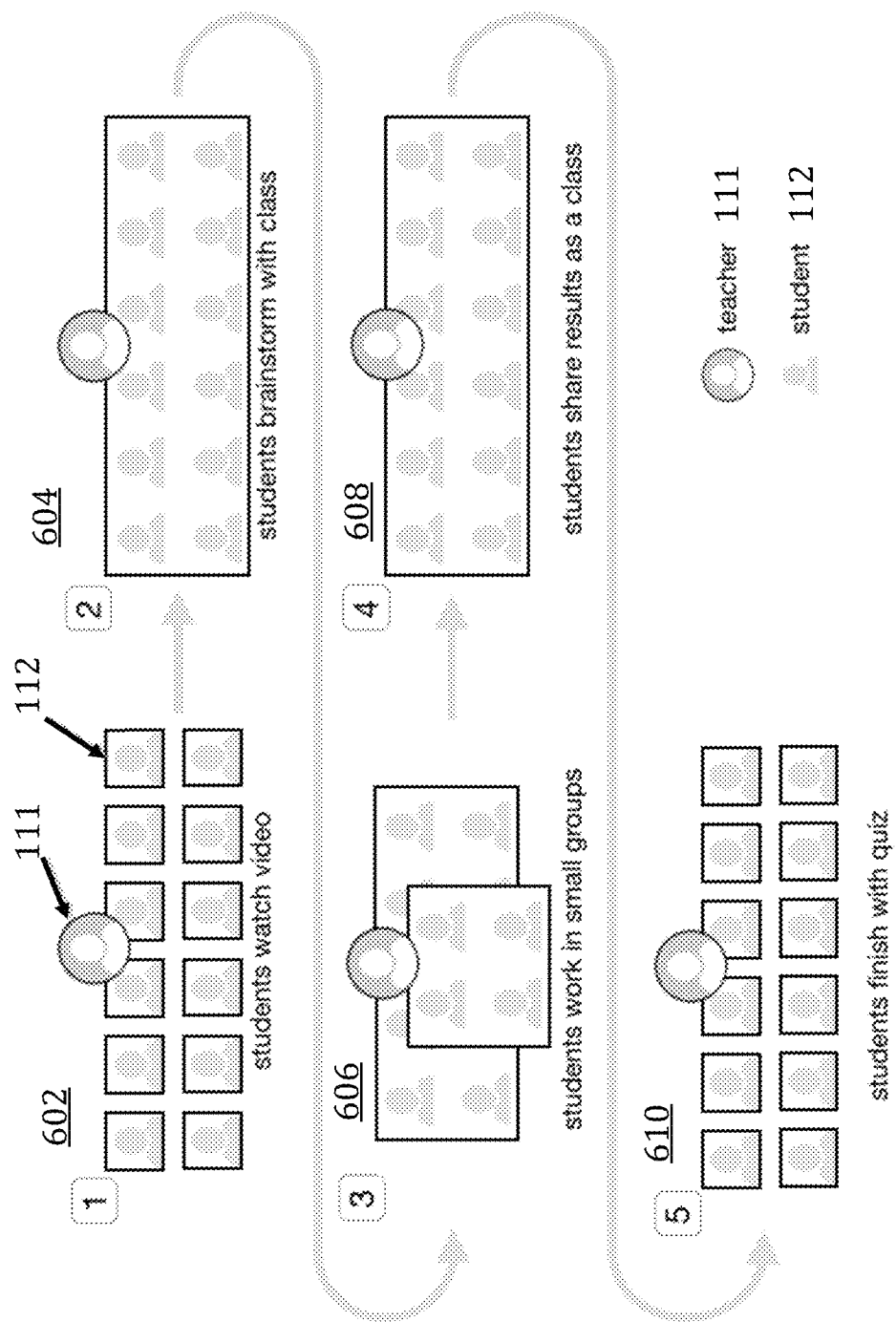
FIG. 6 is a flow chart of an example flow in a learning experience according to a preferred and non-limiting embodiment.

FIG. 6 is a flow chart of an example lesson flow according to a preferred and non-limiting embodiment. Referring to FIG. 6 and FIGS. 1A-C, 3, and 4, the system and method described herein provide content and instructional flow of a lesson plan and enable the lesson plan on 1:1 user computing devices 102 for use by various users 101, e.g., a teacher 111 and students 112. For example, for the lesson flow process shown in FIG. 6, in stage 602, students 112 may receive and access a short video to introduce topic XYZ. The students may be associated as a class in stage 602 such that the video element for the short video is presented to each of the students 112 in the GUI. In stage 604, the students 112 may brainstorm and share with the class what they already know about the topic XYZ via a sharing element in the GUI. The students 112 may be associated or grouped with the class in stage 604; however, the students 112 may individually provide user input to the sharing element in stage 604, e.g., the input from each student 112 is considered as from that student as an individual and not representative of the class as a whole. In stage 606, a next element or elements in the learning experience may divide the class into smaller groups of students, and the smaller groups of students may work on a project together within their respective groups to learn more about topic XYZ. The groups of students may share a finding back to the class in stage 608 via another sharing element, and the teacher 111 may review with the class of students 112 the findings from each group. For stage 608, user input from any student 112 in a group is considered as being from the student's group, e.g., the input from each student 112 is received as an input from the group and not the student 112 as an individual. In stage 610, the students 112 may take a short quiz, assessing their new understanding of topic XYZ, for example, by accessing one or more quiz elements providing a quiz via the GUI to the students 112.

The content (topic XYZ) in the example discussed above with respect to FIG. 6 is not limited to any particular subject. Many conventional technologies enable the distribution of content. However, the flow for the lesson plan enables students 112 to begin with an individual activity of consuming content (watching a video), brainstorm with the entire class, collaborate in small groups, take the result of the small group work and share that with the class, and finish with another individual activity, taking a quiz. All of this occurs under the guidance of a teacher 111. Instructional flow thus enables social settings to change as the lesson plan or learning experience progresses.

The system and method described herein enable scripting of content and instructional flow through a combination of elements, such as, media display elements, (e.g. video), collaboration elements, (e.g. a wall), and assessment elements, (e.g. a multiple choice question), combined with sharing configurations and requirements.

Figure 7:
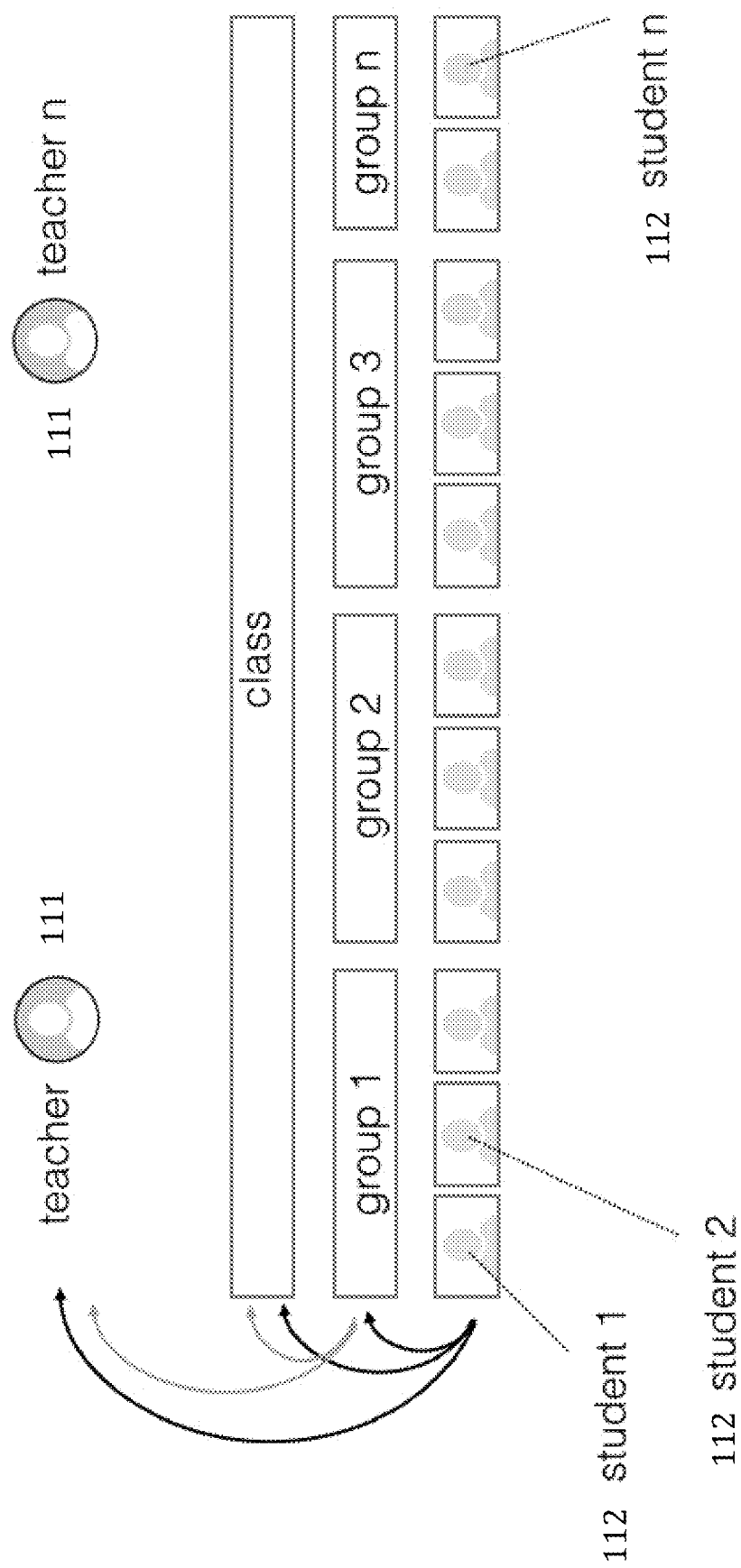
FIG. 7 is a block diagram of an example sharing configurations in a learning experience according to a preferred and non-limiting embodiment.

FIG. 7 is a block diagram of example sharing configurations in a learning experience according to a preferred and non-limiting embodiment. Referring to FIG. 7 and FIGS. 1A-C, 3, and 4, sharing may be configured at the element level. Examples of various sharing configuration are individual student to teacher sharing, e.g., a student submitting a sketch to the teacher via a drawing element for review, or submitting the answer to an assessment element question; individual student to class sharing, e.g., a student submitting a brainstorming result via a word cloud element; individual student to group sharing, e.g., a student sharing data from an experiment to other members of the group, via a collaborative table element; group to teacher sharing, e.g., a student submitting a document to a teacher on behalf of his or group; and group to class sharing, e.g., a student sharing a document to the class on behalf of the group.

A sharing configuration for each element 302 may be configured "ahead of time", during the authoring of the learning experience, as opposed to some social networks which allow individual posts to be shared with different groups as singular events in real time. Alternatively, or additionally, a sharing configuration for each element 302 may be modified by a user 101, typically a teacher 111, during configuration of a learning experience or during usage of a learning experience.

FIG. 8 is an example GUI for an individual sharing to a teacher, class, or group according to a preferred and non-limiting embodiment. Referring to FIG. 8 and FIGS. 1A-C, 3, and 4, an individual may share input to the teacher, class, or a group via an element configured for sharing to the teacher, class, or group. For example, a student may post some form of data, e.g., a drawing, table, text, image, audio file, etc., and the data is shared to others according to the learning experience share setting of the element through which the data is shared. An individual student may edit or delete his or her post, and a teacher may do the same. A teacher may change the share setting for the element 302, whether it be an element for a text post, image post, table post, or any collaborative element post. For example, as shown in FIG. 8, individual student data may be presented in a table element that organizes the input in a table format.

Figure 9:
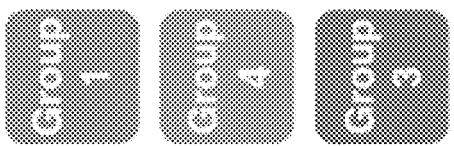
FIG. 9 is an example of a GUI for a group of users sharing to a teacher or class in a learning experience according to a preferred and non-limiting embodiment.

FIG. 9 is an example GUI for a group of students sharing to a teacher or a class according not a preferred and non-limiting embodiment. Referring to FIG. 9 and FIGS. 1A-C, 3, and 4, in an example where three students make up Group 1 (student 1, student 2 and student 3), three more students make up Group 2 (student 4, 5 and 6), etc. Each Group may be tasked with working together to perform an experiment and record the data observed by the group. This scenario may most likely be a face-to-face collaboration, where students work together in a classroom. The collaboration may be virtual asynchronous. If the share setting on the element for receiving the observed data is configured to share from a group, and share to the class, any student in Group 1 (student 1, student 2 or student 3) may submit data on behalf of his or her group to the class. Any student in Group 2 (student 4, 5 and 6) may submit data for his or her group to the class, and so on. Data submitted is sent to the teacher 111 and the other students 112 in the class through the element 302, and the user input including the data is credited to each member of the group as having been submitted. Any member of the group may be able to edit or delete a group post. A teacher 111 may edit, delete or change the share setting of a group post.

Figure 10:
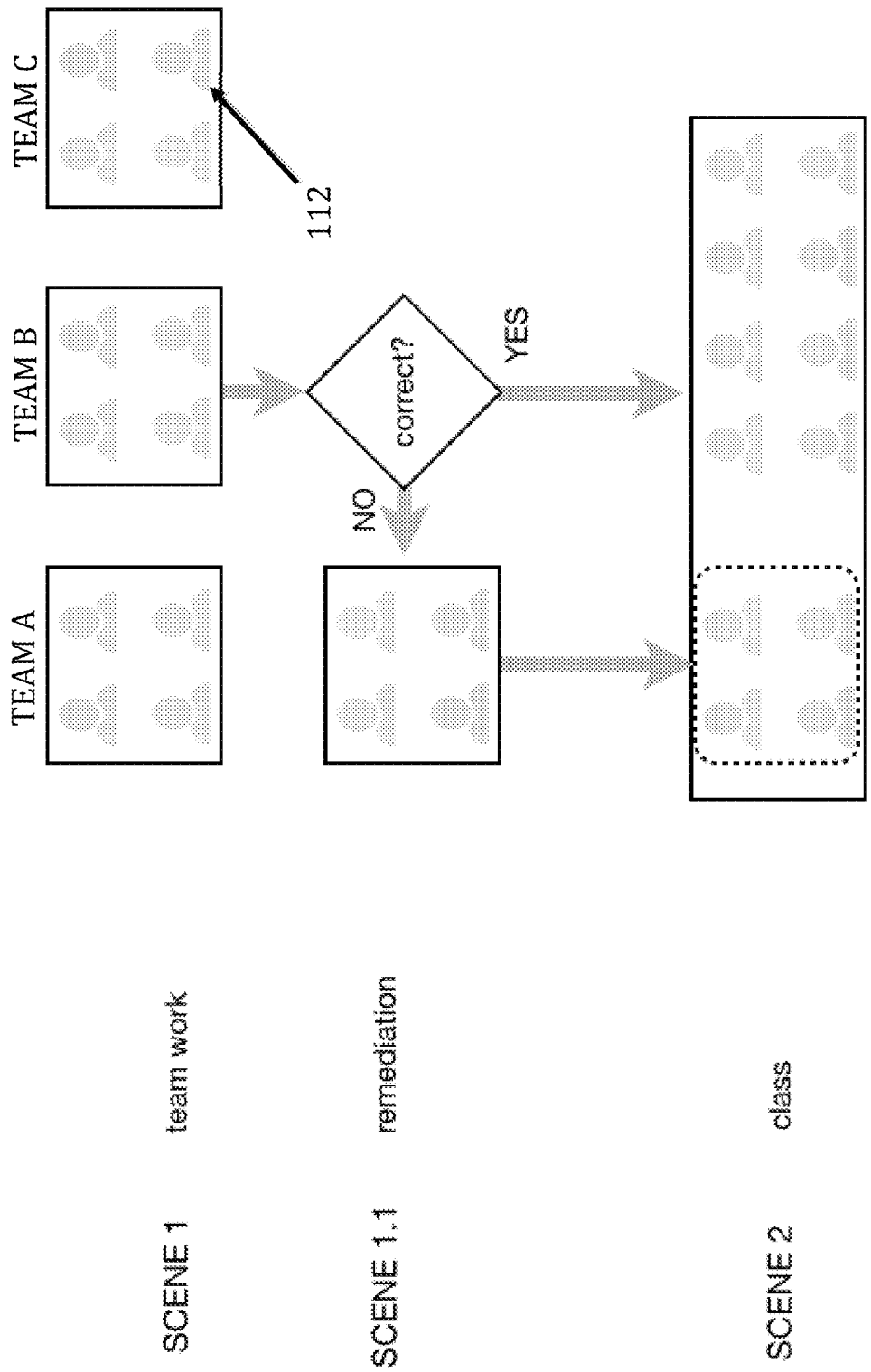
FIG. 10 is a flow chart of an example flow in learning experience according to a preferred and non-limiting embodiment.

FIG. 10 is a flow chart of an example flow according to a preferred and non-limiting embodiment. Referring to FIG. 10 and FIGS. 1A-C, 3, and 4, by using a conditional workflow engine, the flow of instruction in a learning experience may be dynamic, e.g., based on social conditions. Social workflow may be altered based on single-user or collaborative events. For example, referring to FIG. 10, if a problem with several correct solutions is given to three different teams/groups A, B, and C, in stage 1000, each team/group is presented with the problem and asked to solve the problem via one or more elements. If a team/group solves the problem correctly and inputs the solution correctly to an associated input element, the team's solution is made available to the entire class in stage 1002 via one or more elements, and a class discussion of solutions may occur. If a team/group does not solve the problem correctly or does not input the solution to the problem correctly to the input element, the students in the team/group are routed to some extra materials and activities provided by one or more elements in stage 1001 to help the team/group rethink the solution. The team/group may be provided an opportunity to update the solution via the one or more elements presented in stage 1001 before presenting the solution to the class. Each embodiment discussed above with respect to FIG. 10 stage may comprise a scene in the learning experience; however, example embodiments are not limited thereto and a single scene may comprise the elements presented in the stages discussed above with respect to FIG. 10.

In the example of FIG. 10, it is possible that no teams/groups go to scene (or element) 1001. It is also possible that all teams/groups go to scene (or element) 1001. In another example, the first activity may be individual, and teams/groups may be formed based on a decision table. These are examples of social configurations changing based on performance, social, other data and associated decision trees.

Figure 11:
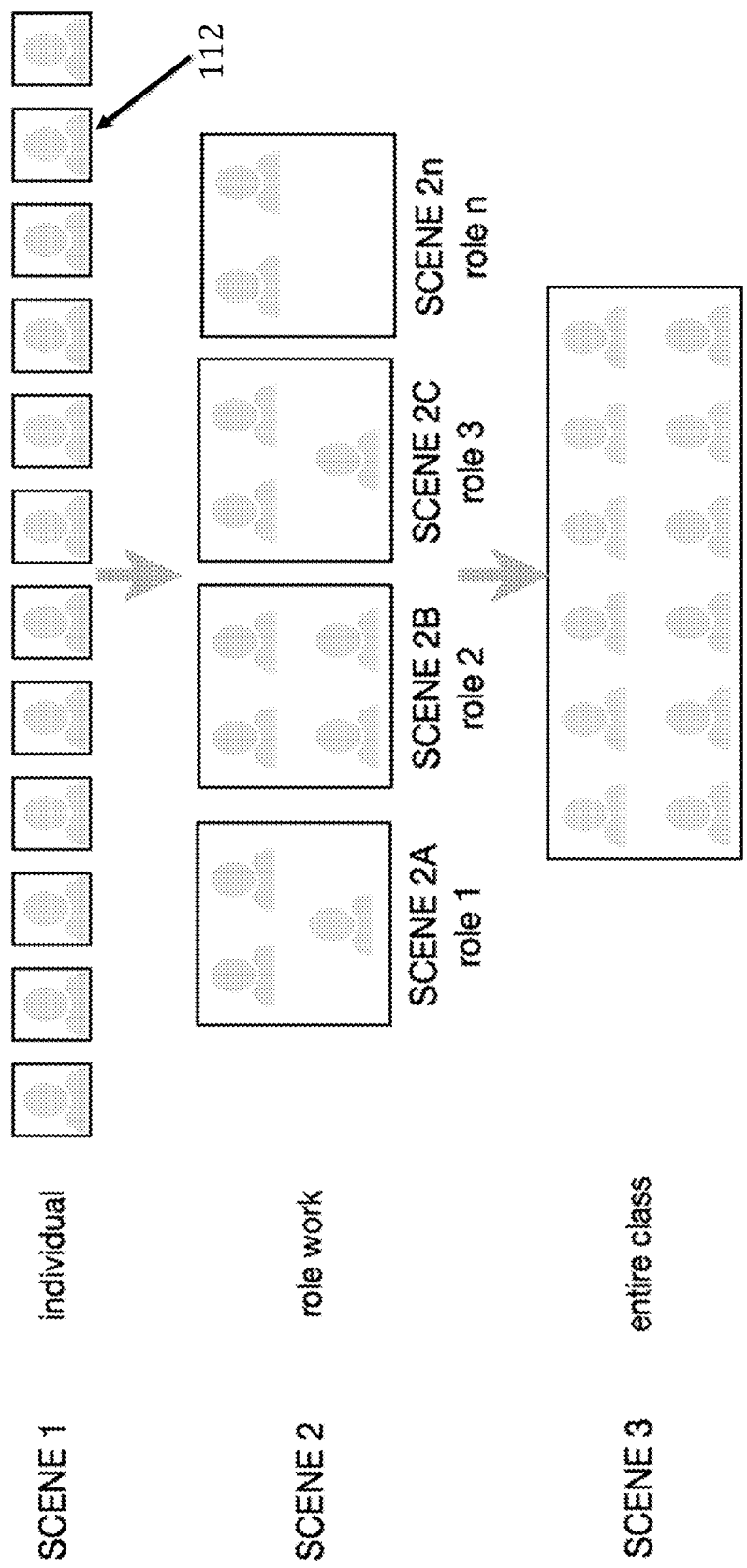
FIG. 11 is a flow chart of another example flow in a learning experience according to a preferred and non-limiting embodiment.

FIG. 11 is a flow chart of an example flow according to a preferred and non-limiting embodiment. Referring to FIG. 11 and FIGS. 1A-C, 3, and 4, instruction may be built around the concept of roles. For a given learning experience, teachers 111 may see one set of information, e.g., teacher notes, answer keys, etc., and students 112 may see another set of information. A learning experience may provide sub-roles to different students 112. When using instructional methods such as role playing or the case method, roles for the users 101 may be defined based on the learning methodology. The system and method described herein may deliver specific resources and activities to users 101 having specific roles within a learning experience.

For example, referring to FIG. 11, a role-play based learning experience may have separate materials or activities for each student 112 based on the role of the student. The learning experience may comprise a business learning experience, where different positions have different activities and information, such as CEO, CFO, COO, VP Engineering, etc. The learning experience may comprise a grade school experience, where students study the French Revolution and have roles, such as Royalty, Nobility, Bourgeoisie, Peasants, etc. The students 112 may learn some general background information in stage 1100 via one or more elements. In stage 1101, one or more elements 302 divide the students 112 roles so that the students 112 may perform specific activities based on the roles. In stage 1102, one or more elements 302 rejoin the students 112 as a class for a wider discussion and activities based on the knowledge they gained from the elements presented in stage 1101.

Figure 12:
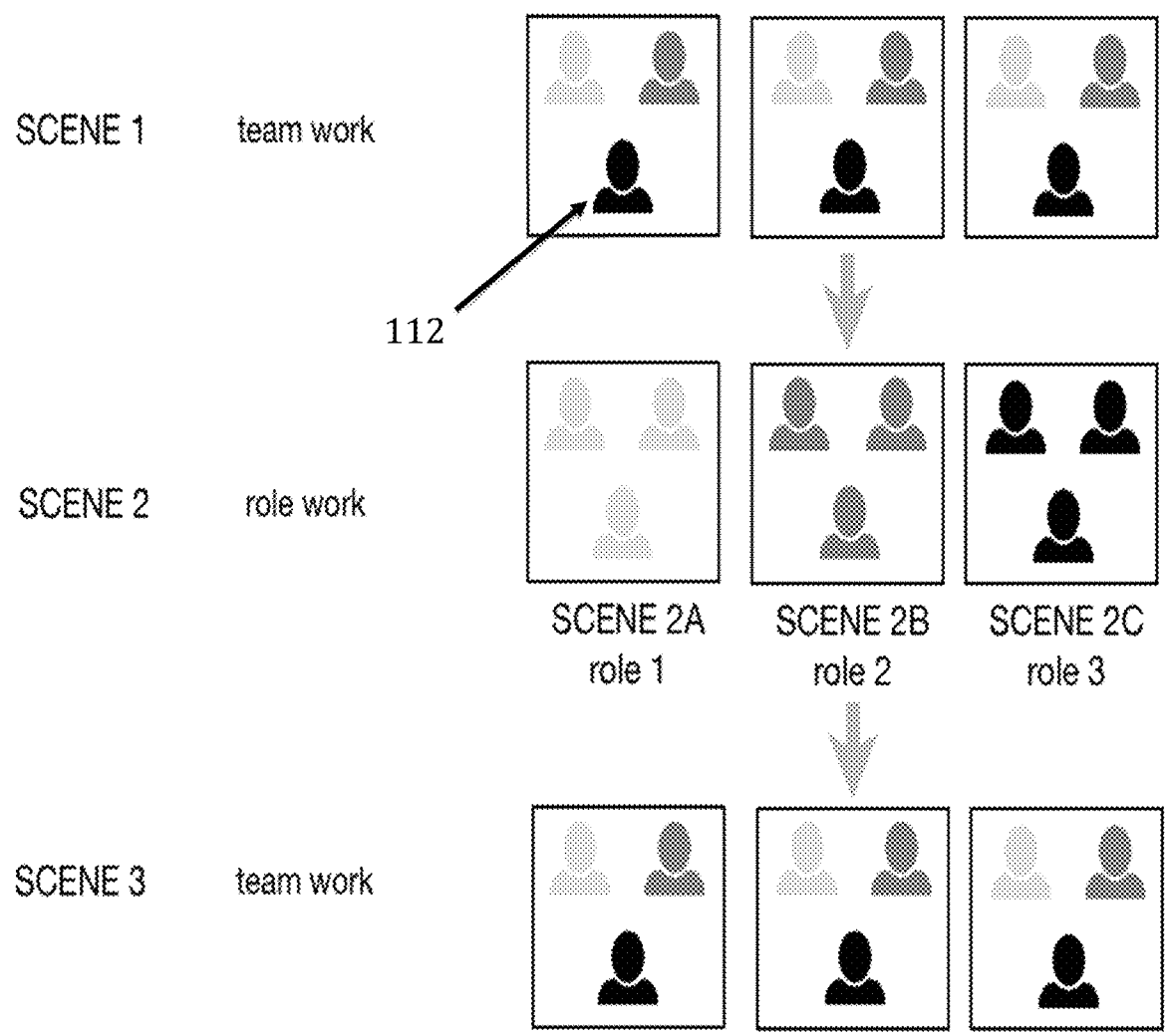
FIG. 12 is a flow chart of still another example flow in a learning experience according to a preferred and non-limiting embodiment.

FIG. 12 is a flow chart of an example flow according to a preferred and non-limiting embodiment. Referring to FIG. 12 and FIGS. 1A-C, 3, and 4, the flow may associate students together based on teams (or groups) and roles. For example, a classroom implementing the Jigsaw method may divide students based on teams/groups and roles. For example, extending the French Revolution role play example discussed above, each team/group may have a member of the Royalty, Nobility, Bourgeoisie, and Peasants. Each team/group may perform an activity using the perspective of their role for one or more elements in stage 1200. In stage 1201, one or more elements may divide each team/group up to perform an activity with other members of the same role so that the students 112 may gain more expertise through collaboration with other members of the same role. In stage 1202, one or more elements may associate the students 112 with to the original team/group so that each role may bring newfound expertise to the team/group.

Requirements and Gating

Requirements and responsibilities help define the instructional flow. For example, in a learning experience, a student may be asked to make a prediction before doing an experiment, or to solve a problem before viewing the answer. Requirements are part of the instructional flow, and must be satisfied by an individual student, a group of students, or the class in order to advance to a next element in the learning experience. The system and method described herein enable authoring and delivery of required student input in order to advance through a learning experience.

Figure 13:
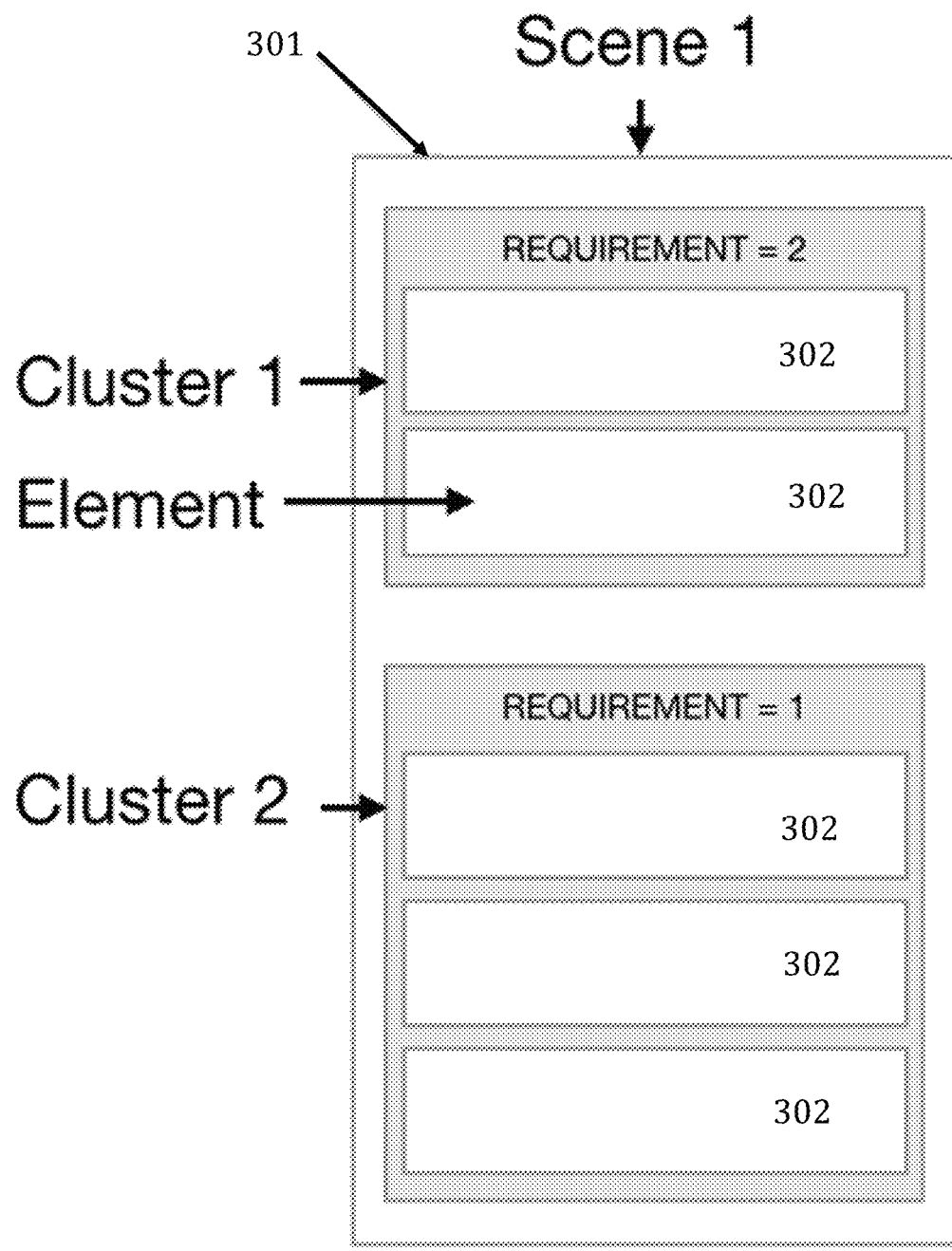
FIG. 13 is a block diagram of an example cluster of elements according to a preferred and non-limiting embodiment.

Certain elements may enable student input, e.g., a wall, a cloud, a choice, a draw, etc. When used within a scene, these elements may be required. In an educational setting, students 112 may be allowed to select which problems or questions they choose to answer, e.g., an option to answer one of the following three questions. In such cases, no single question is required nor are all questions optional. The student must answer one of the three questions to satisfy the requirement. A learning experience may comprise a cluster including a sequence of elements within a scene. All scenes may have at least one cluster, but more clusters may be added to a scene, for example, if some elements require student input, and others are optional. For example, referring to FIG. 13, an example scene is shown where a student is required to enter information into the first two elements, and has a choice of answering one of the following three elements. The scene comprises two clusters, the first with a requirement of two and the second with a requirement of one. In order to advance past the scene, a student needs to complete each cluster. If both clusters are satisfied, the next scene or element in the learning experience is unlocked, or, if there is no next scene or element, the learning experience is complete. Satisfying more than the required number of requirements in a given cluster may have no effect on the progress tracking or on any requirements in any other cluster.

An individual student may post on behalf of a group in which the individual student is a member. When posting on behalf of the group, each member of the group may immediately see the post credited as from the group, and each individual student receives credit for the post against his or her cluster requirements. For example, a group of students may be working together to measure the mass of an object, and post the mass into a table element. The students may measure the mass together in a face-to-face lab. One student from the group posts the mass in the table element, which is configured to accept data from the group. Upon posting the mass, each student in the group sees the post and receives credit for satisfying a requirement.

Similar to posting on behalf of a group, an individual student may post on behalf of the class. In this example, a single student post may satisfy a requirement for each student in the class. An example use case may be when a teacher wants to discuss a topic with the class, but one student is asked to record the outcome of that discussion. The recorded outcome is immediately shared with each student in the class, and each student in the class receives credit for the post. In order to advance from one scene or element to the next in the learning experience, a student must satisfy each cluster requirement. However, satisfying cluster requirements alone may not ensure that the student advances. If a learning experience has a teacher gate, a student may not advance without a teacher unlocking the teacher gate.

Figure 14:
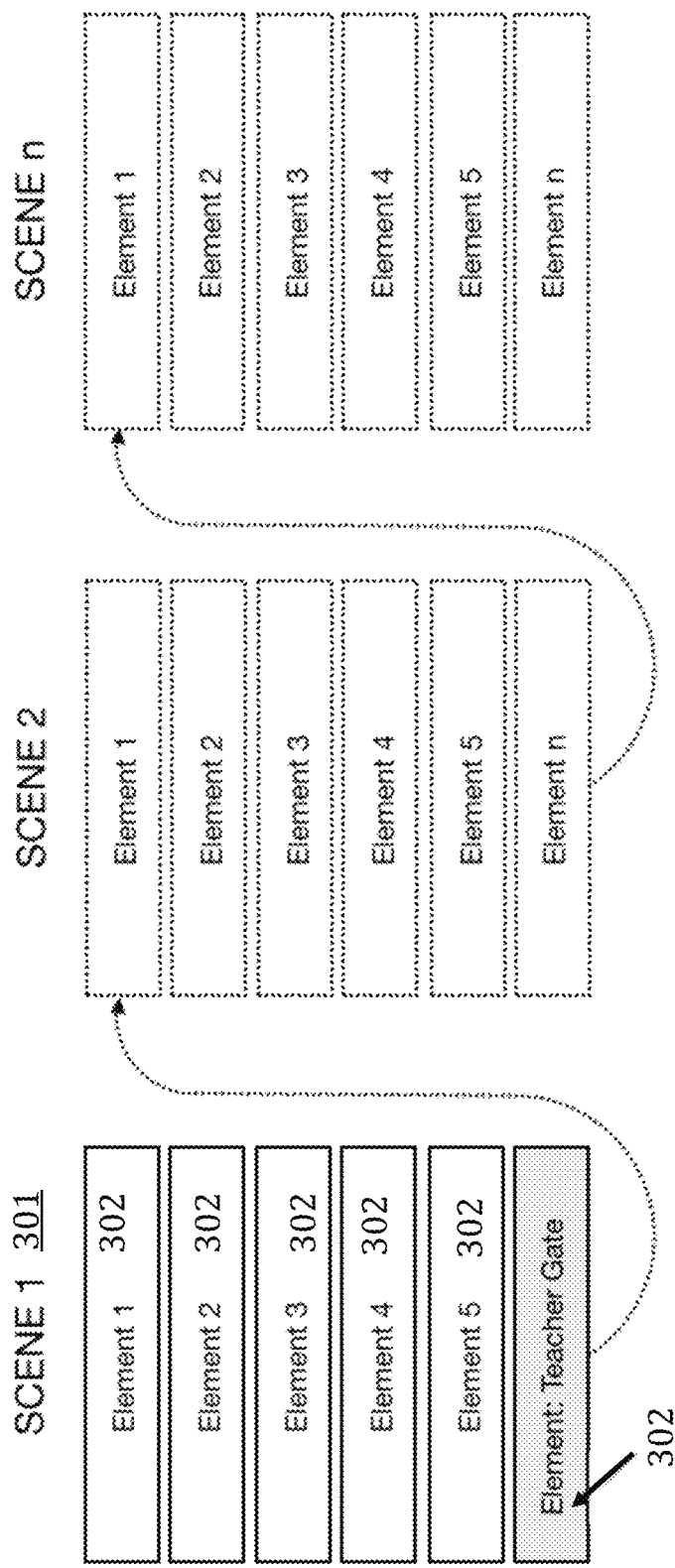
FIG. 14 is a flow chart showing an example of teacher gating according to a preferred and non-limiting embodiment.

FIG. 14 is a flow chart of an example of teacher gating according to a preferred and non-limiting embodiment. Referring to FIG. 14 and FIGS. 1A-C, 3, and 4, in order to advance from one scene or element to the next, a student must satisfy each cluster of requirements. However, this may not be enough to progress. A teacher gate requires a teacher 111 to provide some input to an element in the learning experience so that students 112 may advance to a next scene or element in the learning experience. Students 112 may not receive a next element until the requirement of the teacher gate is satisfied. If a teacher gate is present, a teacher needs to take an action, e.g., press a button, to release information to students or unlock a next scene or element. For example, when a teacher gate sits at the end of a scene, a teacher must unlock, e.g., by selecting in the GUI an option to allow the students to receive a next scene or element in the learning experience, the gate before students may move on to a next scene. Even though student navigation is restricted, a teacher may always navigate freely. With this functionality, it becomes possible for teachers to have touch-points with students, where the teacher may control when and if students move on. These touch points are instructionally useful in many cases, e.g. in between experimental setup and before experiment, so that a teacher may check setup; before a quiz, so that everyone starts together, etc. Teacher gates may unlock the whole class, or may be segmented to unlock a particular group or a particular student.

A teacher gate may enable a teacher 111 to hold a discussion while preventing users 101 from advancing in the learning experience to a next element or scene. When the teacher unlocks the teacher gate, e.g., by pressing an unlock button in the GUI presented to the teacher, the students may be related to the next scene or element. A teacher 111 may thus control a pace through a given learning experience, thereby maintaining an instructional atmosphere.

Figure 15:
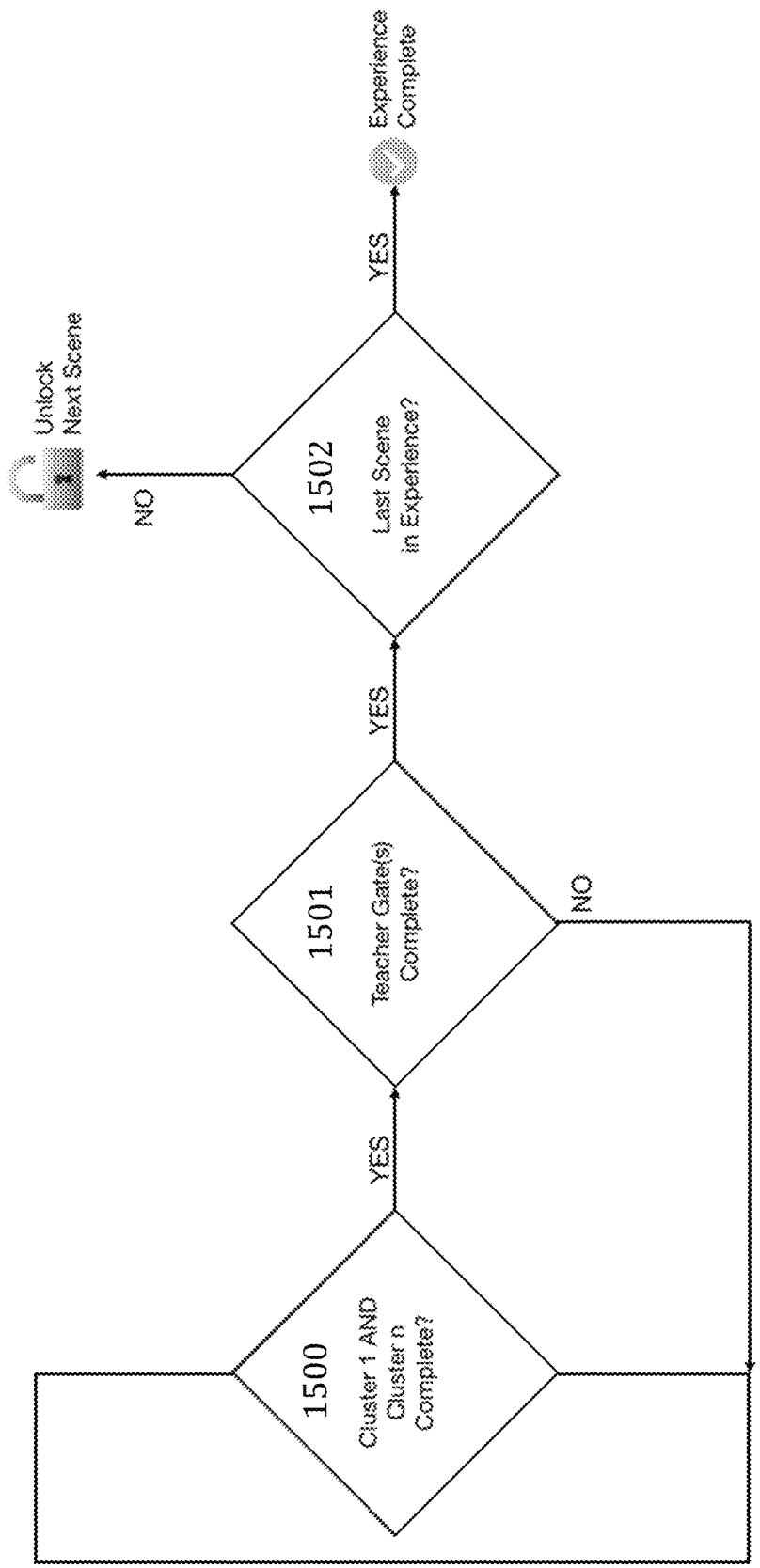
FIG. 15 is a flow chart showing an example flow in a learning experience according to a preferred and non-limiting embodiment.

FIG. 15 is a flow chart showing an example flow in a learning experience comprising a teacher gate according to a preferred and non-limiting embodiment. Referring to FIG. 15 and FIGS. 1A-C, 3, and 4, if a teacher gate element is inserted at the end of a scene or an element, the requirement of the teacher gate element needs to be satisfied before a student may move to a next scene or element. An order of completion of the teacher gate before or after cluster requirements that must be satisfied by the students 112 need not matter. If cluster requirements are determined to be satisfied in stage 1500 and teacher gate(s) are determined to be satisfied in stage 1501, processing may progress to stage 1502 in which it is determined whether the learning experience is complete or to release a next scene or element to the student 112. If the cluster requirements and the teacher gate(s) are not satisfied in stages 1500 and 1501, processing remains in stages 1500 and 1501 until the cluster requirements and the teacher gate(s) are determined to be satisfied. Teacher gates may have the effect of hiding additional content to students until the teacher unlocks the additional content. For any given student, he or she may still have other requirements to satisfy, but with a teacher gate, a teacher may prevent students from advancing to content and activities that the teacher wants to save for later.

Teacher gates may be used to release information that need not be limited to end-of-scene usage, and this pacing and progress control provided by teacher gates may be used within a given scene or element. Scenes may be considered instructional entities. For example, a "Warm Up" exercise in a given learning experience is often better to encapsulate in one scene instead of breaking it up in to multiple scenes. A practice problem set may be more coherent if contained in one scene instead of broken into multiple scenes. In general, new scenes may be based on an instructional flow change.

Figure 16:
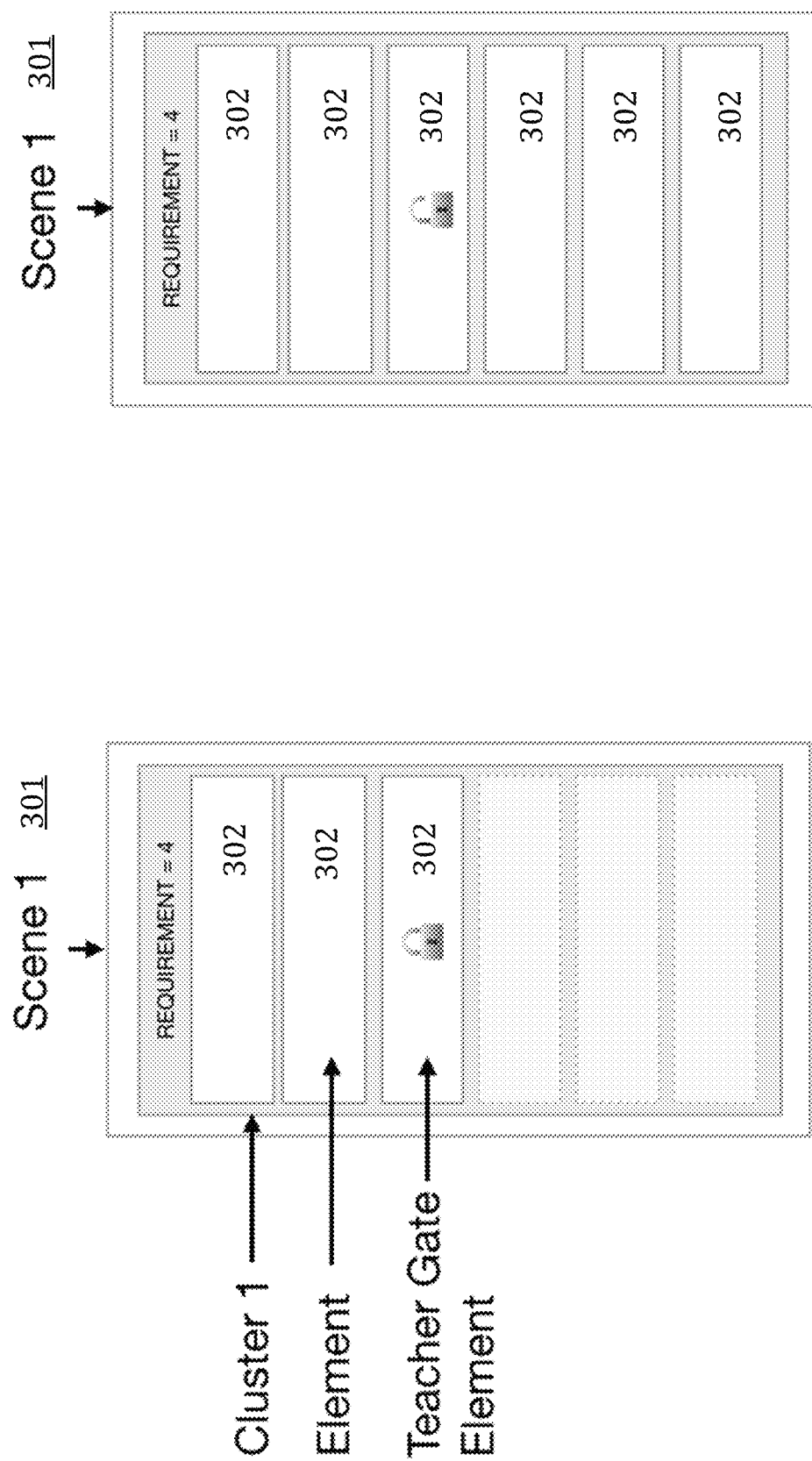
FIG. 16 is a flow chart showing another example flow in a learning experience according to a preferred and non-limiting embodiment.

Teacher gates may be used to release information that may reveal content and activities to students within a given scene. FIG. 16 shows an example of teacher gates revealing content and activities to students. Referring to FIG. 16 and FIGS. 1A-C, 3, and 4, a teacher gate element 1600 that is locked may hide or prevent the release of one or more or elements in a given scene or learning experience after the teacher gate element 1600. For example, as shown in FIG. 16 the teacher gate element 1600 that is locked may hide or prevent the release of each element in the scene or learning experience after the teacher gate element 1600. Once the teacher unlocks the gate, each element below the teacher gate element 1600 may be released to the student up to a next locked teacher gate. In order to exit to the scene, a student may need to complete some requirements as shown in the example of FIG. 16, and have the gate unlocked by the teacher. The requirements may be above or below the teacher gate 1600, or a combination of both.

Figure 17:
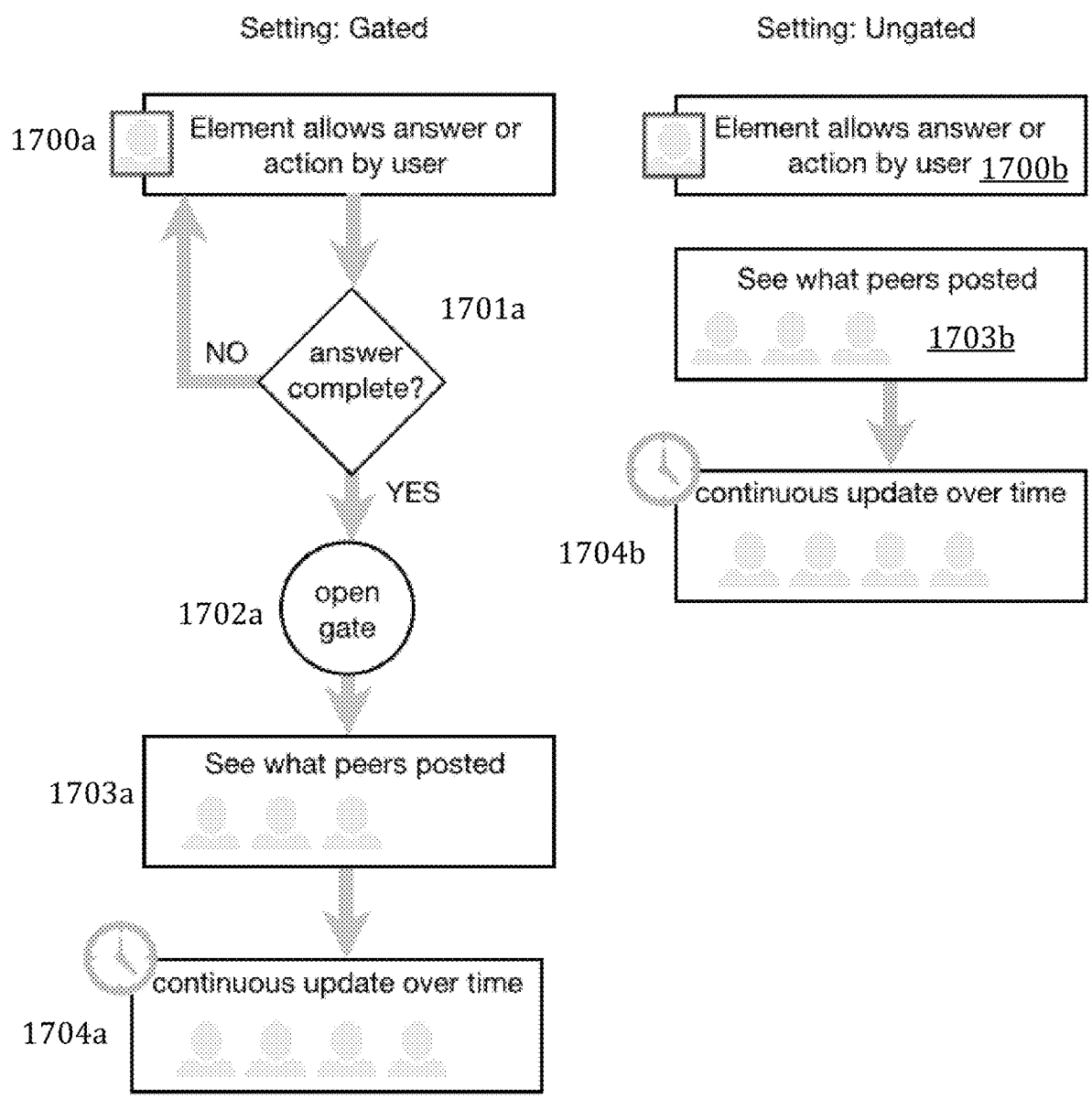
FIG. 17 is a flow chart showing an example of element level gating according to a preferred and non-limiting embodiment.

FIG. 17 is a flow chart showing an example of element level gating according to a preferred and non-limiting embodiment. Referring to FIG. 17 and FIGS. 1A-C, 3, and 4, at an element level, input elements may have an option for "gating." A user 101 or a group of users may need to submit an answer before viewing answers that other users have submitted, written, drawn, etc. based on the function of the element. Gating may be applied across all relevant elements in the context of a group, a class, or an individual. Element level gating may be applied at the individual, group, or class level. For example, for a word cloud element with individual gating, e.g., as shown on the left side of FIG. 17, a user may see a question. Prior to answering the question and sharing the answer, the user sees an input box in stage 1700a from the input element which enables an answer or action by the user 101. In stage 1701a, the element determines whether the user 101 completed the answer. If the user 101 is determined to have completed the answer in stage 1701*a*, the gate is opened in stage 1702*a* by the element. After an answer is shared, the rest of the class results that have been posted to date appear in stage 1703*a*, for example, as shown in the word cloud element illustrated in FIG. 18A. Over time, as more and more answers come in, the users who have answered the question and opened the gate may see the peer answers in stage 1704*a* as the answers are posted. The notification layer of the element may alert the user 101 to any answers that come in when the user 101 is not in the system, so that the user notices new information posted. The word cloud element may also be configured without gating, e.g., as shown the right side of FIG. 17. For example, in stage 1700*b* the element may enable an answer or action by the user 101. In stage 1701*b*, the user 101 may view peer responses before and after providing an answer or action in stage 1700*b*. Over time, as more and more answers come in, the users who have answered the question and opened the gate may see the peer answers in stage 1704*b*. A common example of a technology that is not gated is an ordinary discussion board, where all users may see discussion threads, regardless of whether or not a user posts to the board, because, in a discussion board, there is no requirement that a user post to be able to see what others have written.

Gating may be applied at the group level. FIG. 17 is described above with respect to an example where a student needs to input an answer before viewing what the class thinks, whether the answer is a word or phrase for a word cloud, a drawing, text, images, data, etc. The same logic may be applied to a group. Gating may be applied to collaborative elements. A discussion board, for example, may require that students input an answer before viewing the solutions previously added by other users 101 to the discussion board element.

A word cloud element, for example, as shown in FIG. 18A may display a word for each input by a user 101, for example, as described above with respect to FIG. 17. Words input more often by users 101 may be displayed in a highlighted manner compared to other words, e.g., in a larger font or a bolder font. A user 101 may select a word displayed in the word cloud element to view the user or users 101 that input the word. For example, a user image associated with the user or users 101 that input the selected word may be displayed in the word cloud element, and selecting the user image of a user 101 may enable a user 101 to view that user's profile or other information associated with that user in the learning experience. A word cloud element may be presented to a group instead of an individual user and have the same functionality as an individual word cloud element, but the individual profile is changed to group profiles. For example, a user 101 may select a word displayed in the word cloud element to view the group that input the word, as well as the individual users associated with the group.

Figure 18B:
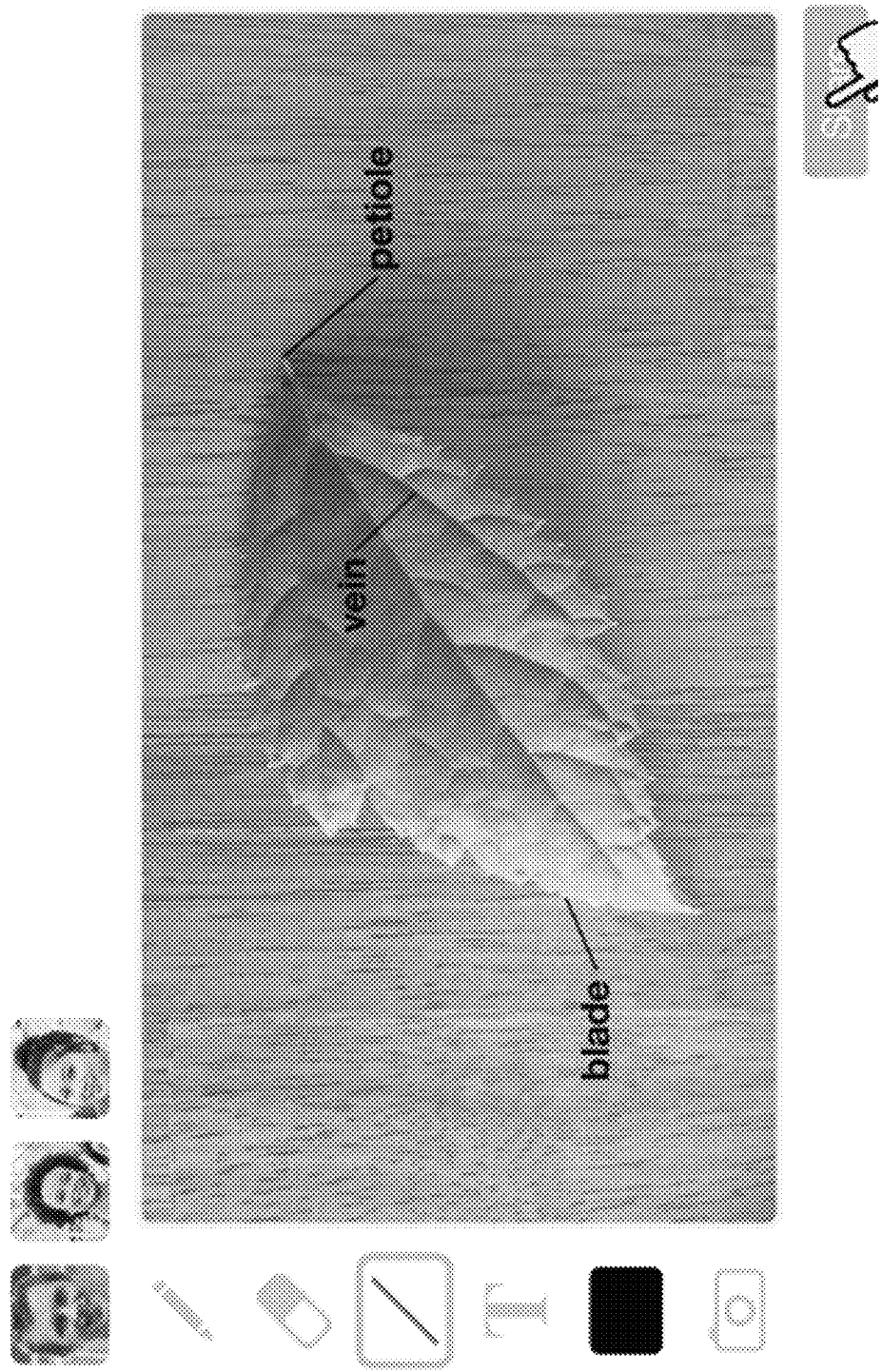
FIG. 18B is an example of a GUI of a drawing element presented to an individual according to a preferred and non-limiting embodiment.

Another type of collaborative element is a drawing element. FIG. 18B shows an example GUI of a drawing element presented to an individual user 101. A user 101 accessing the drawing element may use a drawing tool in the element to draw or edit one or more images. A drawing element may be a gated element. For example, a student 112 may be required to share his or her own drawing before the student 112 may view other students' work. A student 112 may view another student's work by selecting a profile image of another student, as shown in FIG. 18B. Similar to the word cloud element, a user 101 may select an image or annotation displayed in the drawing element to view the user or users 101 that input the image or annotation. The drawing element may allow a user to use a camera or webcam associated with a user device 102 to input an image, e.g., for a background, and the student 112 may annotate the image, e.g., as shown in FIG. 18B using the drawing tool.

Figure 18C:
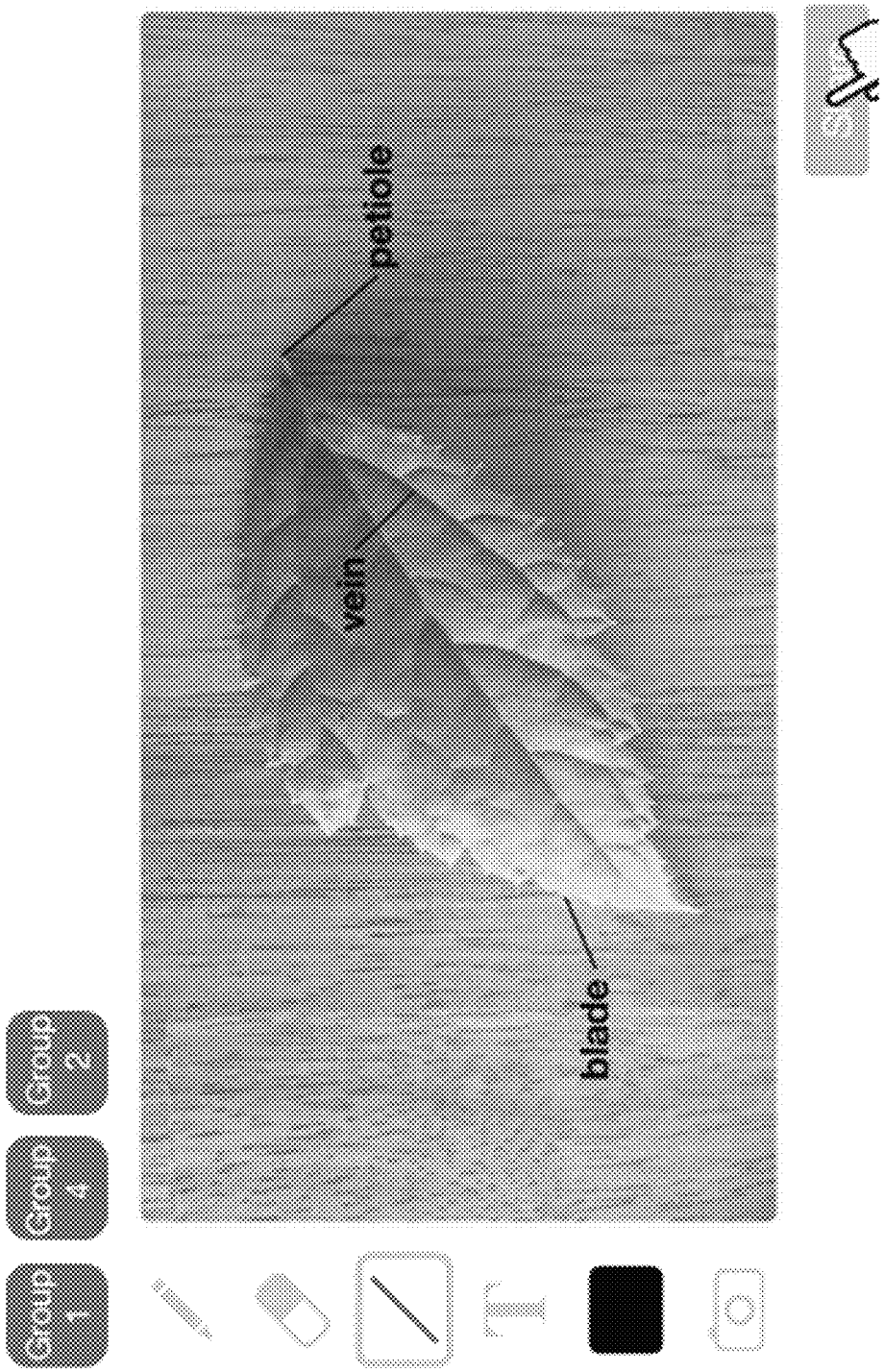
FIG. 18C is an example of a GUI of a drawing element presented to a group according to a preferred and non-limiting embodiment.

FIG. 18C shows an example GUI of a drawing element presented to a group. A drawing element presented to a group may have the same functionality as an individual drawing element, but the individual profile is changed to group profiles. For example, a user 101 may select an image or annotation displayed in the drawing element to view the group that provided the input, as well as the individual users associated with the group.

Figure 18D:
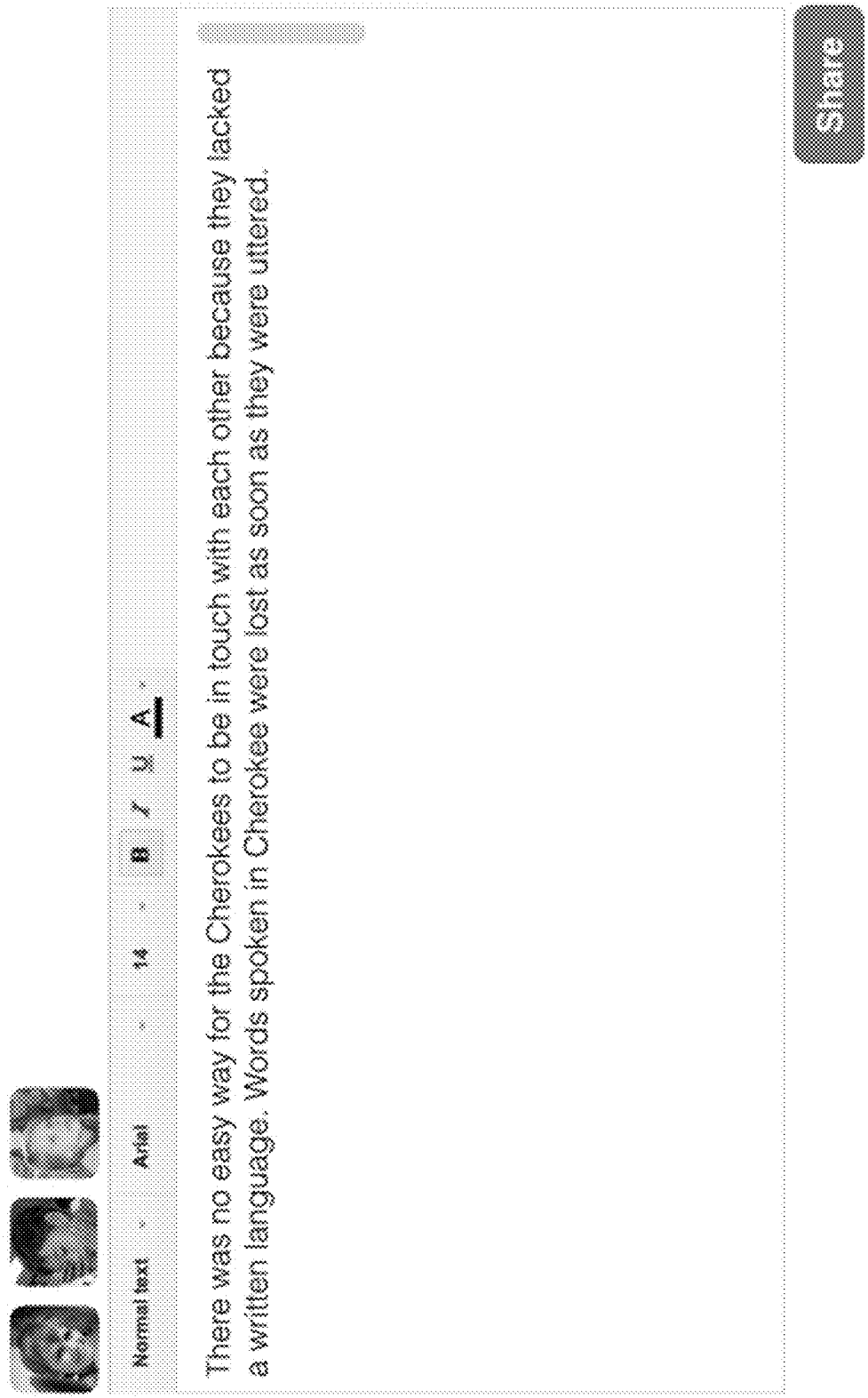
FIG. 18D is an example of a GUI of a writing tool element presented to an individual according to a preferred and non-limiting embodiment.

FIG. 18D shows an example GUI of a writing element presented to an individual. A user 101 accessing the writing element may use a writing tool in the element to enter or edit text. The writing element may be a gated element. For example, a student 112 may be required to share his or her own text before the student 112 may view other students' work. Similar to the word cloud element, a user 101 may select text displayed in the drawing element to view the user or users 101 that input the text. A student 112 may view another student's work by selecting a profile image of another student in the writing element. A writing tool may be presented to a group instead of a user and have the same functionality as an individual writing tool element, but the individual profile is changed to group profiles. For example, a user 101 may select text displayed in the writing element to view the group that provided the text, as well as the individual users associated with the group.

An element 302 may comprise one or more of a word cloud element, a drawing element, a writing element, a table element, etc. For example, an element 302 may enable users 101 to enter text and images which may be displayed in a word cloud.

Notifications

Content may be added to the learning experience by the students 112 in the class, or the teacher 111, not all content need come from the author 110 as part of the learning experience master. Users 101 may want to view new content from other participants in the learning experience and/or know when the new content has been added and a location of the new content in the learning experience.

A notification layer of an element 302 may notify the users 101 of new posts from other users 101 and a location of the new posts in the learning experience, e.g., the element 302 associated with the new post. When a user 101 inputs data into a gated element, posting the data may show no peer user input if no other users 101 have input any work. In asynchronous experiences, being notified of when something new happens, and where it happens, enhances the social nature of the experience. Certain conventional technologies have a fixed location for new information, typically at the top or bottom of a page, to provide a simple notification that indicates to the user that new information has been added. In contrast, in a system and method described herein, collaboration is embedded in the elements 302, and a position of an element 302 in a scene relative to other elements 302 may not be moved simply because a user adds new content to the element or scene. The position of an element 302 in a scene or a learning experience is based on the instructional flow, not on a time dependency of content included in or associated with the element.

The notification layer of an element notifies users 101 when new content is added to the element or when content associated with the element is modified. The notification layer of the element indicates a location of the new or modified content in the learning experience with respect to the element 302. The new or modified content may be displayed in context, as described in more detail below. The GUI may provide a dashboard that provides a display that indicates to the users 101 the presence of new or modified content and a location of the new or modified content in the learning experience.

For an example, a wall element that comprises a discussion board may be embedded in the flow of a learning experience. Many wall elements may be embedded in the learning experience. For a wall that has not yet been answered by a user 101, but that contains at least one peer user answer, the user 101 may need to answer a question provided by the wall element before seeing the answer posted by the peer user. Upon answering the question, the user 101 may view his or her answer and the answer of the other user that previously posted in the wall element. For a wall element that is previously answered by the user 101, and the user 101 leaves and later returns after other users have posted in his absence, the new posts from the other users are indicated as notifications to the user 101 in the GUI of presenting the learning experience. The user 101 may select a notification icon in the GUI, and the new posts from the other users may be revealed and highlighted so the user may view the new posts. This process may occur for all social elements in a learning experience, such that new posts by other users show notifications that may be selected in the GUI to view new content in the learning experience.

Commenting

The posts previously described may be part of an activity 300 itself. For example, an activity on persuasive writing may have students using a wall element (discussion) to discuss the pros and cons of students wearing school uniforms, prior to each student taking a position and writing a persuasive argument for or against the topic. Whereas this type of discussion is part of the activity, a commenting layer provides for discussion "on top of" the content.

Referring to FIGS. 19-34 and FIGS. 1A-C, 3, and 4, a system and method described herein may provide a unified framework for commenting on all media types in an overarching system. Text may be highlighted and annotated. Images may have "pins" placed in x,y space in the image, and be annotated. Videos may have "pins" placed in x,y,t space in the video, and be annotated.

The content to be annotated may be content included in the learning experience master, e.g., content supplied by the experience developer including text, images, videos, pdfs, etc. The content to be annotated may be user generated content, e.g., a series of images uploaded by a user 101, a wall discussion including text from multiple users 101, a document that multiple users 101 created collaboratively, etc. Any piece of content, whether authored by the learning experience (curriculum) author 110 or added by users 101, may be annotated using the commenting framework.

Commenting by users 101 may be performed in several modes. A note mode provides a private comment that is only visible to the user 101 that creates the private comment in the learning experience. A comment mode provides a public comment that may be shared with the entire class, the group, and/or the teacher of the given learning experience.

A comment may be viewed by a user 101 in context, e.g., by looking at one comment and the next based on the content that is commented upon. A comment may be viewed by a user in a list, e.g., by looking at each of the comments in a given scene or learning experience grouped together in a list. The list of comments, e.g., a comment panel in the GUI, may show which comments were made on text, images, videos, etc.

One challenge associated with commenting is that a user 101 may want to be able to sort through multiple comments quickly and efficiently. Additionally, a user may not want to clutter up the learning experience unnecessarily with multiple comments. The system and method described herein enable commenting across all elements as part of an underlying element framework. Many elements may feature the same interface for commenting, based on their underlying nature. Text presenting elements may have a text commenting interface to which a user 101 may enter a text comment. Image presenting elements may have an image commenting interface to which a user may enter an image as a comment. Examples of commenting on text oriented, image oriented and video oriented content is discussed in more detail below; however, commenting may be provided for other element types.

Figure 19:
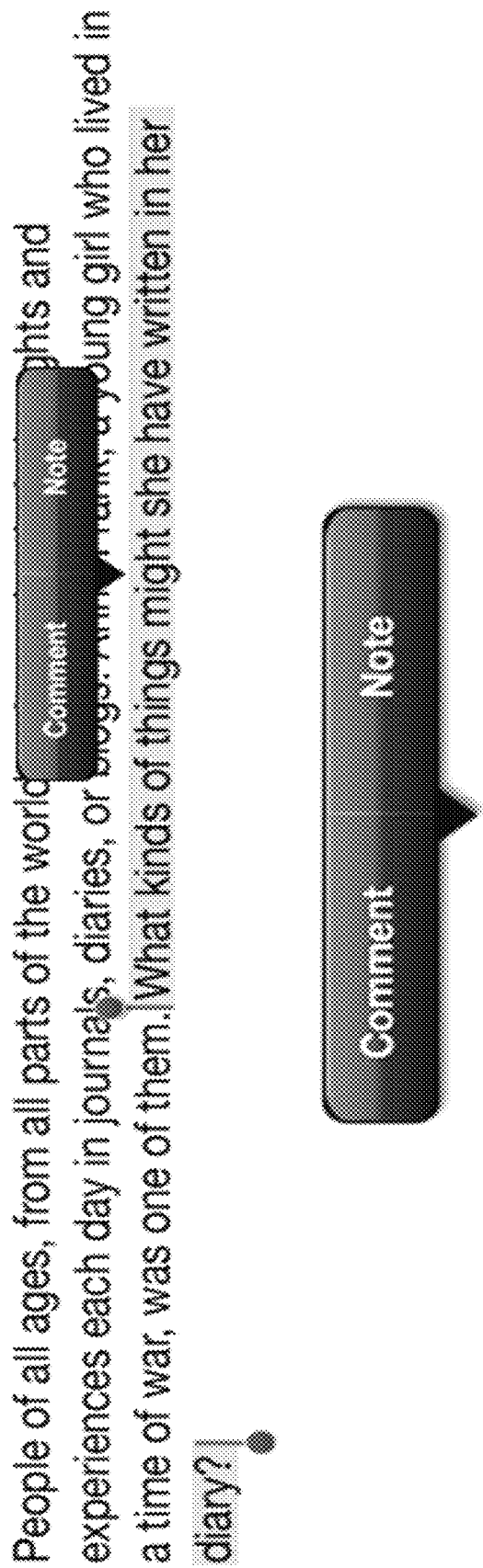
FIG. 19 is an example of a GUI of a commenting interface according to a preferred and non-limiting embodiment.
Figure 20:
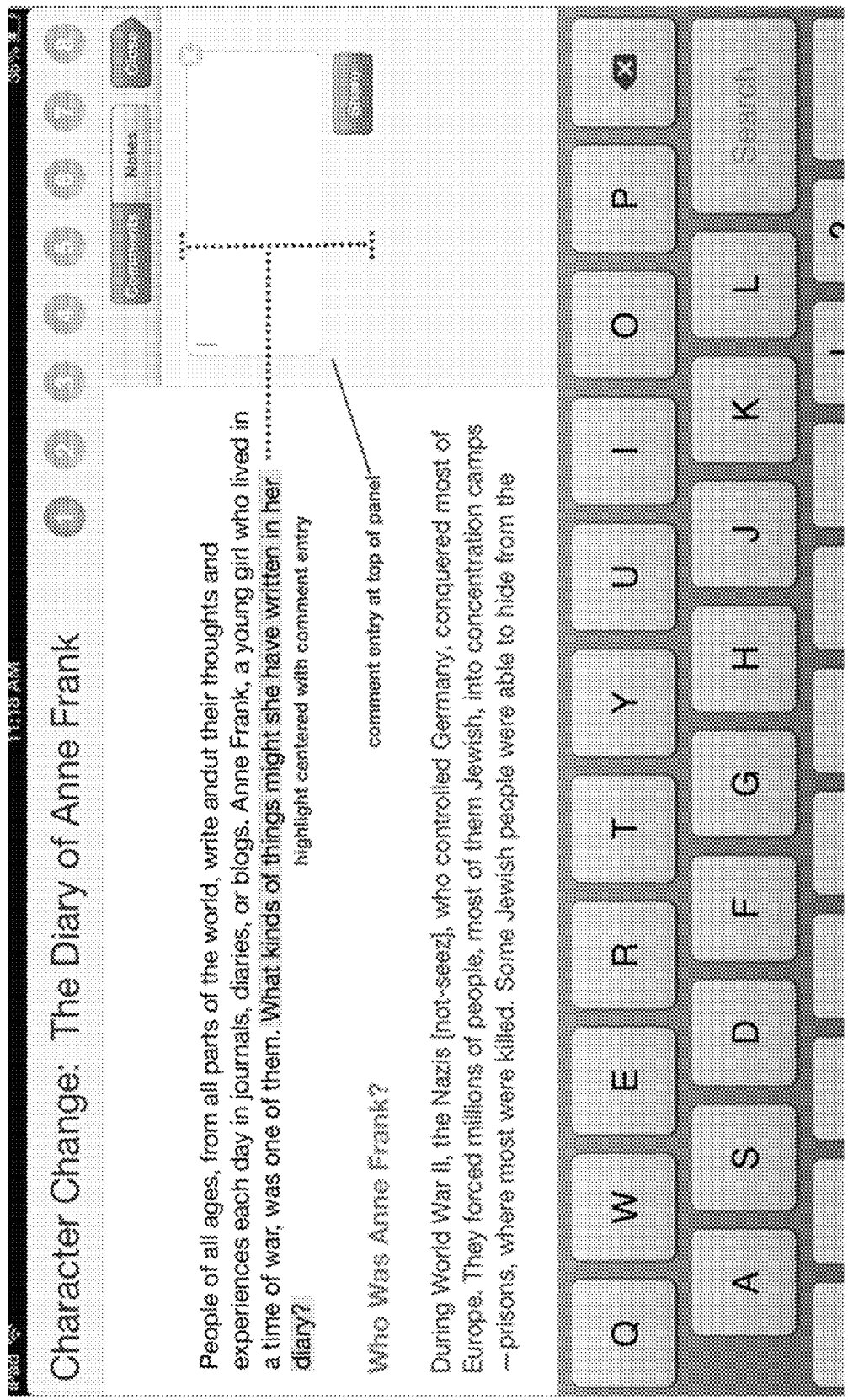
FIG. 20 is an example of a GUI of a commenting interface according to a preferred and non-limiting embodiment.
Figure 21:
FIG. 21 is an example of a GUI of a commenting interface according to a preferred and non-limiting embodiment.

For pre-existing text based comments, to input a comment, a user 101 may either select the text on which the user wants to comment, e.g., by double tapping or holding a cursor over the text in the GUI. Selecting the text for commenting may bring up a selection bar and a button panel as shown in FIG. 19. Selecting "Comment" in the GUI opens up a comment panel and creates a text entry box in the panel. A first comment may be placed at the top of the panel, and highlighted content may be shifted up such that the text entry box is in the center of the highlight, as shown in FIG. 20. The user may cancel the comment, e.g., by selecting the "X" in the upper right hand corner of the entry box in the GUI, or share the comment with other users in the learning experience by selecting the share button in the GUI. After the comment is shared to the other users in the learning experience, the comment may remain highlighted as an active comment. An nth comment in a series of comments for an element 302 may be placed in the order the nth comment is received. If a new comment is before all other comments, it is placed at the top. If a new comment is received after all the comments, it is located at the bottom. If a new comment is received between other comments, the new comment pushes lower comments down in the panel, and higher comments up, as shown in FIG. 21, in which a user requests to post a comment in a location between two existing comments. The existing comments move up and down respectively, to make space for the new comment.

For a comment on a text element, a position of the comment in the panel may be based on a start location of a highlight in the text associated with the comments. If two comments have a same start location in the text, a shorter highlight may be placed higher in the comment panel. If both comments highlight identical pieces of text, an earlier posted comment may be placed higher in the comment panel.

Figure 22:
FIG. 22 is an example of a GUI of a commenting interface according to a preferred and non-limiting embodiment.

A user 101 may edit the comments input by that user 101. For example, as shown in FIG. 22, a user 101 may select a comment in the GUI presenting the learning experience to activate the comment and select an edit button to edit the comment. When editing a comment, selecting a cancel button in the GUI returns the comment to a highlighted state, e.g., as shown in FIG. 21, and selecting a share button updates the comment with the edits and shares the updated comment with other users in the learning experience.

Figure 23:
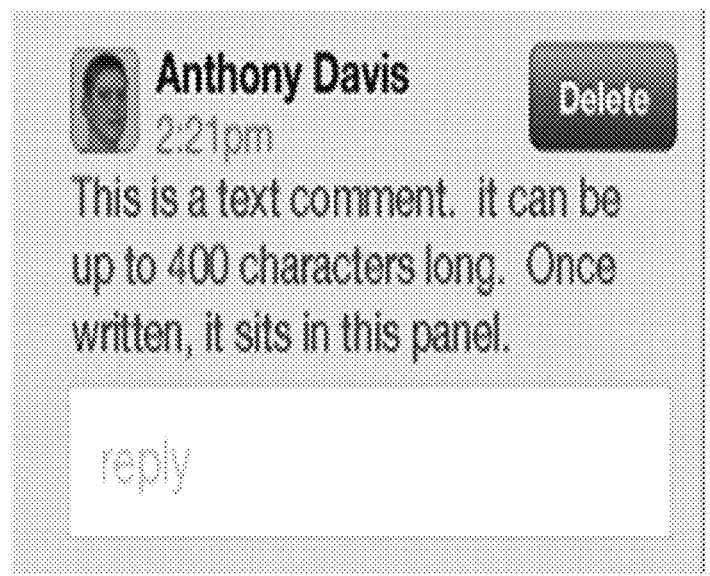
FIG. 23 is an example of a GUI of a commenting interface according to a preferred and non-limiting embodiment.

A user 101 may delete the comments input by that user 101 using a standard method such as right swiping on the posted comment in the GUI to bring up a delete button, as shown in FIG. 23. The edit button is replaced with a delete button in the GUI. Selecting the delete button removes the comment, and selecting an area outside the comment returns the comment to the edit state.

Figure 24:
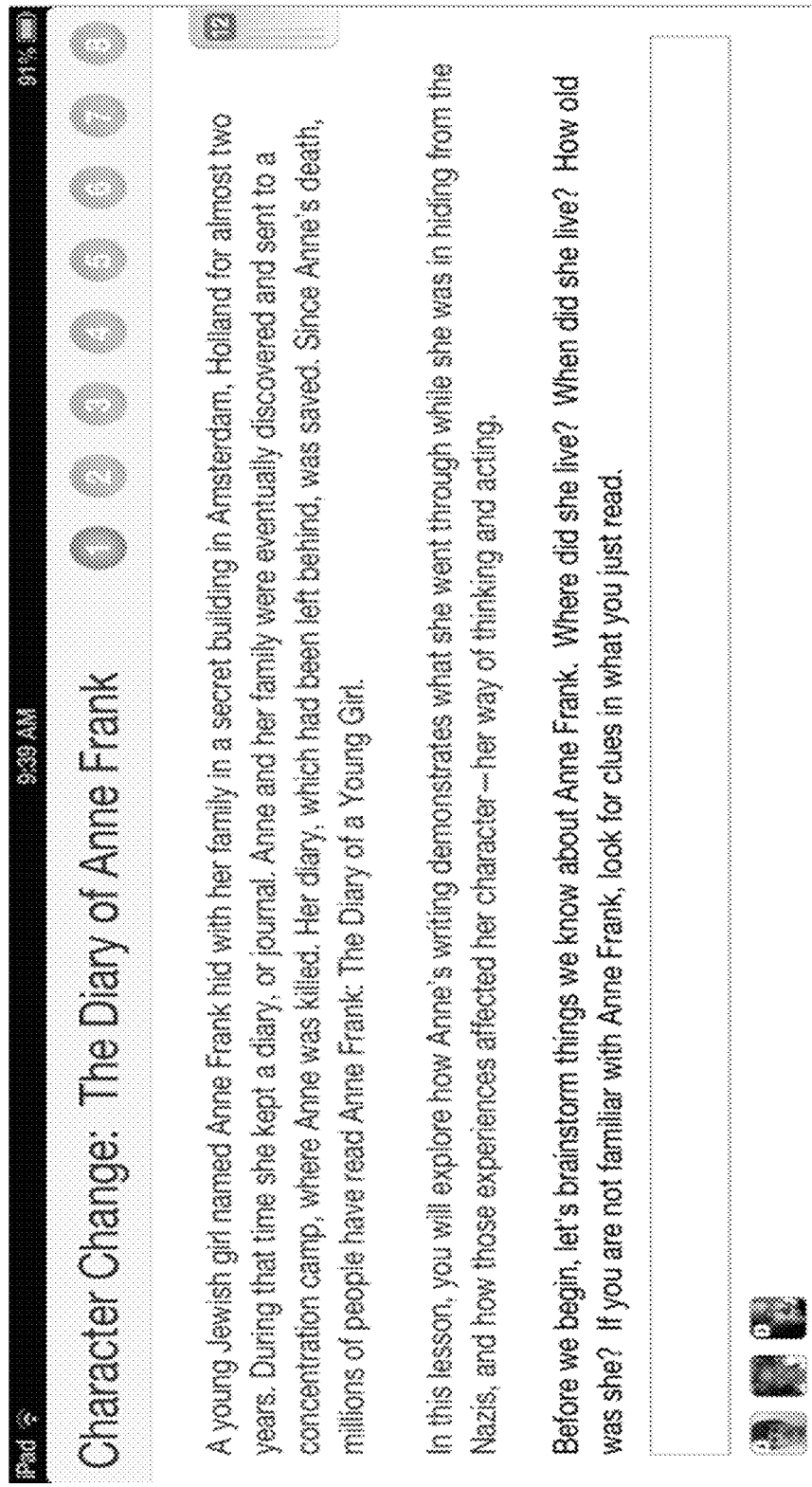
FIG. 24 is an example of a GUI of a commenting interface according to a preferred and non-limiting embodiment.
Figure 25:
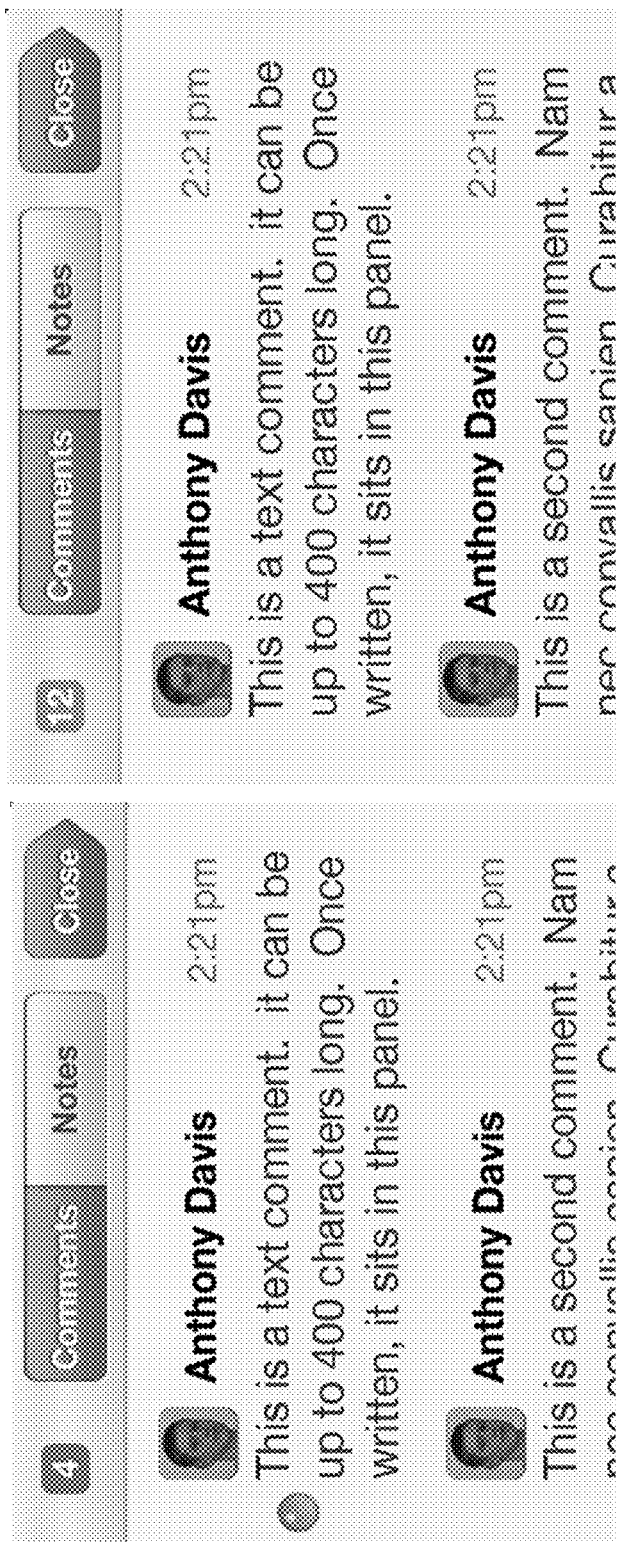
FIG. 25 is an example of a GUI of a commenting interface according to a preferred and non-limiting embodiment.
Figure 26:
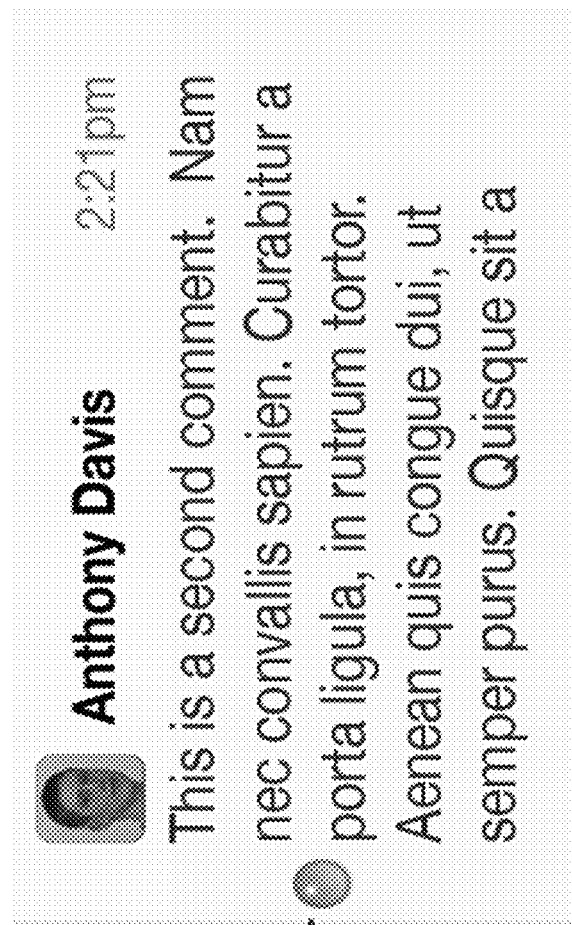
FIG. 26 is an example of a GUI of a commenting interface according to a preferred and non-limiting embodiment.
Figure 27:
FIG. 27 is an example of a GUI of a commenting interface according to a preferred and non-limiting embodiment.

FIG. 24 is an example GUI for when a user enters an experience and a comment panel is closed. As shown in FIG. 24, a panel handle may be located on a right hand side of the GUI. The panel handle shows a number of unseen comments. If all comments have been seen, no indication of the number of unseen comments is displayed. For example, the GUI shown in FIG. 24 provides a panel handle indicating that there are 12 unseen comments for a user 101. After the comment panel is open, the panel handle disappears from the GUI, because the comment information is represented in the comment panel itself, as shown, for example, in FIG. 25.

A comment is in an "unseen" status for a user 101 if the comment has not been viewed in context by the user 101. For example, a user 101 may view each comment in the comment panel by moving up or down through the comment panel, e.g., similar to swiping down through known email navigations without tapping on a comment to see it in context. This level of viewing a comment does not change the status of a comment to "seen." An "unseen" status indicator may comprise a dot placed at a vertical middle of the comment on the left hand side of the comment in the GUI, as shown, for example, in FIG. 26. The "unseen" status indicator enables each user to view the comment in context. To view a comment in context, a user 101 selects the comment in the comment panel in the GUI, which highlights the comment, shows a reply box, and shows the highlight with respect to the element 302 associated with the comment in the activity 300, as shown, for example in FIG. 27, and the content may move in the GUI such that the text is horizontally aligned with the comment.

Figure 28:
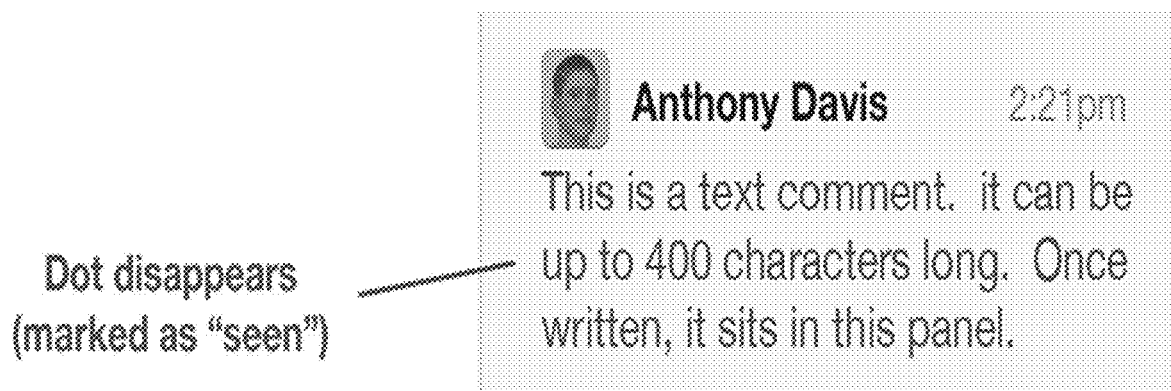
FIG. 28 is an example of a GUI of a commenting interface according to a preferred and non-limiting embodiment.
Figure 29:
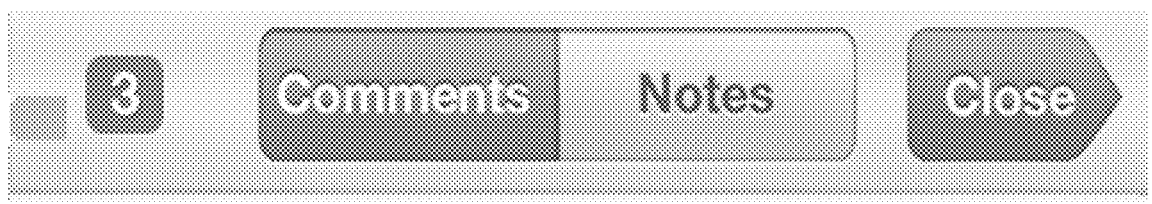
FIG. 29 is an example of a GUI of a commenting interface according to a preferred and non-limiting embodiment.

Selecting away from the comment in the GUI by selecting another comment returns the comment to a non-highlighted state, but with no indicator dot, as shown, for example, in FIG. 28. The unseen indicator drops by one, as shown in FIG. 29, and the user 101 may move through unread comments one-by-one to remove the marker and view each of the comments in context. If the user selects and holds the unread indicator, an alert may be displayed.

Figure 30:
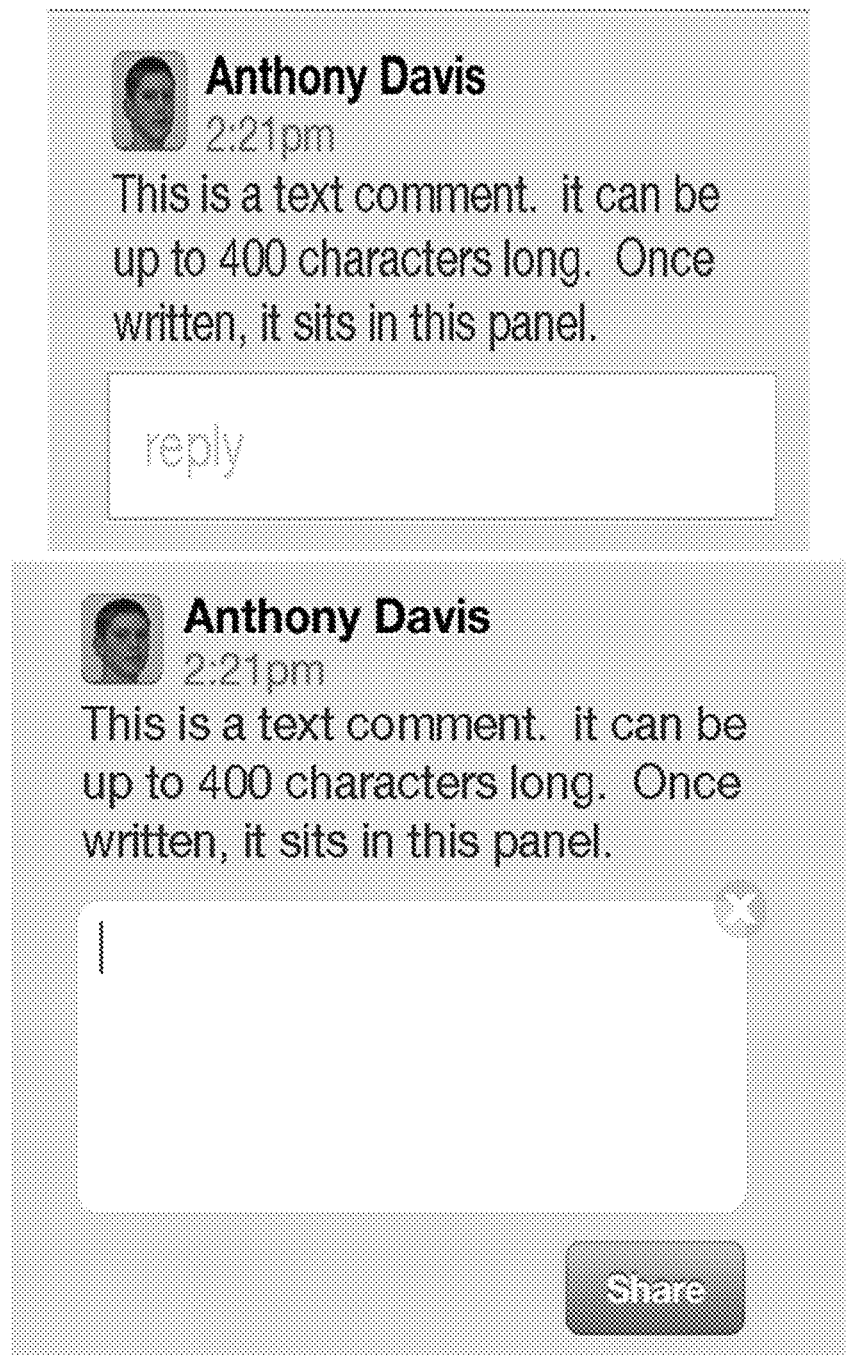
FIG. 30 is an example of a GUI of a commenting interface according to a preferred and non-limiting embodiment.
Figures 31, 32:
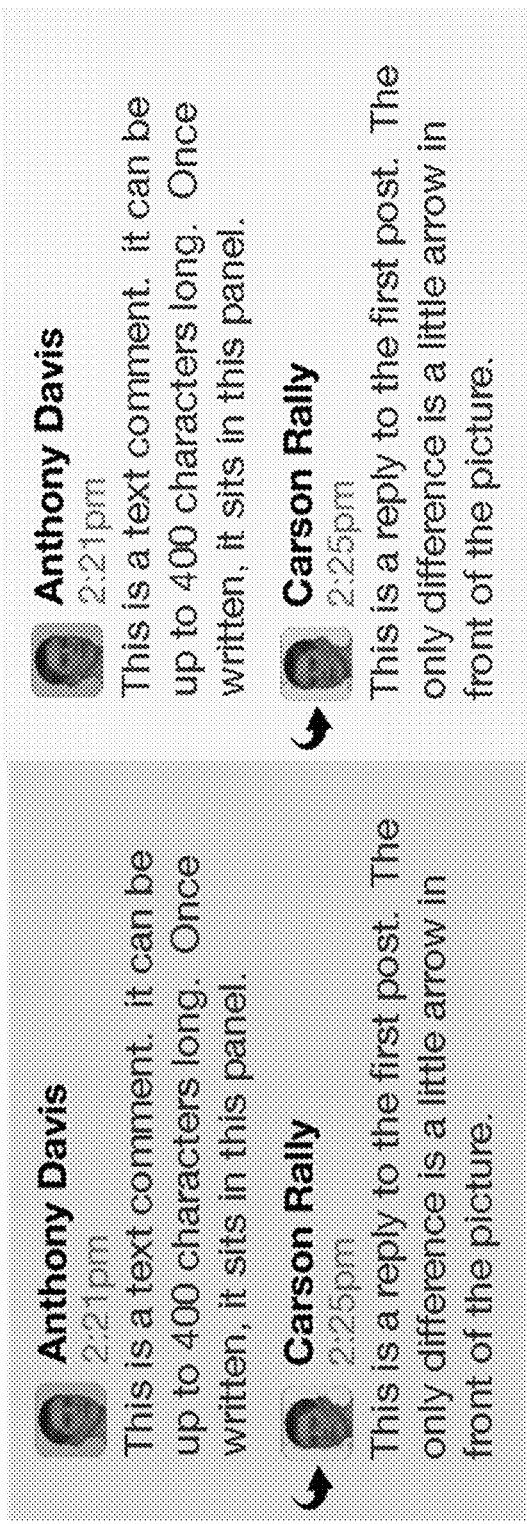
FIG. 31 is an example of a GUI of a commenting interface according to a preferred and non-limiting embodiment.
FIG. 32 is an example of a GUI of a commenting interface according to a preferred and non-limiting embodiment.
Figure 33:
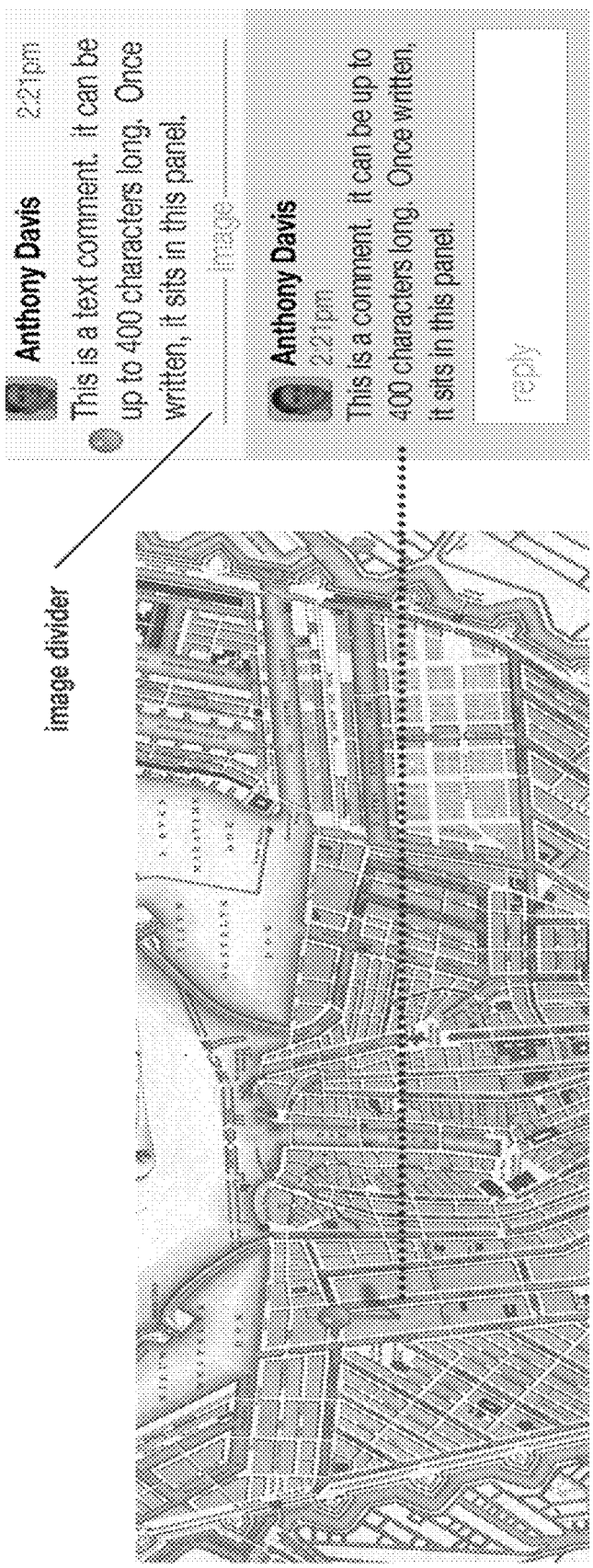
FIG. 33 is an example of a GUI of a commenting interface according to a preferred and non-limiting embodiment.
Figure 34:
FIG. 34 is an example of a GUI of a commenting interface according to a preferred and non-limiting embodiment.

A user 101 posting an initial comment or any other member of a group may reply to a comment from a group. For example, as shown in FIG. 30, a user 101 may select a comment in the comment panel in the GUI, select a "reply" box, which activates a reply text entry box and a keyboard. The position of the Reply box is moved accordingly in the GUI, and the user 101 may enter a reply and tap the share button. After the reply is shared, the reply appears as a new post, except that the reply comprises a reply arrow at the top left of the reply in the GUI, and the reply is always highlighted along with the original post, e.g., an entire thread of comments including an initial comment and any replies to the initial comment are highlighted when any of the comments in the thread are selected, as shown, for example, in FIG. 31. Group editing of a comment may be performed by any member of the group. Any unseen reply may comprise an indicator dot in the GUI. The user 101 needs to select a reply to see the reply in context. However, if there are several unseen replies to the same comment, each reply is marked "seen" after the comment thread is highlighted.

Similar to public comments, private notes provide a way for users 101 to annotate content within a learning experience. Unlike comments, however, private notes are not social. A private note is recorded only for the user 101 that creates the private note in the learning experience. Accordingly, there is no reply option for private notes, nor is there a "seen" vs. "unseen" status for private notes. To create a private note, a user 101 selects a portion of text in the GUI to bring up selection bars and a button panel as shown, for example, in FIG. 32. The user selects "Note" at which point a note entry field is shown in the GUI. The note entry field appears similar to the comment entry, except that the button says "Save" instead of "Share." The comment panel may be auto-set to private notes, and a thread count may show a number of private notes associated with a scene or element in the learning experience. Editing and deleting notes is a similar process to editing and deleting comments and discussion thereof is omitted in the interest of brevity.

A process for creating comments on images may be similar to commenting on text, but image comments may be x,y based, e.g., associated with a relative position, on the image. A user 101 may create a comment for an image by selecting an image until bubble buttons appear. As with a text comment, a text box opens in the comment panel where the user may enter text. At the same time, a pin appears on the image, as shown, for example, in FIG. 33. The pin associates the input comment with a relative x,y position in the image. To view an image comment, the user 101 opens up the comment Panel as previously described, and selects a comment to highlight the comment in the GUI and display a reply box for the comment. The pin on the image itself is shown in response to highlighting the comment. The Activity panel may be shifted in the GUI to ensure that the image is visible/onscreen. Replying, Deleting, etc. may comprise a similar process to replying, deleting text comments and discussion thereof is omitted in the interest of brevity.

A process for creating a video comment may be similar to a process for creating an image comment. A user 101 may select a video, which may pause the video if the video is in a playback state, to bring up bubble buttons in the GUI to create a comment or note as described above. After a comment is created, an indicator is placed on the video timeline indicating a time in the video that the comment is associated with. For example, in addition to the pin for the comment, which is shown on the video image in a relative x,y space (similar to the image comment above) during an appropriate playback time associated with the comment, indicators are placed on a time/progress bar of the video, as shown, for example, in FIG. 34. The indicators may be grey when not active, and blue when a comment is active. A video indicator may be displayed in the comment panel to indicate that the comment is a video comment.

To view a video comment, a user 101 may select the comment in the comment panel in the GUI, for example, as described above with respect to an image comment. The video player may automatically move to the comment in the video, buffer the video, and display the comment with the video in the GUI. Alternatively, a user 101 may view the video to view the video comment. For example, video comments in the comment panel of the GUI may be highlighted one-by-one during video playback associated with the respective comments. The comments may move higher in the comment panel in between comment displays, so that highlighted comments may stay at substantially the same location in comment panel. Multiple comments may be viewed substantially simultaneously. During viewing by a user 101, a comment may highlight blue and the pin may be displayed in blue in the video. If there are two seconds without a comment, the pin and the comment may stay highlighted for two seconds. After this time, the comment returns to a default grey, and display of the pin is removed from the video. If there are not two seconds before another comment comes on, the new comment turns blue and the new comments pin turns blue. The older comment and its pin are displayed as grey. If multiple comments are displayed simultaneously, a user 101 may pause the video and cycle through the comments in the comment panel to view each comment individually.

The Pack

The learning experience may provide a user 101 with a pack accessible via the GUI. The pack comprises one or more information resources that may be accessed by the user 101 for a given learning experiences. The information resources may comprise text, images, audio, and/or video, for example, a PDF, a photograph, a word processing document, etc. The information resources may be added to the learning experience by the author 110 and/or the teacher 111. For example, an individual teacher 111 may use editing tools to add materials to the pack in a given learning experience. The added materials may not be published to other teachers, and may only be available to the teacher 111 that added the materials and/or the students 112 associated with that teacher 111.

The information resources in the pack may be organized based on a role of the user 101 that accesses the pack. For example, a teacher pack may be visible only to the teacher 111. The teacher pack may comprise lesson notes, answer keys, guiding information, etc. A student pack may be provided to each student that receives a learning experience to provide certain additional content, such as text book pages, videos, etc. The pack information resources may be released to users based on scenes and/or elements. The pack information resources may be released to a user 101 based on a progress of the user 101 through a given activity in the learning experience. For example, upon completion of a particular scene or element, particular materials in the pack may be made available for a particular student 112. The pack information resources may be released based on the group of the user 101 that accesses the pack. For example, a student 112 associated with a particular group may receive access to particular resources in the pack. The pack information resources may be released based on a role of the user in addition to the group of the user. For example, students associated with a particular role and group may receive access to particular resources in the pack.

Conditions by which different materials are released to a pack of a user 101 based on completion of a scene or an element enable a learning experience to scaffold the release of information as the learning experience progresses. Such scaffolding may enhance instructional methodologies such as the case method and project-based learning, among others.

The Dashboard

Each element 302 may collect data on usage of the element by users 101 and collaboration among users 101 through the element 302. A real-time data dashboard may be produced based on the data collected by the elements 302 and displayed in the learning experience. The real-time data dashboards may be more advanced for teachers 111 than for students 112.

Figure 35:
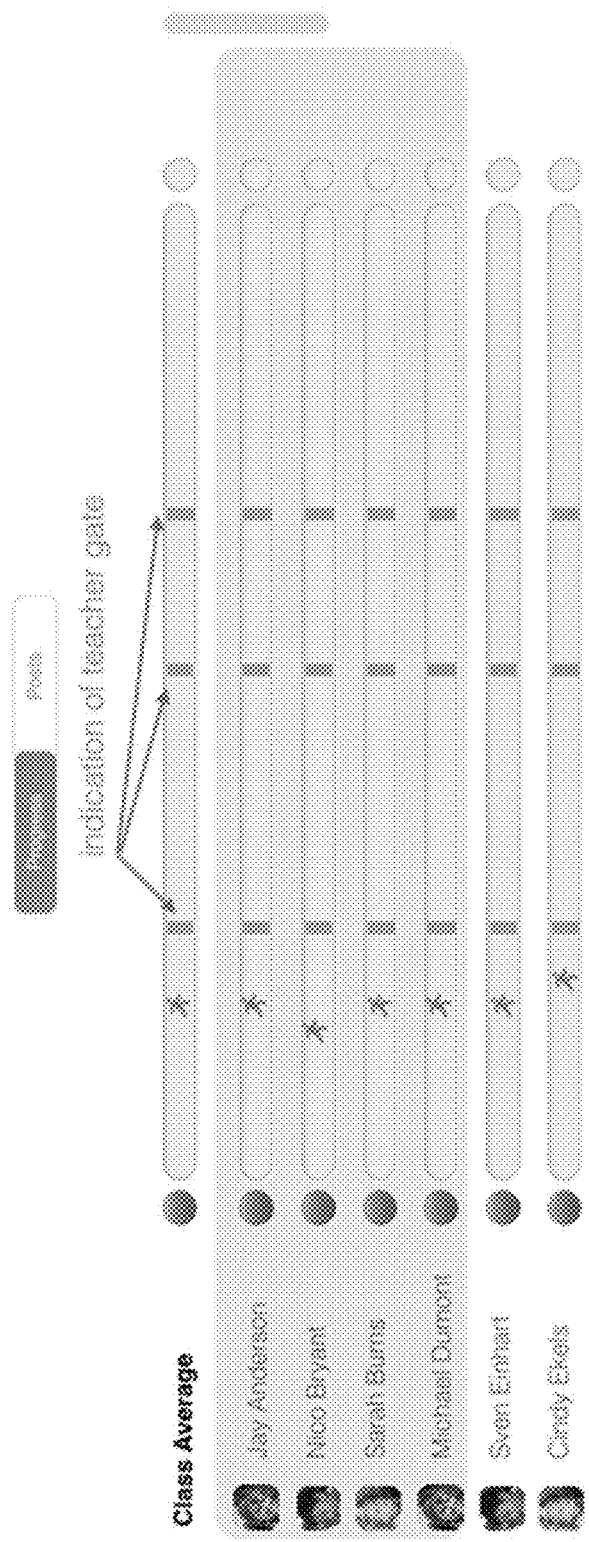
FIG. 35 is an example of a GUI of a progress dashboard according to a preferred and non-limiting embodiment.

FIG. 35 shows an example progress dashboard. Referring to FIG. 35 and FIGS. 1A-C, 3, and 4, the progress dashboard may display in real-time whether a student is "in" the Experience, e.g., currently accessing the learning experience. A student name may be displayed in blue to indicate that the student is currently accessing the learning experience, and in back if the student is not currently accessing the learning experience. The progress dashboard helps a teacher to maintain a 1:1 classroom, because, without the progress dashboard, a student may be using Facebook, watching a movie, etc. on the user device 102 instead of actively participating in the learning experience. Without such a dashboard, teachers may not know whether students are participating without physically walking around the room and checking on the students. The progress dashboard may show a real-time progress of a user student 112 through a given learning experience. Each element 302 reports when a student 112 uses the element, and whether the element has been completed by the student. As a student completes requirements for the elements, a person icon for the student may move from left to right in the progress dashboard, as shown in FIG. 35. Students 112 who have not started or who have completed are indicated. The progress dashboard may show a cumulative time that a user 101 accessed the learning experience.

Figure 36:
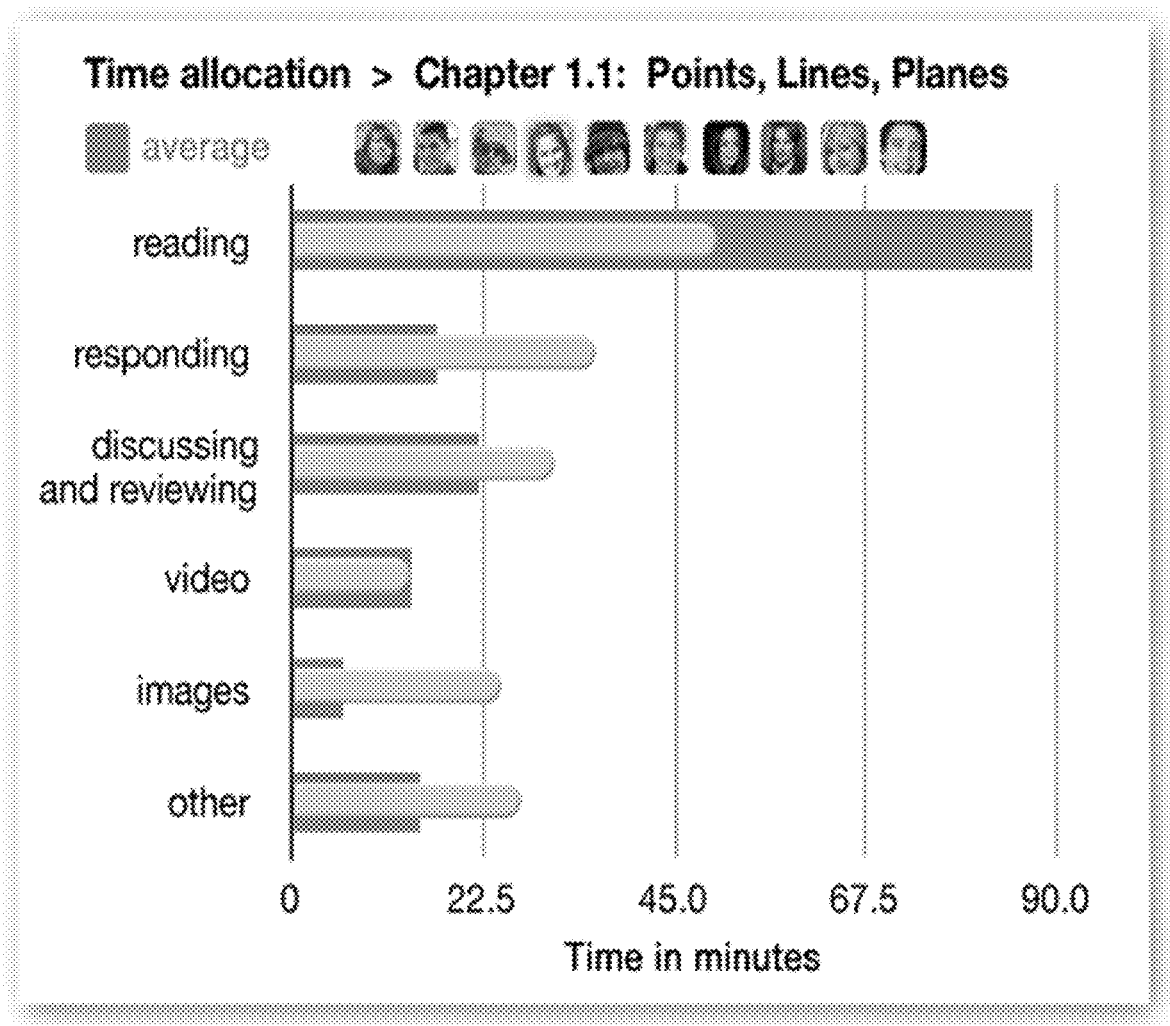
FIG. 36 is an example of a GUI of a time allocation dashboard according to a preferred and non-limiting embodiment.

Each element 302 may collect and report data on a particular instructional function. A text element may record a time that each student 112 reads the text element. A discussion wall element may record a time each student 112 or a group of students actively post in the discussion wall element 302f. A video element may record a playback time and portions of the video viewed by a student 112. The data recorded by the elements 302 may be compiled into a time allocation dashboard as shown, for example, in FIG. 36. The time allocation dashboard may comprise recorded data as class averages, individual student data overlaid on class averages, class averages or individual data overlaid on all time averages, and/or all time averages In a face-to-face classroom, teachers 111 may have an innate sense of who is leading, who is following, who talks, who listens, etc. In a virtual classroom, this may be difficult information to attain. Element level tracking provides insights into collaboration based on element-level data and the commenting framework. Each element 302 may record which users 101 are interacting with other users, how the users are interacting with each other, a frequency that the users interact with each other, which user is initiating an interaction, and/or which user is replying to an interaction for the element.

Figure 37:
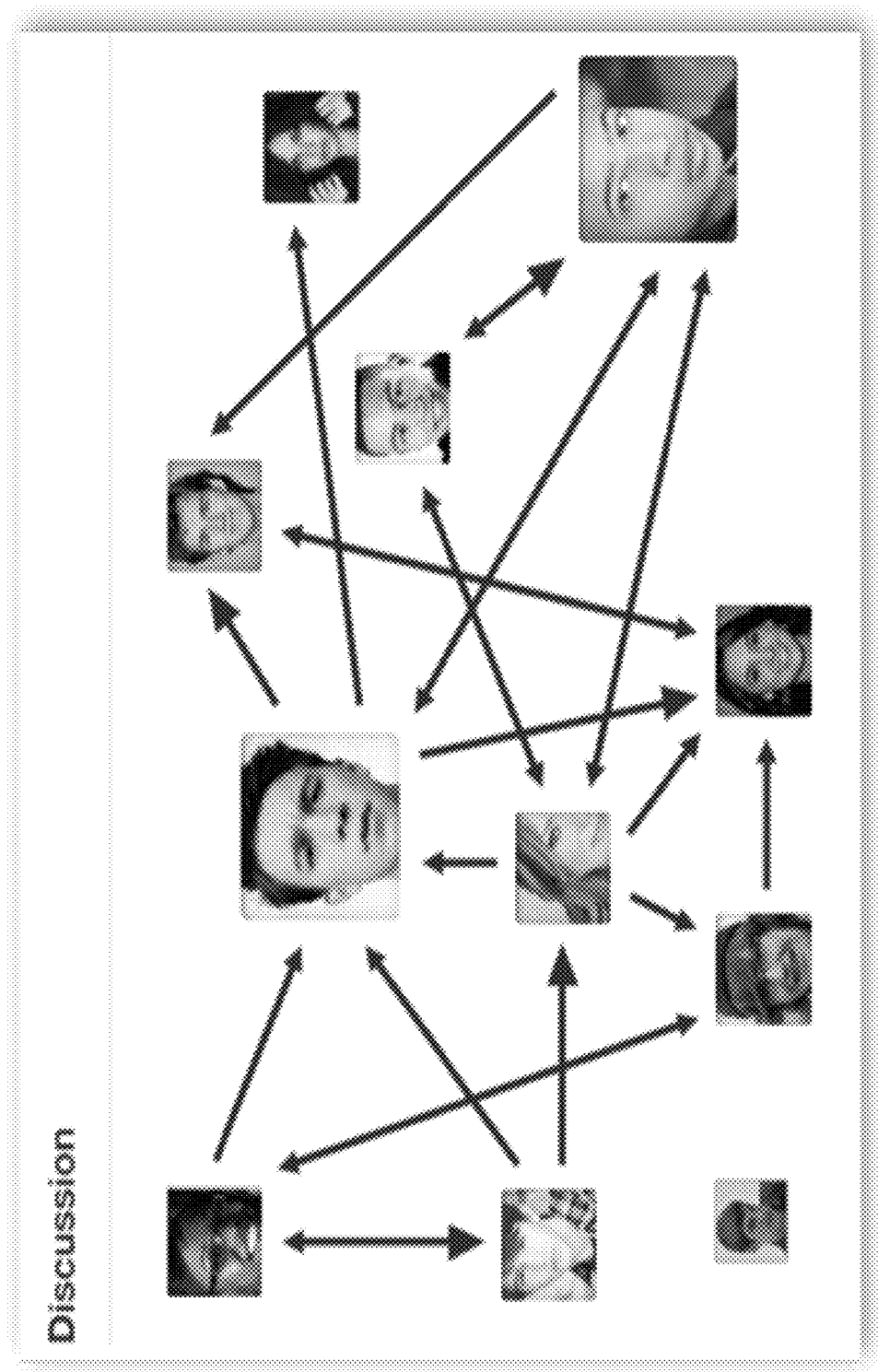
FIG. 37 is an example of a GUI of a graph representing social interactivity according to a preferred and non-limiting embodiment.

The interaction data recorded by the elements 302 may be compiled into a social graph of classroom social interactivity, as shown in FIG. 37. Larger student images in the graph may represent students 112 that interact more often with other users in the learning experience. The two-headed arrows may indicate the direction of the communication between the students 112. The one-headed arrows may indicate that a user initiated an interaction with another user, or alternatively received a communication from another student. Although the social graph of classroom social interactivity represents data from a plurality of different elements, data from a single element may be represented in a social graph of classroom social interactivity.

Figure 38:
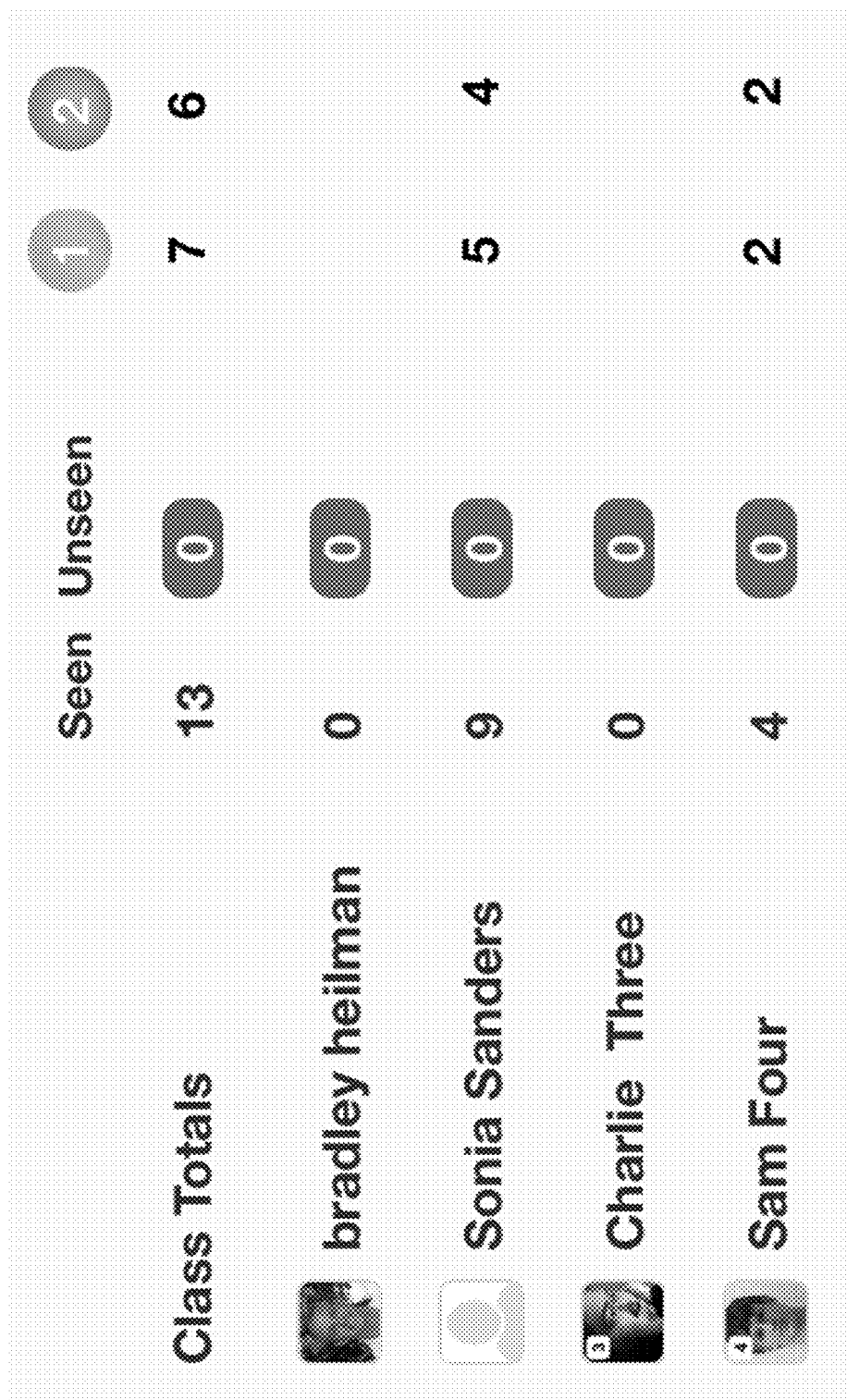
FIG. 38 is an example of a GUI of a Posts/Alerts dashboard according to a preferred and non-limiting embodiment.
Figure 39:
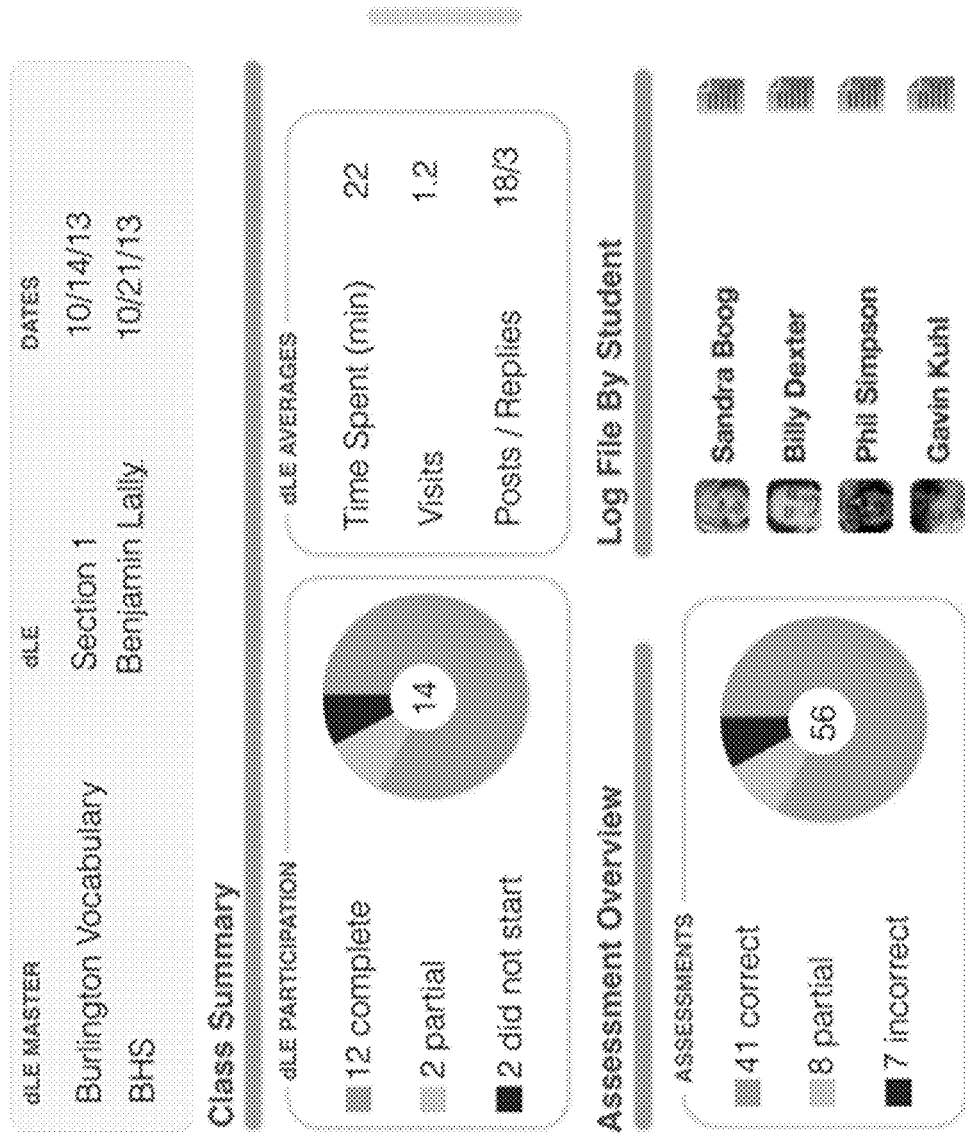
FIG. 39 is an example of a GUI of a learning experience log according to a preferred and non-limiting embodiment.

As previously discussed herein, users 101, e.g., teachers and students, may be notified when new information is posted in the learning experience, by either the teacher 111 or the student 112. Notifications may be provided to the users 101 by a Posts/Alerts dashboard in the GUI, as shown, for example, in FIG. 38. For a teacher 111, the Posts/Alerts dashboard may display a number of new comments for each student 112 for each scene 301 or element 302. For a student, the Posts/Alerts dashboard may display a number of new comments for each scene 301 or element 302; however, the number of new comments may not be attributed to individual students. A student 112 may access a dashboard similar to the dashboard described above for the teacher;

however, a student dashboard may display one or more class summaries, not individual contributions from other students, etc.

Learning Experience Data and Analytics

Referring again to FIGS. 1B and 1C, learning experience data and analytics modules and processes 119 are now discussed in more detail. By enabling the 1:1 device lesson plan learning experience, a system and method described herein may record data comparing use of the learning experience by a student 112 against various stated learning goals of the learning experience, which may be the same as the learning goals in the lesson plan that the learning experience is developed from. The data may be obtained automatically, through built in assessment and analytics, and/or from a teacher 111, through grading and/or observation with associated data recording. Student performance assessment is described in more detail herein. The same data may be used to better understand school performance, class performance, group performance, and so on, based on the students who make up a class, a school, a district, or other learning organization.

Learning Experience Logs

A learning experience log may provide a teacher 111 a snapshot of how a class performed on a learning experience. For example, a learning experience log may comprise dates of the learning experience, which users 101 started the learning experience, which users completed the learning experience, a time user spent in each scene or element in the learning experience, a number of correct/incorrect answers to questions in the learning experience, etc. A teacher may view the actual learning experience itself to view past student work in the learning experience. The learning experience log may be unfiltered, in which case the teacher may the view data for the class as a whole, filtered by group to view data for individual groups, or filtered by individual student to view data for an individual student. Whereas the class and group filters may provide a teacher 111 with a better understanding of how students collaborated with each other in the learning experience, the filter by individual students enables a teacher 111 to grade individual student work. At the individual student level, a teacher 111 may grade student answers. At the authoring level, each question may be mapped against one or more learning standards, and the data mapping each question against the learning standard may be used to evaluate overall student performance against the learning standard.

Content Tracker

Figure 40:
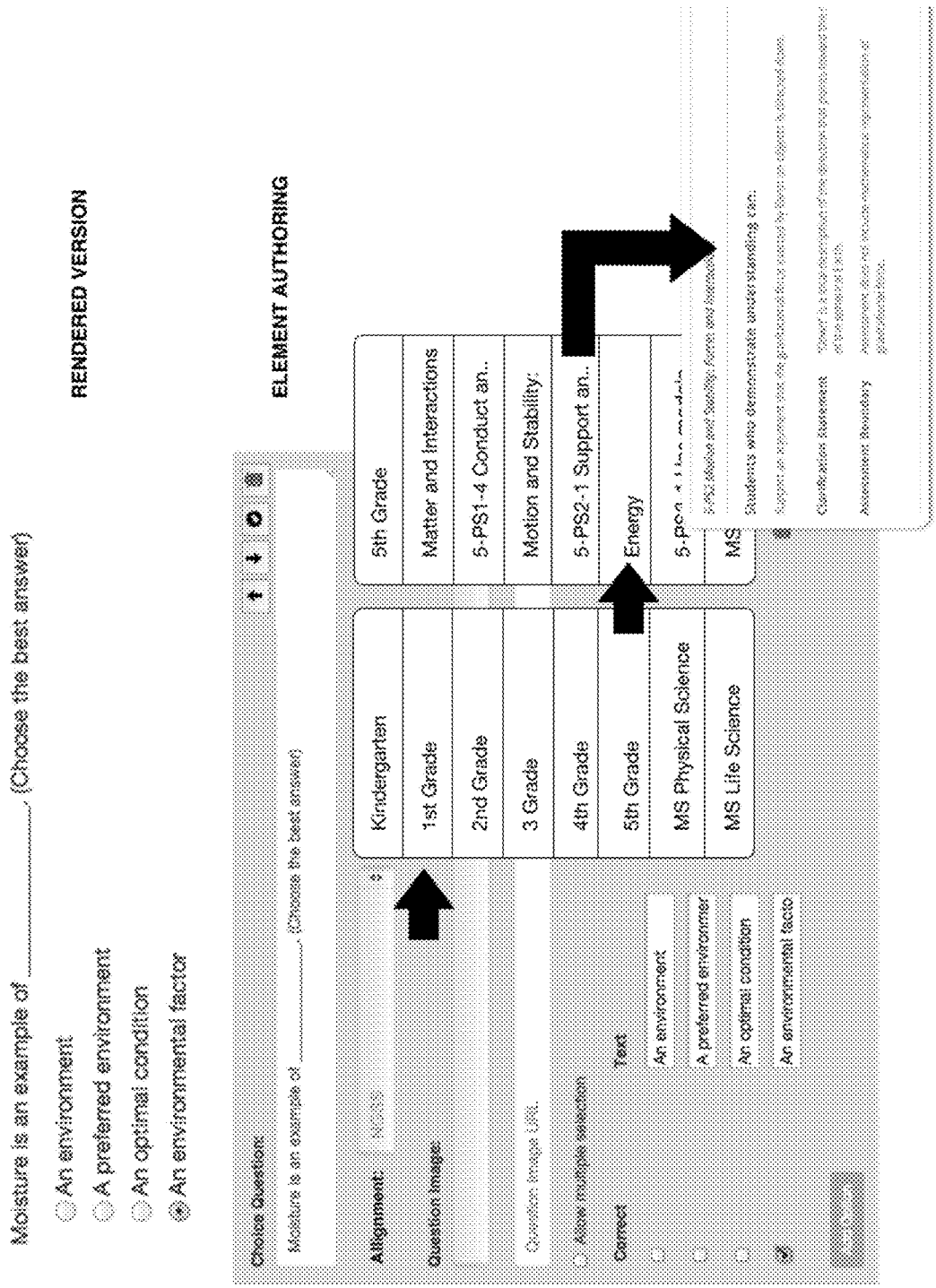
FIG. 40 is an example of a GUI showing an association of an element with a learning standard according to a preferred and non-limiting embodiment.

In any given learning discipline, regardless of age or subject, a student 112 may need to learn certain content. A content tracker enables learning experiences and individual assessment items within learning experiences to be mapped to associated content standards. With this mapping in place, student answers to various questions, tasks, projects, etc. may be mapped back to the content standards to determine how much time a student has spent studying or working with the standard and/or how well a student understands the content. The learning experience masters may be authored using a WYSIWYG HTML editor set of tools described in more detail below. At the element level, an element 302 that requires student input may be tagged with one or more learning standards. FIG. 40 shows an example of a multiple-choice assessment question associated with Next Generation Science Standards (NGSS). By tagging the question to one or more learning standards, it is possible to provide some analytics on individual student performance against the standard. For questions answered by Groups, information may be deduced about student comprehension in the Group.

Student input elements may be tagged with associated content learning standards. Example standards include the Common Core, NGSS, or other formal learning standards. Furthermore, the learning experience itself may be tagged with dominant themes for content standards. With this information as part of the learning experience master itself, it is possible to provide information on individual and group student achievement.

Figure 41:
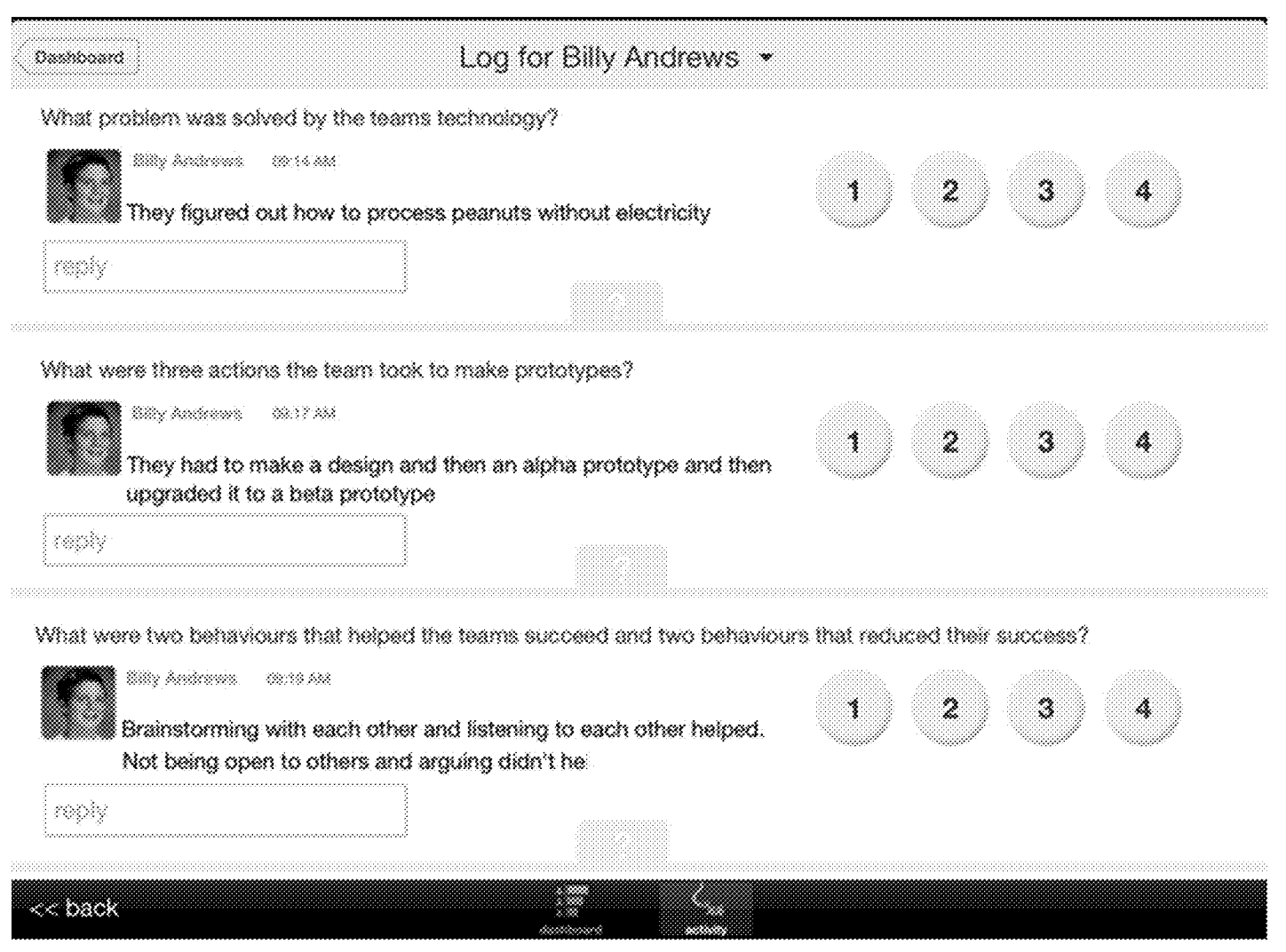

Whereas some information may be easily auto-graded, e.g., multiple-choice questions, other information is more subjective. A teacher 111 may grade student input subjectively and take the information into account against each student 112. For example, a teacher 111 may grade student input using a rubric, and may comment on the student input in the rubric as shown, for example, in FIG. 41, and by filtering the learning experience log by individual student, and answers only, a teacher may use a rubric-style grading system provided by the GUI in the learning experience to assess student understanding.

Skills Tracker

Students may need to learn specific content, but it is often processes and skills that are the most needed aspects of learning. Whether a student has mastered processes and skills, such as teamwork, problem solving, etc., is typically more difficult to assess than whether a student has mastered specific content.

A skills tracker may span a plurality of learning experiences, but may be used in any given Learning Experience. A teacher may use a skills tracker provided in the GUI in a learning experience to annotate skills demonstrated by a student or group of students, and store the information in each student's data portfolio for the learning experience and across multiple learning experiences.

For example, a teacher 111 may want to keep track of Next Generation science skills for a class of students. Next Generation science skills include the ability to ask questions, the ability to effectively use models and plan investigations, an understanding of how and when to utilize mathematics, etc. These skills are not easily assessed with a series of multiple choice questions. However, a teacher 111 looking for evidence of these skills in one particular learning experience that emphasizes particular skills may be prompted to record such evidence in the skills tracker.

Figure 42:
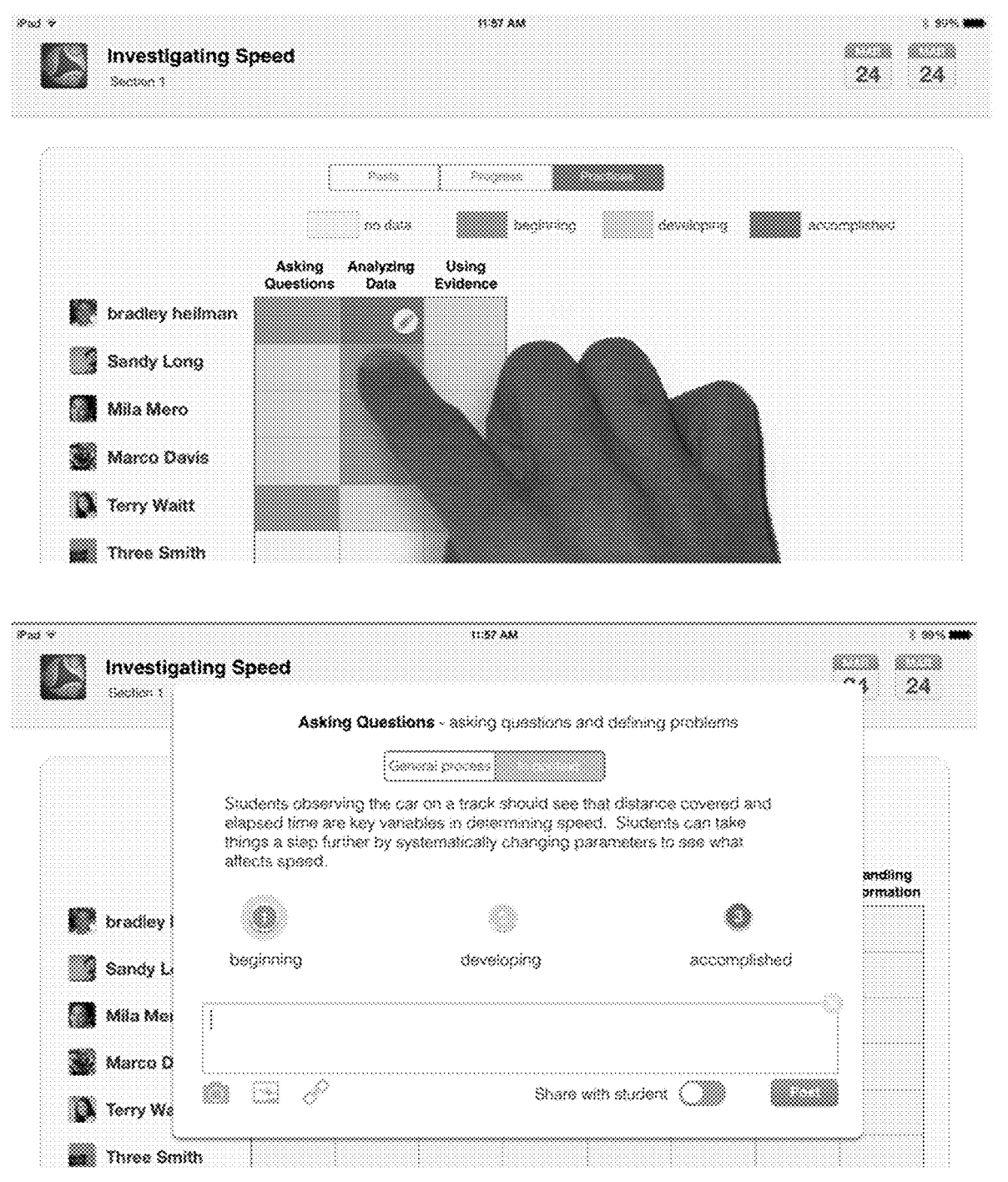
Figure 43:
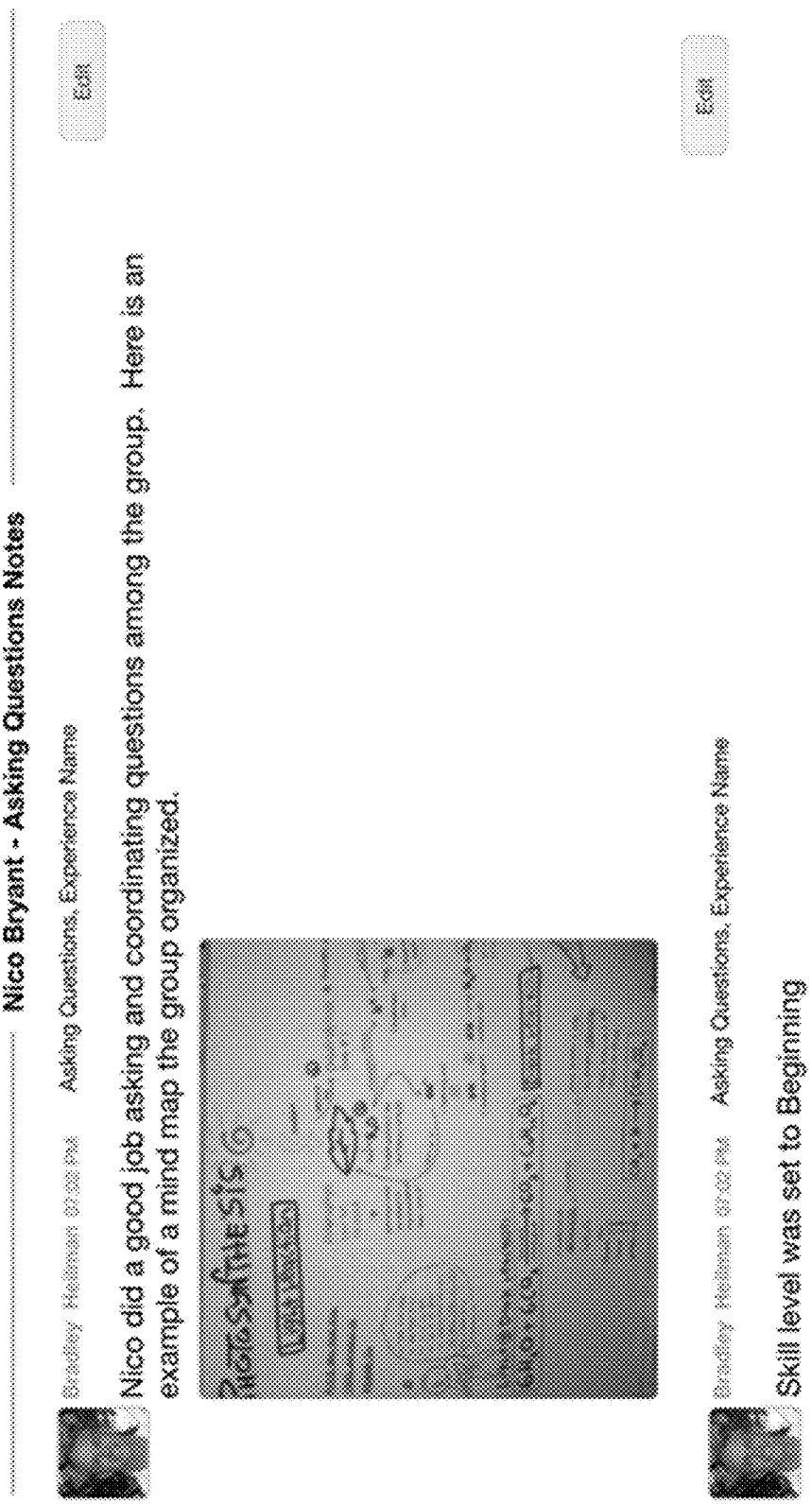
FIG. 43 is an example of a GUI showing teacher commenting according to a preferred and non-limiting embodiment.
Figure 44:
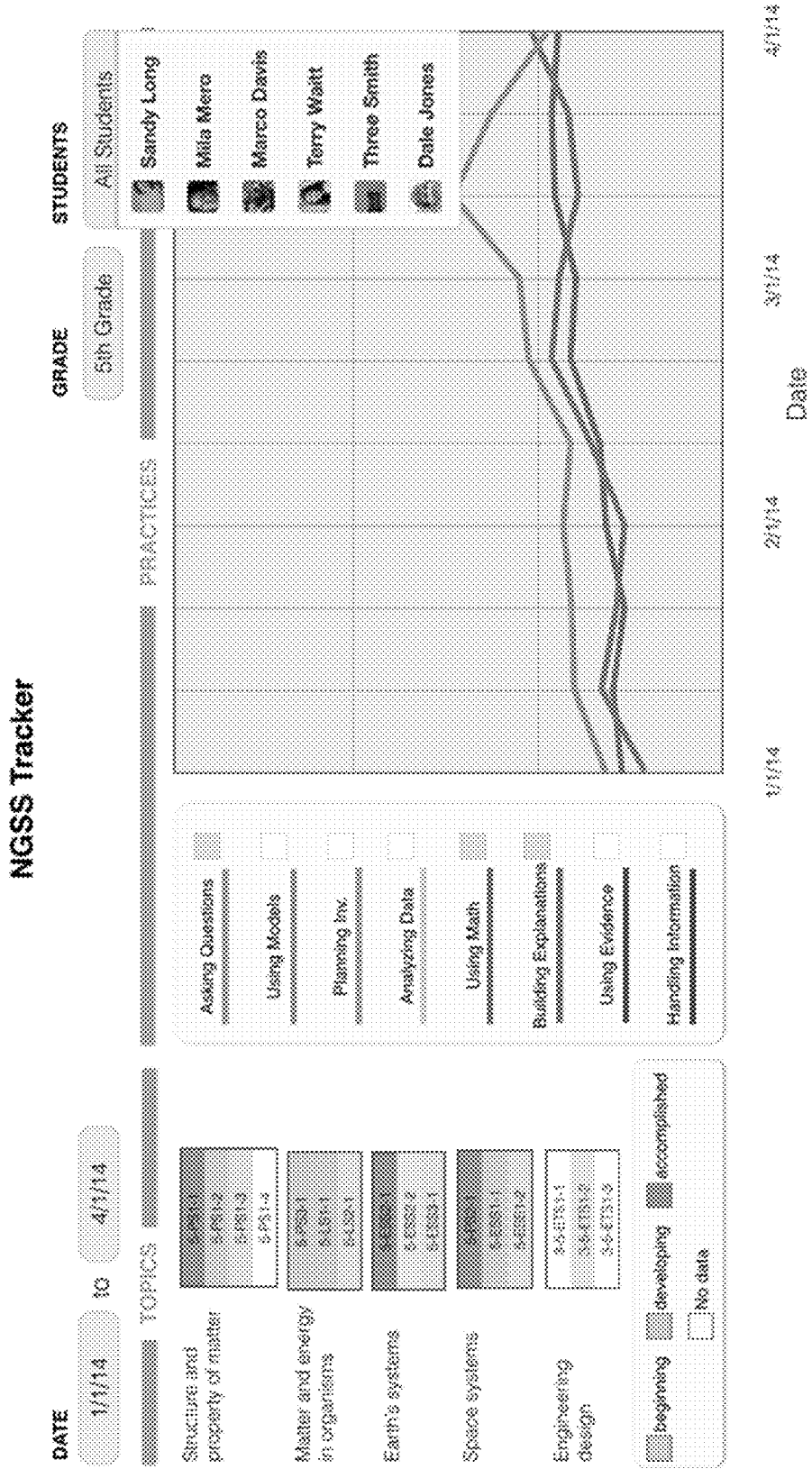
FIG. 44 is an example of a GUI showing a content tracker according to a preferred and non-limiting embodiment.

A teacher may choose (or be prompted through alerts provided in the GUI) to annotate a certain skill for a particular student. For example, as shown in FIG. 42, by selecting an area in the skills tracker in the GUI, an annotation window appears, which allows the teacher 111 to comment, take photos or store other evidence of a skill for a student 112. The annotation entry window may display an in-context description of the skill, a general description of the skill; an initial and current skill level; an interface for entering a note, and/or each note collected under the skill for the student. Comments recorded by the teacher 111 are stored in individual student 112 portfolios and may be viewed serially, as shown, for example, in FIG. 43. Information in the skills tracker may also be viewed in dashboard form, as shown, for example, in FIG. 44. By looking at skills tracker information over longer periods of time, (e.g. several months, a year, or several years), teachers may work with students on developing necessary skills.

Curation

A learning experience marketplace, with digitally delivered learning experiences, may enable a usage and data-driven curation process to improve learning experience quality. A curation module and process may receive teacher and student reviews, usage analytics, and/or teacher comments and suggestions. An author 110 may view the received information and use one or more authoring tools to edit and improve the learning experience with feedback that is coming directly from users 101, e.g., teachers 111 and students 112. Accordingly, a feedback loop may be substantially immediate, enabling an agile curation and improvement process.

Figure 45:
FIG. 45 is an example of a GUI showing usage data according to a preferred and non-limiting embodiment.

Teacher and student reviews may be received via a marketplace social rating system, where users 101 may rate learning experiences based on educational quality, engagement and/or value and additionally provide written reviews. These ratings and reviews may be made available to the public and/or the author 110 as a means of advancing quality. Because usage for a given Learning Experience is tracked, usage data may be provided to the author 110 to provide insights into learning experience usage. The usage data provided to the author 110 may include a number of teachers who have purchased the learning experience, a number of instances of the learning experience that have been published, a number of student users, an average time spent in the learning experience by a user, a time allocation by learning discipline, anonymous assessment data, etc. FIG. 45 is an example GUI showing example usage data in an author experience master dashboard. At a bottom of the dashboard are teacher comments on the experience itself. The Author 110 may select a comment to view a location of the comment in the learning experience itself.

A teacher 111 may provide feedback to an author 110 directly from the learning experience. The teacher feedback may appear in a deck be mapped to a location in the learning experience. An author may review the teacher feedback in the learning experience.

Learning Experience Authoring and Authoring Tools

Referring again to FIG. 1B, a system and method described herein may provide a GUI for authoring XML and asset based Learning Experience Masters. An author 110 may comprise an individual teacher, a district or organization-level curriculum developer, or a publisher. Using a cloud-based toolset, an author 110 may name a learning experience master, provide LRMI tagging information and other metadata; define a number of scenes and elements in the learning experience; define elements including social setting, (e.g., single user, group, whole class), and content, (e.g. text, images, videos, simulations, assessments); and/or define workflow requirements.

Figure 46:
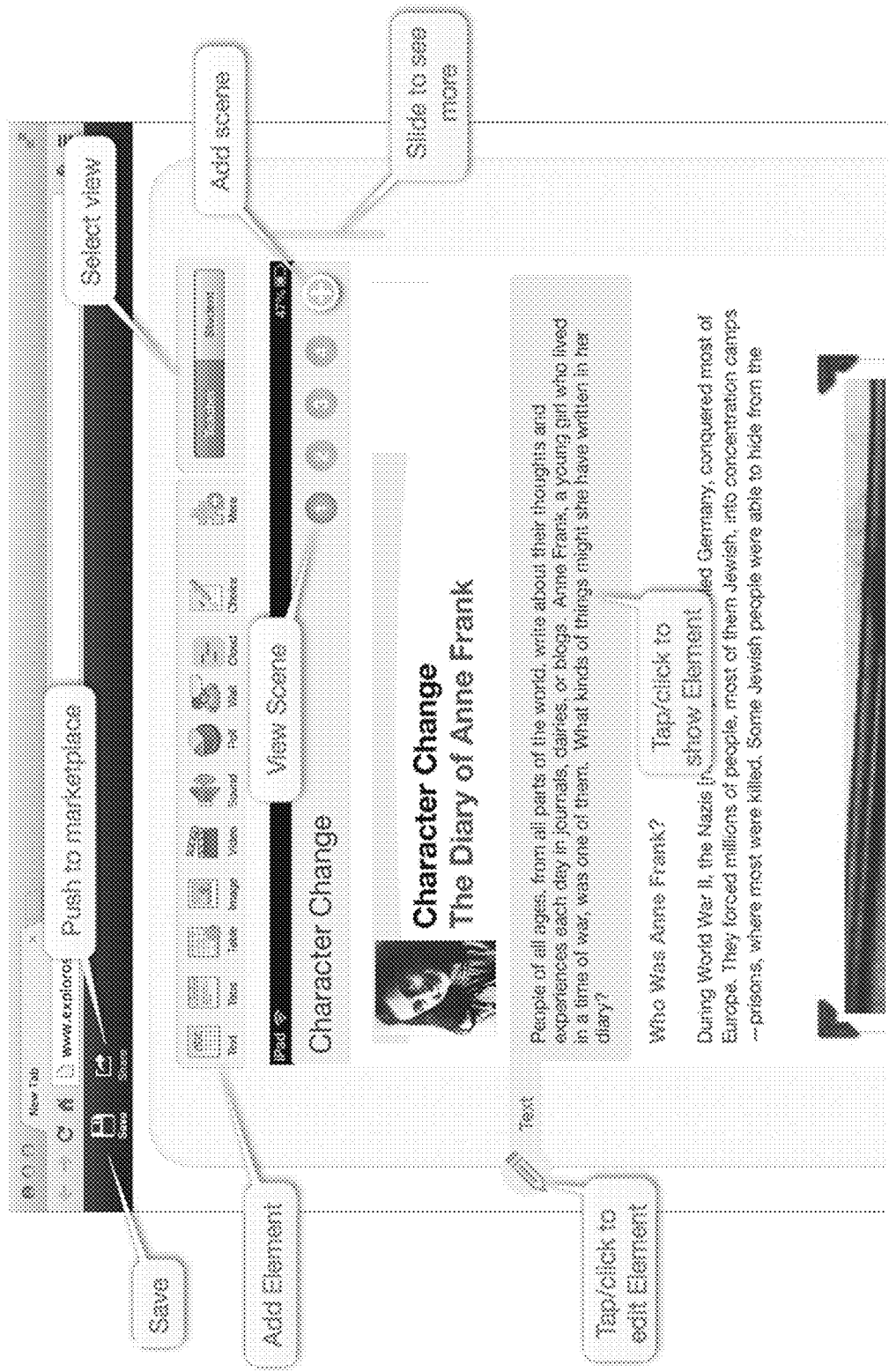
FIG. 46 is an example of a GUI for authoring a learning experience according to a preferred and non-limiting embodiment.
Figure 47:
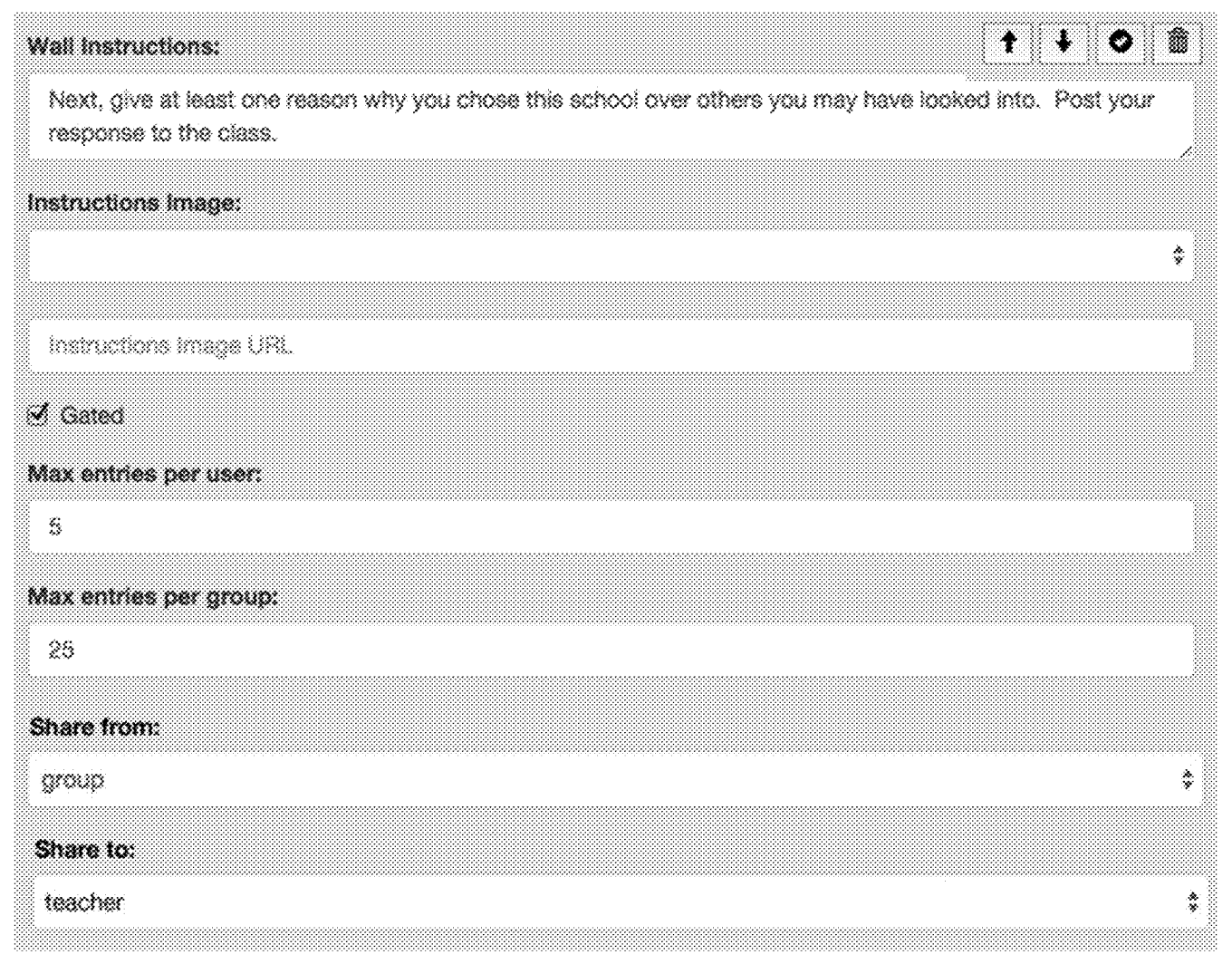

The author 110 may use the GUI to add elements, edit or enter element content and define workflow and requirements, as shown, for example, in FIG. 46. The authoring system produces a series of XML files and assets, e.g., images, videos, pdfs, etc., that are compressed and eventually sent to an App player. When authoring an element, the author 110 provides the element with given content and, if relevant, social sharing information. For example, if a wall element allows for students to post responses in a form similar to an embedded discussion board, an author side of the wall element may have the following inputs, as shown, for example, in FIG. 47: instructions: this is the question or topic of the discussion board; image: this is an (optional) associated image; a gated checkbox (whether or not a student or group needs to answer before seeing other student or group work); a max entries per user—this caps the total number of entries a particular entity may post (Setting this to one is typical for questions that are not discussions, but that are meant to have a singular answer); a max entries per class—this is the total number of entries the Element will accept; a share from: this is the entity the element is being shared from (Individual student, Group, Class); a share to: this is the entity the element is being shared to, e.g., teacher, group, and/or class. In addition to this configuration information, the element may be tagged or aligned to content or skills standards based on common or custom framework, e.g., Common Core, NGSS, etc.

By stringing together elements one after another, scenes may be created. Each scene may have specific requirements, such that when students are navigating the scene in a learning experience, the students must complete certain actions before being able to advance. Additionally, teacher gates may be inserted such that teachers may control a pace at which a student progresses. Requirements, gating and social settings may each be provided by the author 110 in the authoring environment.

By stringing together multiple scenes, an activity within a learning experience master may be created. The pack may be developed by adding associated resources, e.g., pdfs, images, web pages, etc. Each pack resource may be tagged as for the teacher only, or for teacher and students, and may additionally be configured with information about how and when to make the pack resources appear or become available on a student's device. Accordingly, conversion of lesson plans into student-facing, teacher-guided learning experiences for 1:1 devices may be provided.

The Marketplace

Referring again to FIGS. 1B and 1C, a marketplace that delivers collaborative learning to native tablet and other 1:1 devices may be provided by the system and method described herein. An author may use authoring tools to develop a learning experience master. The learning experience master may be provided in the Marketplace and the author may choose how to make the learning experience master available to users 101. The master may be private, e.g., only available to the author and whomever the author personally invites, or public, e.g., the learning experience master itself may be made available to others, for free or for a price. Teachers may locate masters in the marketplace and purchase the masters. An author may use the master as a basis for a virtual course, and provide or sell seats that he/she may teach personally. In this case the Virtual Seat is a product in the marketplace that a student may purchase. For example, if an experience is for teacher professional development, a teacher may purchase a seat as a student of the experience. If an experience is for AP Physics tutoring, a student may purchase a seat.

A learning experience master may be tested and used privately before being provided to the marketplace. If the author 110 chooses to push the Learning Experience Master to the marketplace, the author must verify that he/she has the rights to use the content in the Learning Experience. If this is verified, the author may submit the Learning Experience Master for review. If the master passes this QA check, it may be placed in the Marketplace. When placed in the Marketplace, the Learning Experience is tagged with LRMI tagging information, given a price, and categorized with Subject, Topic and Learning Standards information. Once in the marketplace, a Learning Experience Master is available for teacher purchase. After adding the Learning Experience Master to his or her cart, and checking out, the master appears on the teacher's device. The master may be used to create a learning experience, and invite students.

The Marketplace may enable "back-end" pushing of Learning Experiences to specific teacher accounts, based on large scale purchases. For example, if a school district provides a curriculum to all of its English teachers, using the back-end pushing, all associated accounts may be automatically loaded with a full year of learning experiences for English courses.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:

1. A method for providing collaborative, digital learning experiences, the method comprising:
storing, by one or more processors, data for at least one learning experience, wherein the at least one learning experience is divided into a plurality of scenes including a plurality of elements to be provided in a predefined flow, wherein each element of the plurality of elements includes at least one item of media content;
providing, by the one or more processors, the at least one learning experience to a plurality of users via a plurality of user interfaces on a plurality of user devices, wherein at least one user interface associated with at least one user is associated with a student role in the at least one learning experience, wherein the student role defines the media content that the at least one user is provided in the predefined flow of the at least one learning experience, wherein another user interface associated with another user is associated with a teacher role in the at least one learning experience, wherein the teacher role defines the media content that the another user is provided in the predefined flow of the at least one learning experience, wherein the media content provided in the predefined flow to the another user associated with the teacher role is different than the media content provided in the predefined flow to the at least one user associated with the student role, wherein the another user associated with the teacher role launches the at least one learning experience to provide the at least one learning experience to the plurality of users via the plurality of user interfaces on the plurality of user devices, wherein at least one first element of the plurality of elements is preconfigured to: (i) automatically associate the at least one user with at least one first predefined other user of the plurality of users in a first group of users for the at least one first element such that the first group of users can interact with each other through the at least one first element, wherein the remaining users of the plurality of users cannot interact with the first group of users through the at least one first element, (ii) share first user input associated with the at least one first element from the at least one user with one or more first predefined other users of the plurality of users, (iii) provide an indication that the shared first user input associated with the at least one first element from the at least one user is received from the first group of users, and (iv) automatically associate the at least one user with at least one first role different than the teacher role and the student role for the at least one first element, wherein the at least one first role includes a social position in a social setting including a role play scenario associated with the at least one first element, wherein the at least one first predefined other user of the plurality of users with which the at least one user is automatically associated with in the first group of users for the at least one first element is configured based on teacher input received from the another user associated with the teacher role that launches the at least one learning experience, wherein at least one second element of the plurality of elements is preconfigured to: (i) automatically associate the at least one user with at least one second predefined other user of the plurality of users having the same at least one first role in a second group of users for the at least one second element, wherein the remaining users of the plurality of users cannot interact with the second group of users through the at least one second element, (ii) share second user input associated with the at least one second element from the at least one user with one or more second predefined other users of the plurality of users, (iii) provide an indication that the shared second user input associated with the at least one second element from the at least one user is received from the at least one user, (iv) automatically associate at least a portion of the remaining users in a third group of users for the at least one second element such that the third group of users can interact with each other through the at least one second element, wherein the remaining users of the plurality of users not in the third group of users cannot interact with the third group of users through the at least one second element, and (v) share third user input associated with the at least one second element from the at least a portion of the remaining users with one or more third predefined other users of the plurality of users, wherein the one or more second predefined other users are the same as the one or more third predefined other users, wherein the at least one first predefined other user is different than the at least one second predefined other user, wherein the one or more first predefined other users are different than the one or more second predefined other users, wherein the first group of users is different than the second group of users, and wherein the third group of users is different than the first group of users and the second group of users; and
receiving, by the one or more processors, data associated with the at least one user associated with the student role accessing the at least one first element and the at least one second element in the at least one learning experience via the at least one user interface of the at least one user device associated with the at least one user,
wherein the providing the at least one learning experience comprises automatically withholding, according to the predefined flow, providing an update to media content in a current element, a next element, or an update to media content in a previous element in the at least one learning experience to the at least one user interface of the at least one user device associated with the at least one user by preventing the at least one user interface of the at least one user device associated with the at least one user from advancing in the learning experience until an expected user input associated with the current element is received from the at least one user via the at least one user interface of the at least one user device.

2. The method of claim 1, further comprising:
determining, by the one or more processors, that the expected user input is a valid user input; and in response to determining that the expected user input is a valid user input, providing, by the one or more processors, the update to the media content in the current element, the next element, or the update to the media content in the previous element in the at least one learning experience to the at least one user interface of the at least one user device associated with the at least one user.

3. The method of claim 1, further comprising:
determining, by the one or more processors, that the expected user input is an invalid user input; and
in response to determining that the expected user input is an invalid user input, providing, by the one or more processors, additional information associated with the current element or at least one alternative element to the at least one user interface of the at least one user device associated with the at least one user.

4. The method of claim 1, wherein the update to the media content in the current element, the next element, or the update to the media content in the previous element in the learning experience comprises expected user input from at least one other user interface of at least one other user device associated with at least one other user of the plurality of users.

5. The method of claim 1, wherein the providing the at least one learning experience comprises automatically withholding, according to the predefined flow, providing an update to media content in a current element, a next element, or an update to media content in a previous element in the at least one learning experience to two or more user interfaces of two or more user devices associated with two or more users by preventing the two or more user interfaces of the two or more user devices associated with the two or more users from advancing in the learning experience until an expected user input associated with the current element is received from at least one of the two or more users via at least one of the two or more user interfaces, and wherein the two or more users are associated with each other by the current element.

6. The method of claim 1, wherein the providing the at least one learning experience comprises automatically withholding, according to the predefined flow, providing an update to media content in a current element, a next element, or an update to media content in a previous element in the learning experience to the at least one user interface of the at least one user device associated with the at least one user by preventing the at least one user interface of the at least one user device associated with the at least one user from advancing in the learning experience until an expected user input associated with the current element is received from at least one other user device associated with at least one other user of the plurality of users.

7. The method of claim 1, wherein the providing the at least one learning experience comprises automatically withholding, according to the predefined flow, providing an update to media content in two or more current elements, a next element, or an update to media content in a previous element in the at least one learning experience to the at least one user interface of the at least one user device associated with the at least one user by preventing the at least one user interface of the at least one user device associated with the at least one user from advancing in the learning experience until an expected user input associated with each of the two or more current elements is received from the at least one user device associated with the at least one user.

8. The method of claim 1, further comprising:
receiving, by the one or more processors, unexpected user input from the at least one user of the plurality of users via the at least one user interface of the at least one user device associated with the at least one user; and
associating, by the one or more processors, the unexpected user input with a particular element of the plurality of elements.

9. The method of claim 8, further comprising:
notifying, by the one or more processors, via at least one other user interface of at least one other user device, at least one other user of the plurality of users substantially in real-time of the unexpected user input and the particular element associated with the unexpected user input.

10. The method of claim 1, further comprising:
receiving, by the one or more processors, at least one additional element from the at least one user via the at least one user interface of the at least one user device associated with the at least one user; and
modifying, by the one or more processors, at least one scene of the plurality of scenes to include the at least one additional element.

11. The method of claim 1, further comprising:
mapping, by the one or more processors, the data associated with the at least one user interface of the at least one device associated with the at least one user of the plurality of users accessing the at least one first element in the at least one learning experience to at least one learning standard.

12. The method of claim 1, further comprising:
receiving, by the one or more processors, data comprising at least one of an indication of whether the at least one user interface of the at least one user device associated with the at least one user is currently accessing the first at least one element and an amount of time that the at least one user interface of the at least one user device associated with the at least one user has spent accessing the at least one first element.

13. The method of claim 1, further comprising:
receiving, by the one or more processors, data associated with the at least one user interface of the at least one user device associated with the at least one user of the plurality of users accessing a plurality of different learning experiences.

14. The method of claim 1, wherein the at least one item of media content comprises at least one of text, audio, an image, and a video.

15. The method of claim 1, further comprising:
receiving, by the one or more processors, at least one review of the at least one learning experience from the at least one user via the at least one user interface of the at least one user device; and
providing, by the one or more processors, the at least one review of the learning experience and the data associated with the at least one user interface of the at least one user device associated with the at least one user of the plurality of users accessing the at least one element in the at least one learning experience to a creator of the at least one learning experience.

16. The method of claim 1, further comprising:
receiving, by the one or more processors, user input; and
creating, by the one or more processors, a learning experience master comprising the data for the at least one learning experience based at least partly on the user input.

17. The method of claim 1, further comprising:
providing, by the one or more processors, a digital marketplace comprising data for a plurality of learning experiences accessible over a network by the plurality of user devices.

18. The method of claim 1, further comprising:
automatically pushing, by the one or more processors, a plurality of learning experience masters comprising data for a plurality of learning experiences to a portion of the plurality of user devices associated with a portion of the plurality of users.

19. A system for providing collaborative, digital learning experiences, the system comprising:
at least one non-transitory computer-readable storage medium in communication with at least one processor and having instructions stored thereon which, when executed by the at least one processor, cause the at least one processor to perform operations comprising:
storing data for at least one learning experience, wherein the at least one learning experience is divided into a plurality of scenes including a plurality of elements to be provided in a predefined flow, wherein each element of the plurality of elements includes at least one item of media content;
providing the at least one learning experience to a plurality of users via a plurality of user interfaces on a plurality of user devices, wherein at least one user interface associated with at least one user is associated with a student role in the at least one learning experience, wherein the student role defines the media content that the at least one user is provided in the predefined flow of the at least one learning experience, wherein another user interface associated with another user is associated with a teacher role in the at least one learning experience, wherein the teacher role defines the media content that the another user is provided in the predefined flow of the at least one learning experience, wherein the media content provided in the predefined flow to the another user associated with the teacher role is different than the media content provided in the predefined flow to the at least one user associated with the student role, wherein the another user associated with the teacher role launches the at least one learning experience to provide the at least one learning experience to the plurality of users via the plurality of user interfaces on the plurality of user devices, wherein at least one first element of the plurality of elements is preconfigured to: (i) automatically associate the at least one user with at least one first predefined other user of the plurality of users in a first group of users for the at least one first element such that the first group of users can interact with each other through the at least one first element, wherein the remaining users of the plurality of users cannot interact with the first group of users through the at least one first element, (ii) share first user input associated with the at least one first element from the at least one user with one or more first predefined other users of the plurality of users, (iii) provide an indication that the shared first user input associated with the at least one first element from the at least one user is received from the first group of users, and (iv) automatically associate the at least one user with at least one first role different than the teacher role and the student role for the at least one first element, wherein the at least one first role includes a social position in a social setting including a role play scenario associated with the at least one first element, wherein the at least one first predefined other user of the plurality of users with which the at least one user is automatically associated with in the first group of users for the at least one first element is configured based on teacher input received from the another user associated with the teacher role that launches the at least one learning experience, wherein at least one second element of the plurality of elements is preconfigured to: (i) automatically associate the at least one user with at least one second predefined other user of the plurality of users having the same at least one first role in a second group of users for the at least one second element, wherein the remaining users of the plurality of users cannot interact with the second group of users through the at least one second element, (ii) share second user input associated with the at least one second element from the at least one user with one or more second predefined other users of the plurality of users, (iii) provide an indication that the shared second user input associated with the at least one second element from the at least one user is received from the at least one user, (iv) automatically associate at least a portion of the remaining users in a third group of users for the at least one second element such that the third group of users can interact with each other through the at least one second element, wherein the remaining users of the plurality of users not in the third group of users cannot interact with the third group of users through the at least one second element, and (v) share third user input associated with the at least one second element from the at least a portion of the remaining users with one or more third predefined other users of the plurality of users, wherein the one or more second predefined other users are the same as the one or more third predefined other users, wherein the at least one first predefined other user is different than the at least one second predefined other user, wherein the one or more first predefined other users are different than the one or more second predefined other users, wherein the first group of users is different than the second group of users, and wherein the third group of users is different than the first group of users and the second group of users; and
receiving data associated with the at least one user associated with the student role accessing the at least one first element and the at least one second element in the at least one learning experience via the at least one user interface of the at least one user device associated with the at least one user,
wherein the providing the at least one learning experience comprises automatically withholding, according to the predefined flow, providing an update to media content in a current element, a next element, or an update to media content in a previous element in the at least one learning experience to the at least one user interface of the at least one user device associated with the at least one user by preventing the at least one user interface of the at least one user device associated with the at least one user from advancing in the learning experience until an expected user input associated with the current element is received from the at least one user via the at least one user interface of the at least one user device.

20. The system of claim 19, wherein the one or more processors perform operations comprising:
determining that the expected user input is a valid user input; and
in response to determining that the expected user input is a valid user input, providing the update to the media content in the current element, the next element, or the update to the media content in the previous element in the at least one learning experience to the at least one user interface of the at least one user device associated with the at least one user.

21. The system of claim 19, wherein the one or more processors perform operations comprising:
determining that the expected user input is an invalid user input; and
in response to determining that the expected user input is an invalid user input, providing additional information associated with the current element or at least one alternative element to the at least one user interface of the at least one user device associated with the at least one user.

22. The system of claim 19, wherein the update to the media content in the current element, the next element, or the update to the media content in the previous element in the learning experience comprises expected user input from at least one other user interface of at least one other user device associated with at least one other user of the plurality of users.

23. The system of claim 19, wherein the providing the at least one learning experience comprises automatically withholding, according to the predefined flow, providing an update to media content in a current element, a next element, or an update to media content in a previous element in the at least one learning experience to two or more user interfaces of two or more user devices associated with two or more users by preventing the two or more user interfaces of the two or more user devices associated with the two or more users from advancing in the learning experience until an expected user input associated with the current element is received from at least one of the two or more users via at least one of the two or more user interfaces, and wherein the two or more users are associated with each other by the current element.

24. The system of claim 19, wherein the providing the at least one learning experience comprises automatically withholding, according to the predefined flow, providing an update to media content in a current element, a next element, or an update to media content in a previous element in the learning experience to the at least one user interface of the at least one user device associated with the at least one user by preventing the at least one user interface of the at least one user device associated with the at least one user from advancing in the learning experience until an expected user input associated with the current element is received from at least one other user device associated with at least one other user of the plurality of users.

25. The system of claim 19, wherein the providing the at least one learning experience comprises automatically withholding, according to the predefined flow, providing an update to media content in two or more current elements, a next element, or an update to media content in a previous element in the at least one learning experience to the at least one user interface of the at least one user device associated with the at least one user by preventing the at least one user interface of the at least one user device associated with the at least one user from advancing in the learning experience until an expected user input associated with each of the two or more current elements is received from the at least one user device associated with the at least one user.

26. The system of claim 19, wherein the one or more processors perform operations comprising:

receiving unexpected user input from the at least one user of the plurality of users via the at least one user interface of the at least one user device associated with the at least one user; and
associating the unexpected user input with a particular element of the plurality of elements.

27. The system of claim 26, wherein the one or more processors perform operations comprising:
notifying, via at least one other user interface of at least one other user device, at least one other user of the plurality of users substantially in real-time of the unexpected user input and the particular element associated with the unexpected user input.

28. The system of claim 19, wherein the one or more processors perform operations comprising:
receiving at least one additional element from the at least one user via the at least one user interface of the at least one user device associated with the at least one user; and
modifying at least one scene of the plurality of scenes to include the at least one additional element.

29. The system of claim 19, wherein the one or more processors perform operations comprising:
mapping the data associated with the at least one user interface of the at least one device associated with the at least one user of the plurality of users accessing at least one element in the at least one learning experience to at least one learning standard.

30. The system of claim 19, wherein the one or more processors perform operations comprising:
receiving data comprising at least one of an indication of whether the at least one user interface of the at least one user device associated with the at least one user is currently accessing the at least one element and an amount of time that the at least one user interface of the at least one user device associated with the at least one user has spent accessing the at least one element.

31. The system of claim 19, wherein the one or more processors perform operations comprising:
receiving data associated with the at least one user interface of the at least one user device associated with the at least one user of the plurality of users accessing a plurality of different learning experiences.

32. The system of claim 19, wherein the at least one item of media content comprises at least one of text, audio, an image, and a video.

33. The system of claim 19, wherein the one or more processors perform operations comprising:
receiving at least one review of the at least one learning experience from the at least one user via the at least one user interface of the at least one user device; and
providing the at least one review of the learning experience and the data associated with the at least one user interface of the at least one user device associated with the at least one user of the plurality of users accessing the at least one element in the at least one learning experience to a creator of the at least one learning experience.

34. The system of claim 19, wherein the one or more processors perform operations comprising:
receiving user input; and
creating the data for the at least one learning experience based at least partly on the user input.

35. The system of claim 19, wherein the one or more processors perform operations comprising:

providing a digital marketplace comprising data for a plurality of learning experiences accessible over a network by the plurality of user devices.

36. The system of claim 19, wherein the one or more processors perform operations comprising:
automatically pushing a plurality of learning experience masters comprising data for a plurality of learning experiences to a portion of the plurality of user devices associated with a portion of the plurality of users.

* * * * *